United States Patent
Ozog

(10) Patent No.: US 8,364,609 B2
(45) Date of Patent: Jan. 29, 2013

(54) OPTIMIZATION OF MICROGRID ENERGY USE AND DISTRIBUTION

(75) Inventor: Michael T. Ozog, Fort Collins, CO (US)

(73) Assignee: Integral Analytics, Inc., Cincinnati, OH (US)

( * ) Notice: Subject to any disclaimer, the term of this patent is extended or adjusted under 35 U.S.C. 154(b) by 240 days.

(21) Appl. No.: 12/687,827

(22) Filed: Jan. 14, 2010

(65) Prior Publication Data

US 2010/0179704 A1    Jul. 15, 2010

Related U.S. Application Data

(60) Provisional application No. 61/144,642, filed on Jan. 14, 2009, provisional application No. 61/228,010, filed on Jul. 23, 2009.

(51) Int. Cl.
*G06F 17/00* (2006.01)

(52) U.S. Cl. ...................... 705/412; 705/7.25

(58) Field of Classification Search ............... 705/412, 705/400, 7.25, 7.35, 7.37, 7.24, 7.29, 7.31, 705/26.1, 26.2, 26.3, 28, 29, 30, 34, 7.11, 705/7.12, 7.34; 700/286–300; 703/2, 13, 703/18

See application file for complete search history.

(56) References Cited

U.S. PATENT DOCUMENTS

| | | | |
|---|---|---|---|
| 3,602,703 A | 8/1971 | Polenz |
| 3,719,809 A | 3/1973 | Fink |
| 4,023,043 A | 5/1977 | Stevenson |
| 4,357,665 A | 11/1982 | Korff |
| 4,612,619 A | 9/1986 | Culp |
| 5,517,423 A | 5/1996 | Pomatto |
| 5,543,666 A | 8/1996 | Priesemuth |
| 5,598,349 A | 1/1997 | Elliason et al. |
| 5,675,503 A | 10/1997 | Moe et al. |
| 5,696,695 A | 12/1997 | Ehlers et al. |
| 5,894,422 A | 4/1999 | Chasek |
| 6,311,105 B1 | 10/2001 | Budike, Jr. |
| 6,519,509 B1 | 2/2003 | Nierlich et al. |
| 6,577,962 B1 | 6/2003 | Afshari |
| 6,611,726 B1 | 8/2003 | Crosswhite |
| 6,718,214 B1 | 4/2004 | Schoettle et al. |
| 6,778,882 B2 | 8/2004 | Spool et al. |
| 6,785,592 B1 | 8/2004 | Smith et al. |
| 6,900,556 B2 | 5/2005 | Provanzana et al. |
| 6,988,092 B1 | 1/2006 | Tang et al. |
| 7,039,532 B2 | 5/2006 | Hunter |
| 7,196,433 B2 | 3/2007 | Yang |
| 7,218,998 B1 | 5/2007 | Neale |
| 7,233,843 B2 | 6/2007 | Budhraja et al. |

(Continued)

OTHER PUBLICATIONS

In the U.S. Patent and Trademark Office, Office Action in re: U.S. Appl. No. 12/915,870, dated May 25, 2011, 17 pages.

(Continued)

*Primary Examiner* — Igor Borissov
(74) *Attorney, Agent, or Firm* — Venable LLP

(57) ABSTRACT

An energy distribution may include a server and one or more databases. The system may communicate with an energy provider to receive energy provider data, at least one information collector to receive information collector data such as individualized energy usage data, customer preferences, and customer or location characteristics, and the one or more databases for receiving data for optimization. The system may calculate a cost of service or avoided cost using at least one of the individualized energy usage data and a system generation cost at a nearest bus. The system may also forecast individualized demand by end-use, individualized demand by location, energy prices, or energy costs. The system may optimize energy distribution, energy use, cost of service, or avoided cost using the forecasted individualized demand by end-use, the forecasted individualized demand by location, the forecasted energy prices, and the forecasted energy costs.

60 Claims, 28 Drawing Sheets

U.S. PATENT DOCUMENTS

| | | |
|---|---|---|
| 7,274,975 B2 | 9/2007 | Miller |
| 7,333,880 B2 | 2/2008 | Brewster et al. |
| 7,406,364 B2 | 7/2008 | Andren et al. |
| 7,412,304 B2 | 8/2008 | Uenou |
| 7,479,712 B2 | 1/2009 | Richert et al. |
| 7,528,503 B2 | 5/2009 | Rognli et al. |
| 7,552,100 B2 | 6/2009 | Chen |
| 7,698,233 B1 | 4/2010 | Edwards et al. |
| 7,715,951 B2 | 5/2010 | Forbes, Jr. et al. |
| 7,783,390 B2 | 8/2010 | Miller |
| 7,873,442 B2 | 1/2011 | Tsui |
| 8,019,697 B2 | 9/2011 | Ozog |
| 2002/0178047 A1 | 11/2002 | Or et al. |
| 2003/0041039 A1 | 2/2003 | Spool et al. |
| 2003/0074110 A1 | 4/2003 | Silverman et al. |
| 2003/0158826 A1 | 8/2003 | Burke et al. |
| 2004/0128266 A1 | 7/2004 | Yellepeddy et al. |
| 2006/0155423 A1 | 7/2006 | Budike |
| 2006/0206240 A1 | 9/2006 | Tsui |
| 2006/0259332 A1 | 11/2006 | Brown |
| 2006/0276938 A1 | 12/2006 | Miller |
| 2007/0271006 A1 | 11/2007 | Golden et al. |
| 2007/0276547 A1 | 11/2007 | Miller |
| 2008/0046387 A1 | 2/2008 | Gopal et al. |
| 2008/0077368 A1 | 3/2008 | Nasle |
| 2008/0167756 A1 | 7/2008 | Golden et al. |
| 2008/0177423 A1 | 7/2008 | Brickfield et al. |
| 2008/0177678 A1 | 7/2008 | Di Martini et al. |
| 2008/0178029 A1 | 7/2008 | McGrane et al. |
| 2008/0281663 A1 | 11/2008 | Hakim et al. |
| 2009/0063257 A1 | 3/2009 | Zak et al. |
| 2009/0091291 A1 | 4/2009 | Woody et al. |
| 2009/0093916 A1 | 4/2009 | Parsonnet et al. |
| 2009/0240380 A1 | 9/2009 | Shah et al. |
| 2009/0240381 A1 | 9/2009 | Lane |
| 2009/0319090 A1 | 12/2009 | Dillon et al. |
| 2010/0004791 A1 | 1/2010 | West et al. |
| 2010/0063643 A1 | 3/2010 | Boss et al. |
| 2010/0094475 A1 | 4/2010 | Masters et al. |
| 2010/0114387 A1 | 5/2010 | Chassin |
| 2010/0138066 A1 | 6/2010 | Kong |
| 2010/0138363 A1 | 6/2010 | Batterberry et al. |
| 2010/0217550 A1 | 8/2010 | Crabtree et al. |
| 2010/0274602 A1 | 10/2010 | Kaufman et al. |
| 2010/0306027 A1 | 12/2010 | Haugh |
| 2010/0318235 A1 | 12/2010 | Moss |
| 2011/0015797 A1 | 1/2011 | Gilstrap |
| 2011/0022242 A1 | 1/2011 | Bukhin et al. |
| 2011/0035071 A1 | 2/2011 | Sun et al. |

OTHER PUBLICATIONS

Hartley et al., "Electricity Demand and Supply in Mexico," Rice University, 2002, pp. 71.

International Search Report issued in counterpart International Application No. PCT/US2010/021074 dated Mar. 2, 2010.

Kralj et al., "An Aspect of Sustainability in the Hospital Maribor-Optimization Supplying of Electricity and Heat Energy," International Journal of Energy and Environment, Iss. 1, vol. 1, 2007, pp. 45-50.

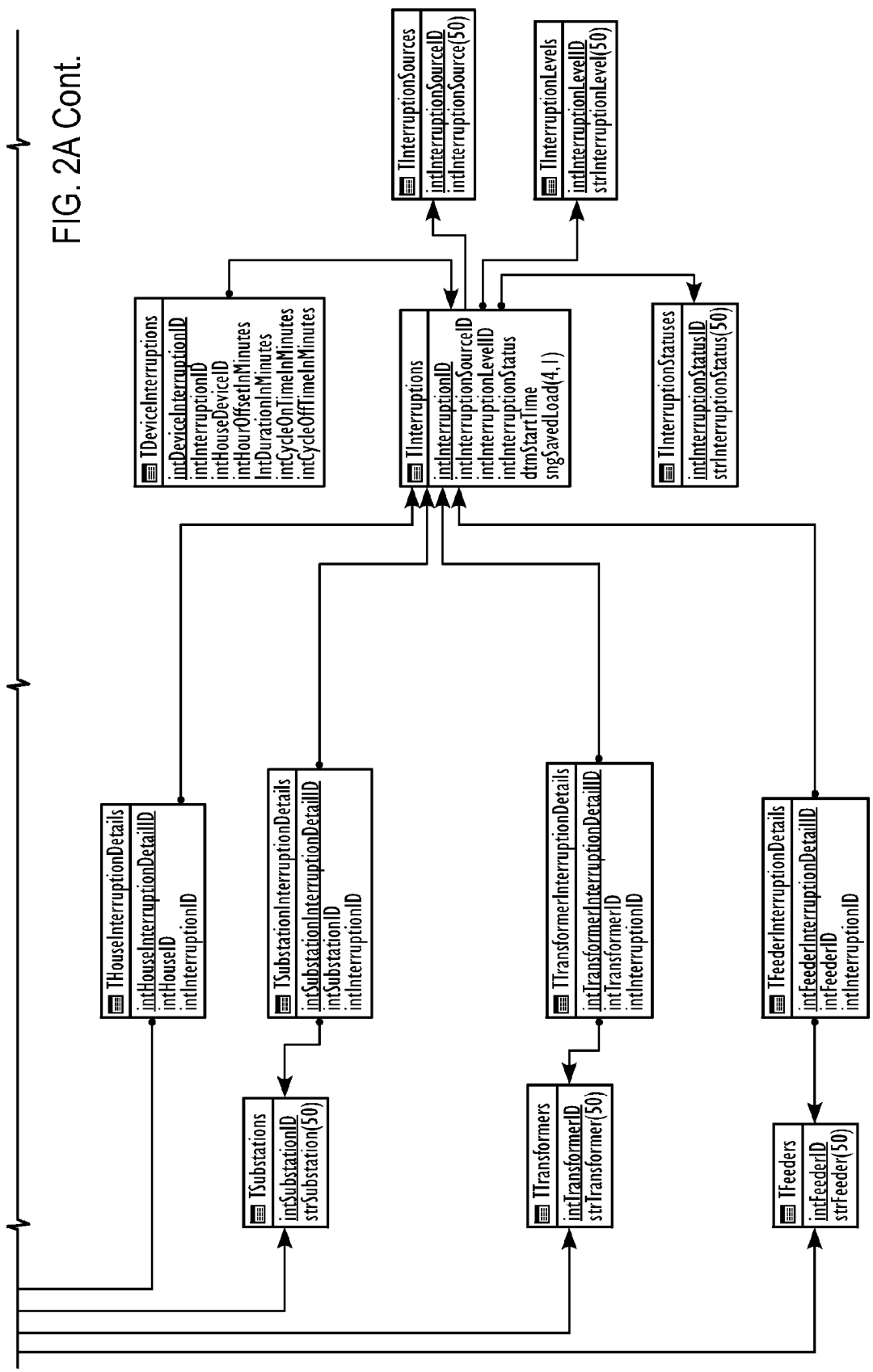

*Peak kW decreases significantly*

OPTIMIZATION OF MICROGRID ENERGY USE AND DISTRIBUTION

CROSS-REFERENCE TO RELATED APPLICATIONS

This application claims the benefit of U.S. Provisional Patent Application No. 61/144,642, filed Jan. 14, 2009, and U.S. Provisional Patent Application No. 61/228,010, filed Jul. 23, 2009; the contents of which are incorporated by reference herein in their entireties.

FIELD OF THE INVENTION

The present invention relates to microgrid technology, and, more specifically, to optimization of energy use and distribution within a microgrid system.

BACKGROUND OF INVENTION

The most common historical methods and processes for reducing peak electric demand involve controlling heating, cooling, or water heating in customer facilities. These control operations may include curtailing, cycling, reduction and/or periodic cessation of particular uses. These control operations are typically performed through voluntary action by customers or through voluntary participation in a utility controlled program.

In prior systems, these control operations were conducted by one way signaling of pre-specified on and off cycles. The commands to cycle on or off were typically directed by the utility. In a typical situation, a single, uniformly-applied dispatching strategy would have been issued. For example, air conditioners may have been instructed to cycle air conditioners off for 30 minutes of 60 possible minutes each hour over the course of the next 4 to 6 hours. These instructions would typically occur during times of extreme peak loads on the utility system. Frequently, customers chose a level of cycling prior to any actual events. For instance, in the previous example air conditioners are cycled off for 50% of an hour. Customers could also choose to cycle off for 75% of an hour, for example, or 45 minutes off out of 60 possible minutes.

During this controlled cycling, energy was reduced during the time of the interruptions, unless the customer's natural on/off cycling of that appliance was less than the utility's desired control. The utility, however, would not consider the relative cycling schedules for similarly situated homes along the same circuit. The utility would not optimize cycling of customers relative to one another along a circuit, nor tie the cycling directly to the intra-hour peak demand of the utility, the localized or customer-specific cost to serve, or the characteristics and avoided costs related to the customers' location on a circuit.

With the advent of "smart grid" technologies, also called "smart home", "smart meter", or "home area network" (HAN) technologies, optimized demand reductions became possible at the end use or appliance level. Smart grid technologies provided the ability to capture real-time or near-real-time end-use data and enabled two-way communication. Smart grid technologies currently exist for at least some percentage of a utility's customer base.

Using smart grid technologies, a system operator can optimally and dynamically dispatch on and off signaling to specific appliances at a customer location given the observed and forecast loads of other appliances on a circuit or system. In these systems, optimally dispatched appliances, end-uses or vehicle loads differ from traditionally dispatched utility supply assets in that traditional supply assets have historically been dispatched based on aggregate-level or system-wide least cost operational principles. The key differences between dispatching supply assets and dispatching appliances are highlighted below.

First, the forced change in an appliance's duty or "on" cycle, via traditional one way signaling, ignored the operations and scheduling of other appliance loads on a circuit. Often, a utility system peak is realized when end-uses, otherwise randomly operating without central control, happen to co-occur or run at the same time during a short period of time. Rather than build supply capacity to meet these randomly occurring events, needs exists to more intelligently choreograph or manage these end uses, relative to each other, yet still provide the desired power and energy to customers such that their comfort, convenience or needs are not compromised. Needs exist for systems that optimally dispatch, schedule and manage how and when these appliance and end uses use energy, conditioned on the observed and forecasted usage of other appliances, such that the overall utility peak and system cost to serve all customers is minimized. Within traditional supply side resource dispatching frameworks, the customer load is given, and supply side resources are dispatched to accommodate this load, without regard for local cost to serve, or the ability to dispatch customer end uses, relative to each other, given a local marginal cost or specific needs or conditions exhibited along the circuit.

Second, traditional supply dispatching decisions valued only the marginal cost changes caused by aggregate supply changes and aggregate demand reduction of one-way signaling. Needs exist for systems that enable the active participation of demands into the supply analysis. Furthermore, if large enough loads are available, needs exist for systems that enable demand control to become a marginal price setter for marginal increments of "supply/demand" decisions. This may lower the marginal capacity or energy cost below the comparable, incremental unit of marginal supply. Further, traditional supply side dispatching systems operate on a single, regional price or cost to serve, often called a Locational Marginal Price or Cost (LMP). This price determines which supply side resources to dispatch within a region. However, this price necessarily reflects an average price within a region, not the local marginal cost to serve a given customer or given end use, nor considerations inherent within the energy distribution system.

Third, in the case of adding a supply side resource, energy still must be transmitted, distributed, and voltage adjusted in the delivery of electrons from a centralized plant to the customer's site. Needs exist for systems which incorporate, and optimally dispatch loads given these distribution costs, and adjust the value obtained from each customer site based on the forecasted losses, distribution costs, or voltage improvements, incurred for each customer, load and day-type. Traditional supply-oriented dispatching systems do not consider, or incorporate, distribution level cost benefits or risks within their dispatching decisions. Similarly, grid-based distribution management systems do not include supply side energy costs in their control systems which attend more toward voltage, reactive power, power factor, primary line losses or capacity inadequacies. As such, needs exist for a more focused attention on integrative systems that incorporate the value, costs and risks inherent in both the supply side and the distribution of electricity through the balanced consideration of demand side and supply side costs, the actual and forecasted cost to serve each home or businesses, and the more precise marginal cost and dispatching decisions, which supply dispatching methods alone cannot achieve.

Historically, previous demand reduction methods have ignored many demand-specific issues and impacts, micro-level marginal cost and value factors (e.g., marginal costs at the networked bus, primary losses, secondary losses, voltage benefits, power factor benefits, deferred localized distribution capacity additions, coordinated load control and scheduling across a circuit to levelize load), customer decision variables (e.g., comfort constraints, price-setting options, over-ride flexibility, behavioral predictions regarding appliance use, desire for bill stability, electric vehicle charging convenience and cost, solar, wind, other distributed generation additions), and the important changes in the marginal cost of supply resources that occur as more and more demand side options or distributed resources are adopted by customers. Needs exist for systems that permit the inclusion and consideration of more complex, robust and more customer-focused and location-focused sources for managing the supply/demand/delivery energy balance, which reflects both price and non-price customer behavior influences, in addition to the traditional options.

Needs exist for systems that provide near real-time appliance control and coordination not only relative to each other, to achieve least cost operational utility needs, but also relative to emerging resources such as wind, solar, storage batteries, distributed generation or electric vehicles, among others. Here, these emerging resources are often characterized by many units dispersed locally, in contrast to traditional supply resources which are more centralized and larger. Given the increasing emergence of these smaller, localized, widely distributed resources, the importance and value of coordinated dispatch, of load-leveling subject to energy reductions, or of dispatching these distributed resources in an optimal least cost manner becomes increasingly important. The development of microgrid-specific algorithms that incorporate the real-time coordination of dispatchable customers' loads, over widely dispersed locales in greater number, and in conjunction with distributed storage (stand alone batteries and/or batteries in plug-in hybrid electric vehicles) and distributed generation, including, but not limited to, renewable sources, requires more comprehensive and sophisticated dispatching solutions and systems to accommodate these emerging complexities.

Needs exist for systems that provide more automated control and support to customers, such that they can participate in energy conserving behaviors without requiring them to continually attend to utility-issued hourly, daily or other time of use price signals. Traditionally, utility sponsored time of use pricing promotions do not exhibit wide participation among customers, or require frequent monitoring by customers, to achieve bill savings or energy reductions. Needs exist for systems which enable customers to set desired bill savings, desired energy reduction, and then not be required to attend to these settings continually. Rather, any perceived reduction in comfort, convenience or savings achieved can be overridden or changed at any time that it is noticed or desirably to change these settings, but that needed systems are constructed such that customers are able to gain the benefits of cost savings and comfort control, without having to constantly monitor the system.

Needs exist for customers to reduce the natural volatility in their monthly electricity bills, primarily caused by varying weather conditions from month to month. Systems are desired that are able to lock in a targeted bill amount for a given time period, and either directly control customer appliances to achieve that end, or issue messages and communication to customers regarding their progress, or lack thereof, against this targeted bill, during that time period.

SUMMARY OF INVENTION

Certain embodiments of the present invention may provide a system for near real-time, micro level energy optimization. A system may include a server and one or more databases, the server operating in near real-time. The system may communicate with an energy provider that supplies energy to a plurality of customers to receive energy provider data, at least one information collector to receive information collector data including at least one of individualized energy usage data, customer preferences, and customer or location characteristics from the at least one information collector, and the one or more databases to receive data for optimization from the one or more databases. The system may calculate a cost of service or avoided cost for at least one of the plurality of customers or customer locations using at least one of the individualized energy usage data and a system generation cost at a nearest bus. The system may forecast at least one of individualized demand by end-use, or individualized demand by location for at least one of the plurality of customers or customer locations, or energy prices and energy costs. The system may also optimize energy distribution, energy use, the cost of service, or avoided cost using at least one of: the forecasted individualized demand by end-use, the forecasted individualized demand by location, the forecasted energy prices, and the forecasted energy costs. Interaction between the calculating, forecasting and optimizing may allow management and dispatch of end-uses and energy supply at a micro level in near real-time.

In certain embodiments, the at least one information collector may be a third party vendor, and the individualized energy usage data is end-use level information collected through a home area network system. The at least one information collector may be a third party vendor, and the individualized energy usage data is site-level information collected through a smart meter. The at least one information collector may be a fourth party vendor, wherein at least one of the plurality of customers or customer locations are not part of a third party vendor customer base.

In embodiments of the present invention, near real-time may be a five minute interval or less. The individualized energy usage data may be available at an end-use level and the customer preferences are received for each end-use from each of the plurality of customers or customer locations. The customer preferences may include additional data selected from the group consisting of: customer willingness to have the end-use interrupted, customer willingness to have the end-use managed, customer willingness to have the end-use scheduled, desired bill levels, and combinations thereof.

The optimizing may also consider data selected from the group consisting of: the customer preferences, the customer or location characteristics, customer overrides, compliance histories, end-use information, end-use usage history, billing information including rates, historical individualized demand, historical and forecasted weather, historical and forecasted avoided costs by each of the plurality of customers or customer locations for commodity and non-commodity cost of service factors, historic and forecasted renewable generation, storage system capacity, storage charge and discharge rates, battery capacity, battery charging and discharge rates, vehicle arrival times, battery fill preferences, battery fill forecasts, desired bill levels, customer management settings per month, customer responses to prior program offerings, research surveys, satisfaction and behavioral/choice preferences, required energy reductions, required demand reductions, and combinations thereof.

The energy provider data may include overall energy usage data, required energy reductions, required demand reductions, cost of energy data, and data regarding distribution of energy. The system may also receive an actual system generation cost from the energy provider or a locational marginal cost of energy from an independent system operator for a bus in near real-time. Forecasting the system generation cost at a bus or locational marginal cost at a bus may use at least one of the following separate, interactive, non-linear, or moving average terms: temperature, humidity, wind speed, time of day, day of week, month indicator variables, past values of the locational marginal cost at a bus, with parameters estimated wherein $$\phi(L)[(1-L)(LMP_t - X_t\beta)] = \theta(L)\epsilon_t$$

Where $$L^j LMP_t = LMP_{t-j}$$

$$\phi(L) = 1 - \phi_1 L - \phi_2 L^2 - \ldots - \phi_p L^p$$

$$\theta(L) = 1 - \theta_1 L - \theta_2 L^2 - \ldots - \theta_q L^q.$$

The system generation cost may be forecast for a bus using data including: generation units, system load, load on the bus, load on other buses, transmission capacity characteristics, microgrid distributed generation, and power flows. The system generation cost at a bus may be forecast in near real-time using: forecasted weather conditions, forced outage and transmission congestion inputs, generation units, forecasted system load, microgrid distributed generation forecasts, forecasted demand reductions, and a forecasted load at the bus.

Embodiments of the present invention may include receiving distributed generation data in at least near real time and/or receiving distributed storage data in at least near real time.

The calculating cost of service or avoided cost may use one or more of the following: primary line losses; secondary line losses; one or more voltage adder; marginal distribution capital costs; a shaping premium; a swing premium; a capacity premium; ancillary services costs; non-commodity and non-distribution related adders; and combinations thereof.

The forecasting of individualized demand by end-use or individualized demand by location may use inputs selected from the group consisting of: load prediction; weather forecasts; risk given load uncertainty; customer compliance forecasts; customer probability of override forecasts; time of day effects; day of week effects, and combinations thereof.

The optimizing may also use at least one of: the energy provider data, the information collector data, and the data for optimization.

In certain embodiments, the optimizing may include at least one of: maximizing revenue of the energy provider, minimizing customer discomfort, maximizing avoided costs, minimizing incentive costs, minimizing cost to provide and deliver power, and combinations thereof, while achieving a required total demand reduction or total energy reduction. The optimizing may use an incentive, the cost of service or avoidable cost, energy rates, the forecasted individualized demand by end-use, total time of current interruption or scheduling event, each customers' preferences for interruptions by end-use, total time each customer can be interrupted or rescheduled, probability that each customer will override an interruption, a total allowed number of controls per customer per time period, a maximum cycling for an end-use, soft and hard costs associated with controlling each of the plurality of customers, costs that vary by end-use, cycling of the end-use within lower and upper bounds, maintaining a predetermined level of end-use settings, end-use cycling constraints based on manufactured limits, staggering end-use starts, and combinations thereof. The optimizing may be represented as:

$$\text{Max} \sum_{i \in I} \sum_{j \in J} \sum_{h \in H} (R_{ih} \text{Demand}_{ijh}(1 - X_{ijh}) -$$
$$(I_{ijh} \text{Demand}_{ijh} X_{ijh} + \text{COS}_{it} \text{Demand}_{ijh}(1 - X_{ijh})))$$

s.t.

$$\sum_{h \in H} X_{ijh} \leq \text{Hours}_{ij}$$

$$i \in I, j \in J$$

$$0 \leq X_{ijh} \leq UB_{ijh}$$

$$i \in I, j \in J, h \in H$$

$$\sum_{i \in I} \sum_{j \in J} \text{Demand}_{ijh} X_{ijh} = \text{Reduction}_h$$

$$h \in H$$

In certain embodiments, the optimizing may include minimizing a total system peak demand during a period over the plurality of customers or customer locations subject to end-use kWh requirements and total kWh demand for each of the plurality of customers or customer locations. The optimizing may use the forecasted individualized demand by end-use, the forecasted individualized demand by location, and a real power of each end-use for the plurality of customers or customer locations. The optimizing may be represented as:

$$\text{Min} P$$

s.t.

$$\sum_{t \in T} X_{ijth} RP_j = \text{Demand}_{ijh}$$

$$i \in I, h \in H, j \in HVAC$$

$$\sum_{t \in T} \sum_{h \in H} X_{ijth} RP_j = \sum_{h \in H} \text{Demand}_{ijh}$$

$$i \in I, j \in J \neq HVAC$$

$$P \geq \sum_{n \in N} N\text{Demand}_{nh} + \sum_{i \in I} \sum_{j \in J} X_{ijth} RP_j$$

$$t \in T, h \in H$$

In certain embodiments, the optimizing may include maximizing revenue, minimizing a total energy provider cost to provide and deliver energy, or maximizing avoided costs during a period over a plurality of customers or customer locations subject to end-use kW requirements and total kWh demand for the plurality of customers or customer locations during the period. The optimizing may use the forecasted cost of service or avoided cost, an energy rate, a real power of end-uses, and the forecasted individualized demand by end-use. The optimizing may be represented as:

$$\text{Max} \sum_{h \in H} \sum_{i \in I} \left( R_{ih} - \sum_{t \in T} \text{COS}_{ith} \sum_{j \in J} (X_{ijth} \cdot RP_j) \right)$$

s.t.

$$\sum_{t \in T} X_{ijth} \cdot RP_j = \text{Demand}_{ijh}$$

$$i \in I, j \in J, h \in H.$$

In certain embodiments, the optimizing may include maximizing avoided cost, minimizing total cost to serve and deliver, or maximizing revenue subject to a predetermined individualized bill level set in advance by each customer for a period. The optimizing may use the forecasted cost of service or avoidable cost, an energy rate, a forecasted non-dispatchable energy demand for each of the plurality of customers or customer locations for the period, the forecasted individualized demand by end-use, and a predetermined bill level for each of the plurality of customers or customer locations. The optimizing may be represented as:

$$\text{Max} \sum_{h \in H} \sum_{t \in T} (R_{ht} - \text{COS}_{ht}) \cdot \left( \sum_{j \in J} (\text{Demand}_{jth} \cdot X_{jth}) + \text{NonDisp}_{th} \right)$$

s.t.

$$\sum_{h \in H} \sum_{t \in T} \left( \left( \sum_{j \in J} X_{jth} \cdot \text{Demand}_{jth} \right) + \text{NDisp}_{th} \right) \cdot R_{th} = \text{Bill Target}$$

$$0 \leq X_{jth} \leq UB_{jth}$$

$$j \in J, t \in T, h \in H.$$

In certain embodiments, the optimizing may include minimizing renewable generation volatility subject to a generation level during a period and storage system capacity. The optimizing may use a power output of a distributed storage system, a power output of a distributed generation source sent to the distributed storage system, a power generation from the distributed generation source, a storage level of the distributed storage system, an initial storage level of the distributed, and storage system charge and discharge rates. The optimizing may be represented as:

Max PVBatt
s.t.

$$PV\text{Batt} \leq PV\text{Out}_t + \text{BattOut}_t, t \in T$$

$$PV\text{Out}_t = PV\text{Gen}_t - PV\text{In}_t, t \in T$$

$$\text{BattLvl}_{t+1} = \text{BattLvl}_t + PV\text{In}_t - \text{BattOut}_t, t \in T$$

$$\text{BattLvl}_{t=0} = K$$

$$\text{BattCap} \geq \text{BattLvl}_t, t \in T$$

Where:
PVBatt is power output of a distributed generation and distributed storage system
PVOut$_t$ is power from the distributed generation that is sent out to an energy distribution system at time t
PVIn$_t$ is power from the distributed generation that is sent out to the distributed storage at time t
PVGen$_t$ is power generation from the distributed generation at time t
BattLvl$_t$ is a storage level of the distributed storage at time t
BattOut$_t$ is power from the distributed storage sent out to the energy distribution system at time t
BattLv$_{t=0}$ is an initial storage level of the distributed storage set to a value K
BattCap is the capacity of the distributed storage.
The optimizing may be represented as:

$$\text{Max} \sum_{i \in I} \sum_{t \in T} (R_{it} \text{Dmd}_{it}(X_{it}) + LMP_t BtG_t + LMP_t PVtG_t) - I_{it} \text{Dmd}_{it}(1 - X_{it}) -$$

$$LMP_t GtB_t - PVC_t PV\text{Gen}_t - (LMP_t GtB_t + BtC_{it} + PVtC_{it}) \cdot (1 + \text{COS}_{it})$$

s.t.

$$\text{Dmd}_{it} X_{it} = PVtC_{it} + BtC_{it} + GtC_{it}$$

$$t \in T, i \in I$$

$$PV\text{Gen}_t = PVtB_t + PVtG_t + \sum_{i \in I} PVtC_{it}$$

$$t \in T$$

$$\text{BattLvl}_{t+1} = \text{BattLvl}_t + PVtB_t + GtB_t - BtG_t - \sum_{i \in I} BtC_{it}$$

$$t \in T$$

$$\text{BattLvl}_{t=0} = K$$

$$\text{BattCap} \geq \text{BattLvl}_t$$

$$t \in T$$

Where:
$R_{it}$ is a cost charged to customer i in time t for energy
$\text{Dmd}_{it}$ is demand for energy for customer i at time t
$X_{it}$ is a fraction of period t to supply energy to customer i
$LMP_t$ is Locational Marginal Cost at a distributed storage and a distributed generation
$BtG_t$ is sales of power at time t from distributed storage to an energy distribution system
$PVtG_t$ is sales of power at time t from the distributed generation to the energy distribution system
$I_{it}$ is an incentive offered by the energy provider to customer i to curtail customer power during time t
$\text{COS}_{it}$ is a cost to serve adder associated with moving electricity from a substation to customer i during period t
$GtC_{it}$, $BtC_{it}$, and $PVtC_{it}$, are the power from the energy distribution system, the distributed storage, and the distributed generation, respectively, to meet customer i's demand during period t
$PVB_t$ is power from the distributed generation sent out to the distributed storage for storage at time t
$PV\text{Gen}_t$ is power generation from the distributed generation at time t
$\text{BattLvl}_t$ is a storage level of the distributed storage at time t
$GtB_t$ is power sent from the energy distribution system to the distributed storage for storage at time t.
$\text{BattLv}_{t=0}$ is an initial storage level of the distributed storage set to a value K
BattCap is the capacity of the distributed storage.
The optimizing may be represented as:

$$\text{Max} \sum_{i \in I} \sum_{t \in T} (R_{it} \text{Dmd}_{it}(X_{it}) + LMP_t BtG_t + LMP_t PVtG_t) - LMP_t GtB_t -$$

$$PVC_t PV\text{Gen}_t - (LMP_t GtB_t + BtC_{it} + PVtC_{it}) \cdot (1 + \text{COS}_{it})$$

s.t.

$$\text{Dmd}_{it} X_{it} = PVtC_{it} + BtC_{it} + GtC_{it}$$

$$t \in T, i \in I$$

$$\sum_t \text{Dmd}_{it} X_{it} = \sum_t \text{Dmd}_{it}$$

$$i \in I$$

$$PV\text{Gen}_t = PVtB_t + PVtG_t + \sum_{i \in I} PVtC_{it}$$

$$t \in T$$

$$\text{BattLvl}_{t+1} = \text{BattLvl}_t + PVtB_t + GtB_t - BtG_t - \sum_{i \in I} BtC_{it}$$

$$t \in T$$

$$\text{BattLvl}_{t=0} = K$$

$$\text{BattCap} \geq \text{BattLvl}_t$$

$$t \in T$$

Where:

$R_{it}$ is a cost charged to customer i in time t for energy $Dmd_{it}$ is demand for energy for customer i at time t $X_{it}$ is a fraction of period t to supply energy to customer i $LMP_t$ is Locational Marginal Cost at a distributed storage and a distributed generation $BtG_t$ is sales of power at time t from distributed storage to an energy distribution system $PVtG_t$ is sales of power at time t from the distributed generation to the energy distribution system $COS_{it}$ is a cost to serve adder associated with moving electricity from a substation to customer i during period t $GtC_{it}$, $BtC_{it}$, and $PVtC_{it}$, are the power from the energy distribution system, the distributed storage, and the distributed generation, respectively, to meet customer i's demand during period t $PVB_t$ is power from the distributed generation sent out to the distributed storage for storage at time t $PVGen_t$ is power generation from the distributed generation at time t $BattLvl_t$ is a storage level of the distributed storage at time t $GtB_t$ is power sent from the energy distribution system to the distributed storage for storage at time t.

$BattLv_{l_{t=0}}$ is an initial storage level of the distributed storage set to a value K BattCap is the capacity of the distributed storage.

In certain embodiments, the optimizing may include maximizing revenue, minimizing total cost to provide and deliver power, or maximizing avoided costs during a period over a plurality of customers or customer locations, a plurality of distributed generation sources and a plurality of distributed storage systems. The optimizing may use an energy rate during the period, the forecasted individualized demand by end-use, a forecasted individualized locational marginal cost of energy at each of the plurality of distributed generation sources and each of the plurality of distributed storage systems, incentives, the forecasted individualized cost of service or avoidable cost, forecasted power generation from each of the plurality of distributed generation sources, and the initial storage level of each the plurality of the distributed storage systems.

The optimizing may consider uncertainty in forecast variables. The uncertainty may use a conditional value at risk to incorporate, and provides for least cost planning dispatching solutions applied to end-uses, distributed storage, ancillary services, allocations of cost of service adders or premiums, and combinations thereof.

In certain embodiments, the system may send instructions for enacting results of the optimizing.

In certain embodiments, forecasting daily energy prices may be represented as:

$$P_t^D = f_1(\vec{P}_t, \vec{W}_t, \vec{Y}_t, \vec{X}_t, \epsilon)$$

Where $f_1$: is an underlying regression function $P_t^D$ is a daily average electricity price of day t $\vec{P}_t$: is a past daily average electricity price vector at day t $\vec{W}_t$: is a past weather condition vector at day t $\vec{Y}_t$: is a seasonality variables vector at day t $\vec{X}_t$: is other independent variables vector at day t $\epsilon_t$: is a white noise error terms at day t.

In certain embodiments, the system may forecast a forward cost of energy represented as:

$$LWFCE = \sum_t^T \frac{1}{\left(\sum_i^{n_t} Q_i + \sum_j^{m_t} Q_j\right)} \left(P_t \cdot \sum_i^{n_t} Q_i + OP_t \cdot \sum_j^{m_t} Q_j\right)$$

Where

LWFCE is a load weighted forward cost of energy $n_t$ is peak hours in month t $m_t$ is off-peak hours in month t T is total months in the term of a contract $Q_i$ is energy demand in peak hour i $Q_j$ is energy demand in off-peak hour j $P_t$ is a monthly forward peak price $OP_t$ is a monthly forward off-peak price.

In certain embodiments, the system may communicate with at least one of the plurality of customers or customer locations through a customer portal. The system may communicate with the energy provider though a utility portal.

Certain embodiments of the present invention may provide a method for near real-time, micro level energy optimization. A processor may process in near real-time. The method may communicate with an energy provider that supplies energy to a plurality of customers to receive energy provider data, at least one information collector to receive information collector data including at least one of individualized energy usage data, customer preferences, and customer or location characteristics from the at least one information collector, and the one or more databases to receive data for optimization from the one or more databases. The method may calculate a cost of service or avoided cost for at least one of the plurality of customers or customer locations using at least one of the individualized energy usage data and a system generation cost at a nearest bus. The method may forecast at least one of individualized demand by end-use, or individualized demand by location for at least one of the plurality of customers or customer locations, or energy prices and energy costs. The method may also optimize energy distribution, energy use, the cost of service, or avoided cost using at least one of: the forecasted individualized demand by end-use, the forecasted individualized demand by location, the forecasted energy prices, and the forecasted energy costs. Interaction between the calculating, forecasting and optimizing may allow management and dispatch of end-uses and energy supply at a micro level in near real-time.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention.

DETAILED DESCRIPTION OF THE EMBODIMENTS

Figure 1:
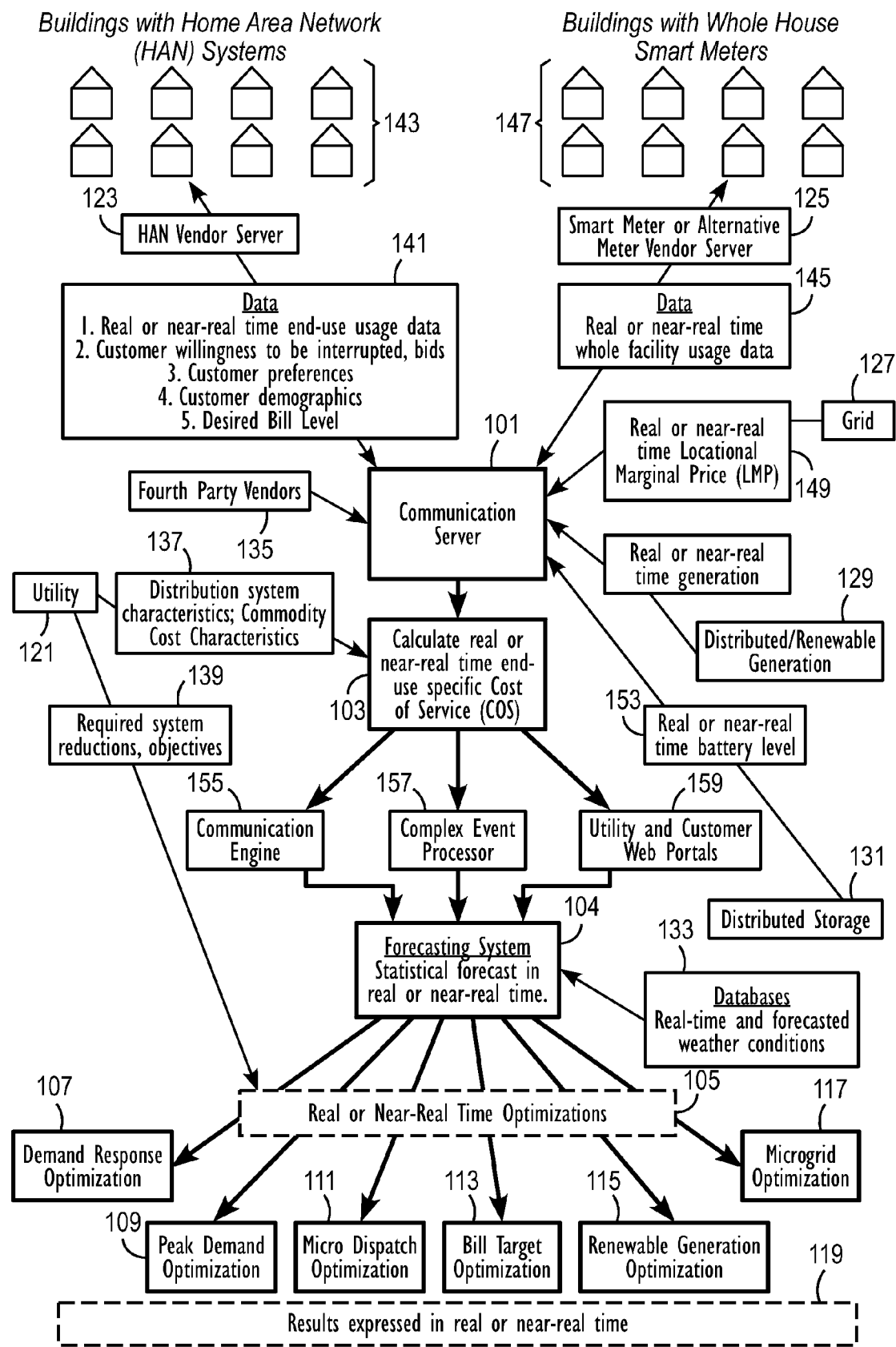
FIG. 1 is a schematic of an overall system, according to one embodiment of the present invention.

The following systems and methods may provide reliable, least cost electricity to households and businesses.

Embodiments of the present invention may include several aspects. Embodiments may provide a process and method for jointly (1) forecasting, (2) optimizing and (3) costing the management and dispatch of ends uses and energy supply at a (4) micro level in (5) near real time. The confluence of these functions, when combined together and focused at a micro level energy application, in near real time, may provide significant cost savings and efficiencies beyond the traditional utility focus which tends to use aggregated loads, average or non-customer specific costs, and is not able to adjust end use demands in near real time. The micro level is preferably an end-use level, in contrast to a location level.

First, traditionally, electric energy providers have not managed energy using (1) forecasted loads within a home, at (4) the micro or end-use level. Rather, decisions regarding energy management depended upon observable aggregations of loads across many homes. As such, the optimal energy management decisions were only based on aggregate forecasts, and typically dispatched a supply resource to balance demand and supply in real time. In those few cases where energy providers manipulated demands directly (e.g., demand response) or through pricing (e.g., critical peak pricing), the application of the end use management operation did not vary by customer, did not depend on the unique cost to serve a given customer, and the operational management of these end uses did not change in near real time. At most, end-use might have been cycled off for a period of time per hour, or for a sequential number of hours. But historical operations of end use control, or dispatching, have not considered or leveraged the advantages of a near real time dispatch where unique dispatching signals and solutions are individually issued to specific customer end uses, the optimal solution of which is to be determined by unique cost values ascribed to the targeted loads. Hence, embodiments of the present invention uniquely and directly manage end-uses and distributed generation in near real time, based on individualized avoided cost estimates, such that an optimal set of dispatching instructions is derived and executed within a microgrid area, thereby creating greater cost savings and efficiencies than can be achieved using the more traditional aggregate level operation.

Second, embodiments of the present invention may provide the ability to more efficiently manage loads by focusing the (2) optimization at the (4) micro or end-use level in (5) near real time, which includes the end use level or premise level and the local contribution from distributed generation. Traditionally, energy providers have used optimization tools to determine which supply side resource to dispatch, given an aggregate load within a region. However, doing so at the micro level is uniquely more complicated and, if executable, may lead to greater cost savings and efficiencies than the traditionally aggregated view which emphasized the management of supply more than the optimal balancing of demand and supply simultaneously, as contemplated by embodiments of the present invention. The traditional aggregated approach may not be able to lower costs as effectively as the micro level system because of its lack of consideration of the benefits of direct, near real time control over end uses or demand, the cost of serving that end use or customer over time, or the benefit of optimally issuing uniquely determined dispatching signals in near real time to both end use demands and locally placed generation.

Third, embodiments of the present invention may provide the ability to better manage costs (3) by virtue of a certain method for estimating the unique cost to serve different loads over time. Traditional energy provider dispatching and supply management systems do not consider the long term cost to provide energy, nor the avoided costs that exist in delivery less power, or reducing loads, at specific locations. Embodiments of the present invention may provide more value to energy providers related to lowering overall utility costs, more so than has been achieved from traditional systems that emphasize supply costs over delivery costs, or that emphasize short run marginal costs over long run costs to serve power. Within this system, micro level, locational, cost analysis methods are provided which interface directly, and uniquely, with the forecasting and optimization processes, and which may provide an innovative and unique method for more appropriately valuing the costs and risks of serving loads within a region served by a bus, or collection of buses.

Fourth, embodiments of the present invention may operate within a microgrid area (4), or a group of customers or loads, served by a bus, or collection of buses. Because the system uniquely focuses on the near real time (5) dispatching and scheduling of end uses, the value of its combined forecasting and optimization is enhanced. Here, the system optimally determines which end uses to shift, schedule, interrupt, dispatch or force on, to obtain the maximum avoided cost savings to the utility. Without this micro level perspective, only aggregate level solutions are achievable.

Fifth, the system operates in near real time (5) uniquely updating the forecasts (1), the avoided costs (3), and the resulting optimal dispatching solution (2). The confluence of these functions, applied at a micro end use level (4), may be necessary to achieve the described system benefits. Traditionally, supply side dispatching systems have emphasized the dispatch of supply, given observed load. The new system uniquely alters the load, in near real time, such that the overall aggregate load serving function may be more efficient and achieved at lower cost.

As will be appreciated by one of skill in the art, aspects of the present invention may be embodied as a method, data processing system, or computer program product. Accordingly, aspects of the present invention may take the form of an entirely hardware embodiment or an embodiment combining software and hardware aspects, all generally referred to herein as system. Furthermore, elements of the present invention may take the form of a computer program product on a computer-usable storage medium having computer-usable program code embodied in the medium. Any suitable computer readable medium may be utilized, including hard disks, CD-ROMs, optical storage devices, flash RAM, transmission media such as those supporting the Internet or an intranet, or magnetic storage devices.

Computer program code for carrying out operations of the present invention may be written in an object oriented programming language such as JAVA, C#, Smalltalk or C++, or in conventional procedural programming languages, such as the Visual Basic or "C" programming language. The program code may execute entirely on the user's computer, partly on the user's computer, as a stand-alone software package, partly on the user's computer and partly on a remote computer, or entirely on the remote computer. In the latter scenario, the remote computer may be connected to the user's computer through a local area network (LAN) or a wide area network (WAN), or the connection may be made to an external computer (for example, through the Internet using an Internet Service Provider).

Aspects of the present invention are described with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, server, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer, server or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks, and may operate alone or in conjunction with additional hardware apparatus described herein.

Historically, utilities have balanced supply and demand requirements by building plant capacity to meet the instantaneous peak demand (kW) of customers. This strategy, characterized by large capital investment in centralized plant facilities and significant distribution requirements, is a common model within many regulatory state frameworks. In some cases, power providers choose to offer pricing discounts or credits to some customers, during peak cost times, to motivate demand reductions during times where supply is unavailable or very expensive. These systems, however, are not as cost effective or efficient as they could be, due to their over-emphasis on the use supply side resources, with an under-emphasis on the benefits that could be achieved by optimally controlling both supply and demand side resources, simultaneously.

Embodiments of the present invention may include a combination of systems and methods that may balance supply and demand simultaneously, in real or near-real time, such that peak cost times can be minimized or which arbitrage high versus low cost times or locations relative to each others' costs. Real or near-real time may mean a level of approximately 5 minutes or less. Other, longer times may also be used in certain situations. In certain embodiments, speed may only be constrained by the speed of processors and/or network connections and communication conduits. Use of approximately 5 minutes or less may be beneficial because at longer times a customer may not be able to participate in the ancillary services market, which requires responding within 10 minutes to contribute to spinning or supplemental reserve. A system may need a 4 second response for frequency regulation. Further, a system may need one to five minute forecasting to accurately determine usage forecasts and duty cycles, to a point where you can adjust, schedule and optimize without customer noticing. Additionally, the system may need 5 minute or less to be able to arbitrage against 5 minute LMP pricing signal from an independent service operator (ISO). The system may also need minute by minute processing to optimize around other non-participants to level load on a transformer, or section of circuit.

Unlike previous approaches that focus on average prices for a region or system, or aggregate programs with similar dispatching strategies applied to all customers, the systems and methods of the present invention may enable the calculation, optimization and execution of micro-level assignments of demand reduction dispatching. Micro-level assignments of demand reduction dispatching may minimize total demand realized on an asset, whether a secondary transformer, circuit or service area system. This may minimize total utility system costs and level grid capacity. Under these systems and methods, it is not necessary to limit energy sales to achieve desired capacity savings. That being said, the systems and methods may optimize both capacity and energy reduction objectives at the same time, if desired.

Existing systems for balancing demand and supply generally focus on system average prices, but all current systems ignore the micro locational value available when optimally dispatched through a more comprehensive and exhaustive mathematic set of specifications. Furthermore, this combination of methods, procedures and systems can possibly provide a more reliable solution to the general supply and demand balance issue faced by the current centralized provision of electric power. Traditional utility supply systems do not have sufficient storage ability to mitigate high cost peak periods. This is one key reason why utilities are often vertically integrated. Demand and supply must be managed in real time. Embodiments of the present invention may create a type of virtual storage by optimally coordinating micro level end use demands with varied distributed generation resources, in light of the centralized power plant cost structure and demand requirements, such that demand and supply can be more optimally managed from both a supply and a demand perspective, versus the traditional over-reliance on supply side resources.

Embodiments of the present invention are designed to optimize the micro-dispatch of appliances, vehicles, distributed generation, and distributed generation. The optimization may maximize value given customer-established constraints, compliance histories, expected load, forward market prices, weather and regulatory recovery. The optimization generated by embodiments of the present invention is not the same as those typically used to dispatch supply side resources. The avoided marginal cost of dispatching these supply side resources may be one of the input decision variables into a system. The system, however, may also consider the marginal cost and benefit of additional appliance control dispatching at the same time.

Overview of Embodiments of the Present Invention

FIG. 1 shows an exemplary set of relationships between the utility, the customers and other components. As illustrated in FIG. 1, embodiments of the present invention may include several components. Various inputs and/or forecasted values may be shown entering the communication server 101, the forecasting system 104 or optimizations 105. It is noted that inputs and/or forecasted values may be received, processed and/or forecast in any of the various components and may pass through any of the components.

Communication Server

A communication server 101 may include a processor and/or memory. Instructions carried out by the communication server 101 may be processed via one or more processors. The communication server 101 may be vendor neutral. Thus, the communication server 101 may communicate with any vendor using any type of protocol or data format, such as Extensible Markup Language (XML), Transmission Control Protocol/Internet Protocol (TCP/IP), User Datagram Protocol (UDP), proprietary, etc.

The communication server 101 may calculate a real or near-real time end-use specific "cost of service" (COS) 103. The communication server 101 may also statistically forecast at real or near-real-time at a forecasting system 104. Near-real time may include at a time of 5 minutes or less as well as hourly or other time periods. The communication server may forecast, among other factors, dispatchable end-use, whole building usage, "locational marginal price" (LMP), COS, and/or renewable generation. The forecasting system 104 is discussed in detail below under "Components of the Communication Server".

The communication server may perform real or near-real time optimizations 105. The real or near-real time optimizations 105 may be broken down into several sub-optimizations and these sub-optimizations may be executed individually or in combination. The optimizations 105 are discussed in detail below under "Optimizations".

The sub-optimizations may include: demand response optimization 107, peak demand optimization 109, micro dispatch optimization 111, bill target optimization 113, renewable generation optimization 115, and/or microgrid optimization 117. These sub-optimizations are discussed in detail below. Briefly, demand response optimization 107 may minimize or maximize an objective relative to a required reduction. Peak demand optimization 109 may minimize the total system peak demand subject to end-use kWh and total kWh demand. Micro dispatch optimization 111 may maximize revenue subject to end use kW and total kWh demand at a set level, such as five minute level. Bill target optimization 113 may maximize avoided cost subject to a customer's target bill level. Renewable generation optimization 115 may minimize renewable generation volatility subject to generation, battery capacity and demand. Microgrid optimization 117 may maximize avoided cost subject to generation, battery capacity, demand LMP, and COS.

Results of the sub-optimizations 119 may be expressed as customer end-use, distributed/renewable generation, distributed storage, or dispatch signals in real or near-real time, such as at a five minute level.

Therefore, the communication server 101 may draw together a diverse group of data and forecasted values to produce optimizations 105. The results of the optimizations 119 may be instructions for sending to customer locations and/or end uses that optimally dispatch end-uses to produce a desired end results in terms of energy use or cost. Instructions may preferably be sent via the communication server 101 to a HAN vendor server 123 and/or a smart meter or alternative meter vendor server 125 to carry out the instructions. Alternatively, any party may send and/or execute the instructions, such as the utility 121, fourth party vendors 135, etc.

Existing systems do not draw together this diverse set of data and forecasted values into a single optimization system. The optimization system may first gather necessary data and then forecast values that may in turn be used in one or more sub-optimization routines based upon a final goal for energy use and distribution. Data and forecasted inputs are chosen based upon desired goals to efficiently determine energy use and distribution requirements. Energy use, in preferred embodiments, may include consumption of energy by customers. Energy distribution, in preferred embodiments, may include supply of energy by an energy provider.

The communication server 101 may be in contact with several sources, including a utility 121, a HAN vendor server 123, a smart meter or alternative meter vendor server 125, a grid 127, distributed and/or renewable generation 129, distributed storage 131, databases 133, and/or fourth party vendors 135. Collectively, the third party vendors, such as the HAN vendor server 123 and the smart meter or alternative meter vendor server 125, and the fourth party vendors 135 may be referred to as information collectors.

Utility

The utility or energy provider 121 may provide information to the communication server 101 such that the communication server 101 can provide results of optimizations 119. The utility 121 may provide characteristics of a distribution system and/or commodity cost characteristics 137 to the communication server 101 to calculate the COS 103. The utility 121 may also provide required system reductions and/or objectives 139 to the real-time optimizations 105, overall energy usage data, required energy reductions, required demand reductions, cost of energy data, and/or data regarding distribution of energy.

HAN Vendor Server

The communication server 101 may provide real or near-real time, two-way communication point with the HAN vendor server 123. The HAN vendor server 123 may represent and collect data 141 from buildings with HAN systems 143. The HAN vendor may be responsible for equipment that collects real or near-real time information about the electricity use of each customer's end-uses. The real or near-real time information may be taken at intervals of more or less than five minutes. The customer's end uses may include HVAC, water heating, lighting, electric vehicles, plug loads, etc. The real or near-real time information may be sent from the customer buildings with HAN systems 143 to the HAN vendor server 123. The HAN vendor server 123 may then communicate the data 141 to the communication server 101.

The data 141 may include real or near-real time end-use usage data, customer willingness to be interrupted, managed, scheduled and bids, customer preferences, customer demographics, and/or desired bills.

The communication server 101 may also be responsible for sending out control signals to the HAN vendor server 123 based upon the results of the optimizations 119. The control signals may instruct that end-uses are to be shut down to achieve the goals of the optimization. The HAN vendor server 123 may then be responsible for implementing the control signals at the customer location with HAN systems 143.

Smart Meter or Alternative Meter Vendor Server

The communication server 101 may provide real or near-real time communication point with the smart meter or alternative meter vendor server 125, or alternatively, another metered device providing real time or near real time usage measurement, such as a whole house current transducer (CT), or similar metering device which is not a smart meter. For convenience, the term "smart meter vendor" is used herein, but this label does not imply that other, more traditional, metering devices are not feasible for use with the system. In this sense, a smart grid application does not necessarily require a smart meter. Note that a smart meter, itself, is not a necessary component of the system, though the user may choose to use a smart meter to communicate customer usage amounts to the system, and the user may choose to use smart meter data, downloaded periodically to the system, to update customer usage data estimates.

The smart meter or alternative meter vendor server 125 may represent and collect data 145 from buildings with smart meter or alternative meter systems 147. The smart meter vendor may be responsible for equipment that collects real or near-real time information about the electricity use of each customer's building. As with the HAN vendor server, the real or near-real time information may be taken at intervals of more or less than five minutes. The real or near-real time information may be sent from the customer buildings with smart meter systems 147 to the smart meter vendor server 125. The smart meter vendor server 125 may then communicate the data 145 to the communication server 101. The data 145 may include real or near-real time whole facility usage information.

Grid

The grid or energy distribution system 127 may also communicate with the communication server 101. The grid or energy distribution system 127 may communicate real or near-real time locational marginal cost (LMP) 149. LMP is generally a market-pricing approach used to manage the efficient use of a transmission system when congestion occurs on a bulk power grid. LMP may be the cost of supplying the next MW of power considering generation marginal cost, transmission costs, and losses.

Distributed and Renewable Generation

The communication server 101 may also communicate with distributed and renewable generation systems 129. The distributed and renewable generation systems 129 may provide real or near-real time generation data 151.

Distributed Storage

The communication server 101 may also communicate with distributed storage systems 131. The distributed storage systems 131 may provide real or near-real time storage data 153, such as battery levels.

Databases

The communication server 101 may also be in communication with one or more databases 133. The one or more databases may provide and/or store information related to the optimizations 105. For example, a database may provide real or near-real time or forecast weather conditions.

One or more databases 133 may store all the collected data. The data may be stored for many reasons including use as historical data. Historical data may be an important element of the forecasting system 104. The optimizations 105 may be forward looking, so forecasts of end-use demand and cost of service (prices) may be critical. To increase the accuracy of these forecasts, historical data may be used as much as possible. Therefore, this data must be readily accessible to the forecasting module 104 via the database 133.

The one or more databases 133 may store the information necessary to run the forecasting system 104 and/or the optimizations 105. The one or more databases 133 may also be used to populate various data fields in the user interfaces. Specifically, the one or more databases 133 may store customer information, compliance histories, appliance information, appliance usage history, customer preferences, customer profiles, customer overrides, billing information, weather information, customer characteristics, load forecasts, price forecasts, historical and forecast end-use load information for all monitored end-uses, historical and forecast temperatures, humidity, wind speed, historical and forecast avoided costs by customers for both commodity and non-commodity cost of service factors, historical photovoltaic generation, solar storage, solar discharge, electric vehicle charging, electric vehicle discharging, car arrival times, battery fill forecasts, customer preferences for controlling end-uses, bill management settings per month, customer responses to prior program offerings, and other data required to either forecast, value or optimize optimization dispatch signaling. The one or more databases 133 may also be depositories for research surveys, linked to later observed behaviors, satisfaction and behavioral or choice preferences, and used to simplify and improve customer impact measurement, verification and forecasting ability for regulatory compliance, independent system operator (ISO) system dispatching, ancillary service management or integrated resource planning.

Figure 2A:
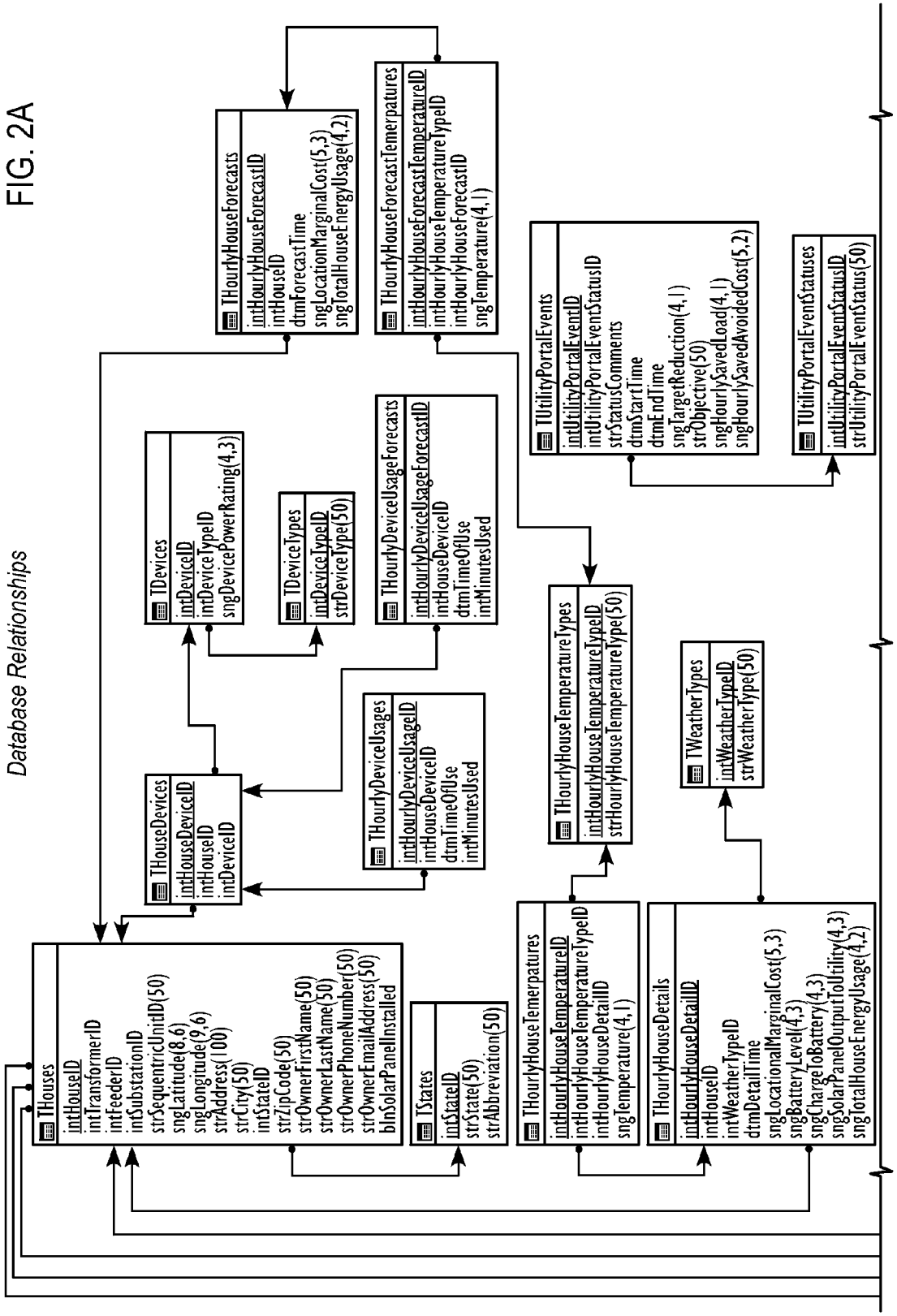
FIGS. 2A-2B show exemplary database relationships that may be used in an embodiment of the present invention.
Figure 2B:
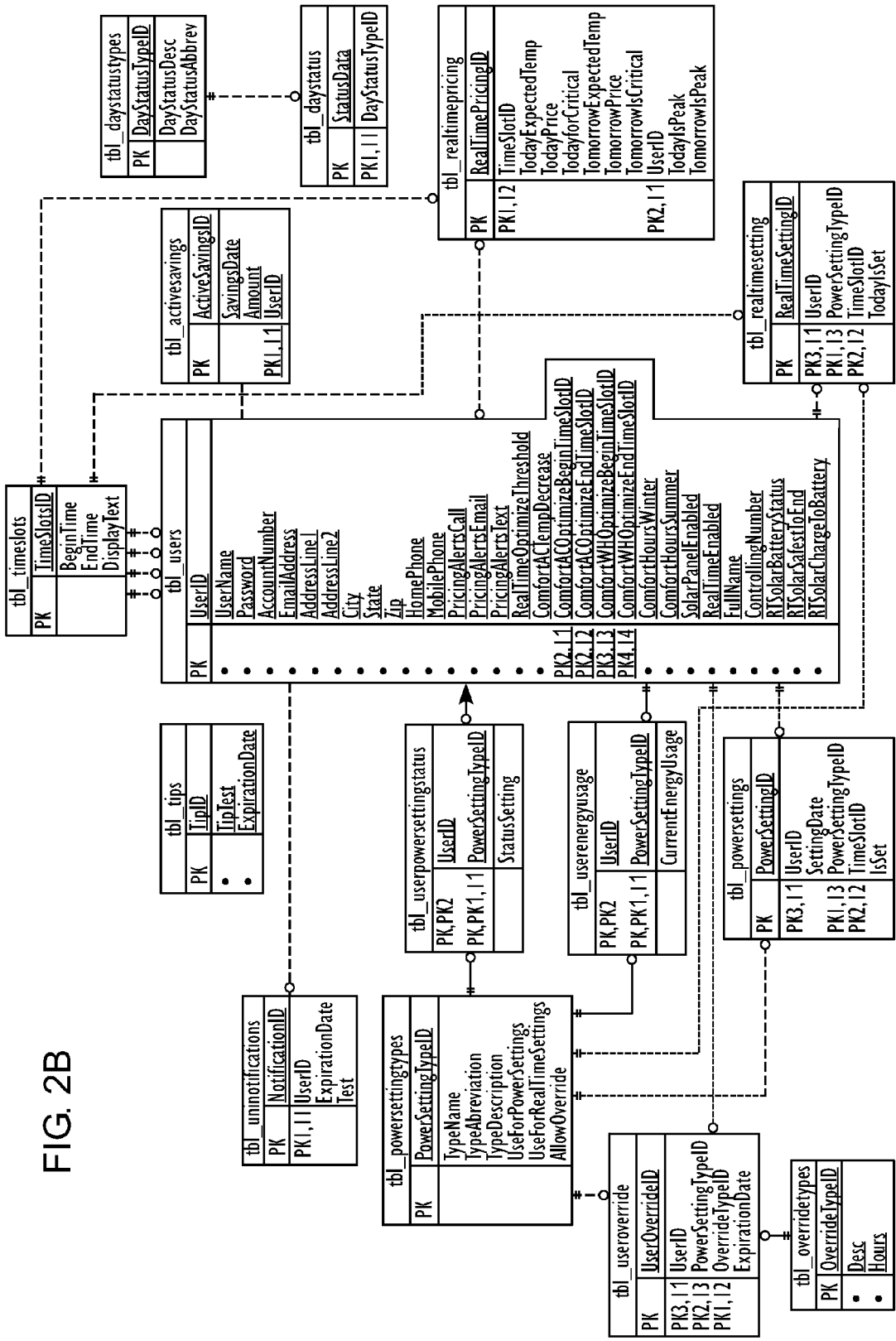

Using pre-case customer input and comparing those inputs to post-case behaviors may enable a more accurate, more valuable and more predictive dispatching execution and implementation. This in turn may allow a user to more precisely target appliances and customers that best meet the users' objectives for peak load reduction, energy conservation, grid management or optimally leveraging distributed resources. Database information may also be used to improve the optimizations 105. FIG. 2A and FIG. 2B show exemplary database relationships that may be used in various embodiments of the present invention. Information stored in the databases may relate to customer locations, end-uses, weather, forecasts, customer preferences, grid data, etc. Databases may be interactive and related by links and/or other references. Databases may be updated periodically, if necessary.

Fourth Party Vendors

The communication server 101 may be in communication with one or more fourth party vendors 135. The one or more fourth party vendors may collect information regarding total premise usage data from customers that include customers that are not part of either the HAN vendor or smart meter vendor customer base. If the HAN vendor or smart meter vendor cannot collect total premise data, then a fourth party vendor 135 may collect necessary information.

Components of the Communication Server

The communication server 101 may include several subcomponents. Components of the communication server 101 may include: a communication engine 155, a complex event processor 157, customer and utility portals 159, the forecasting system 104, and the cost of service (COS) forecasting system 103. The optimizations 105, which also may be run by the communication server 101, are discussed below in the section titled "Optimizations".

Figure 3:
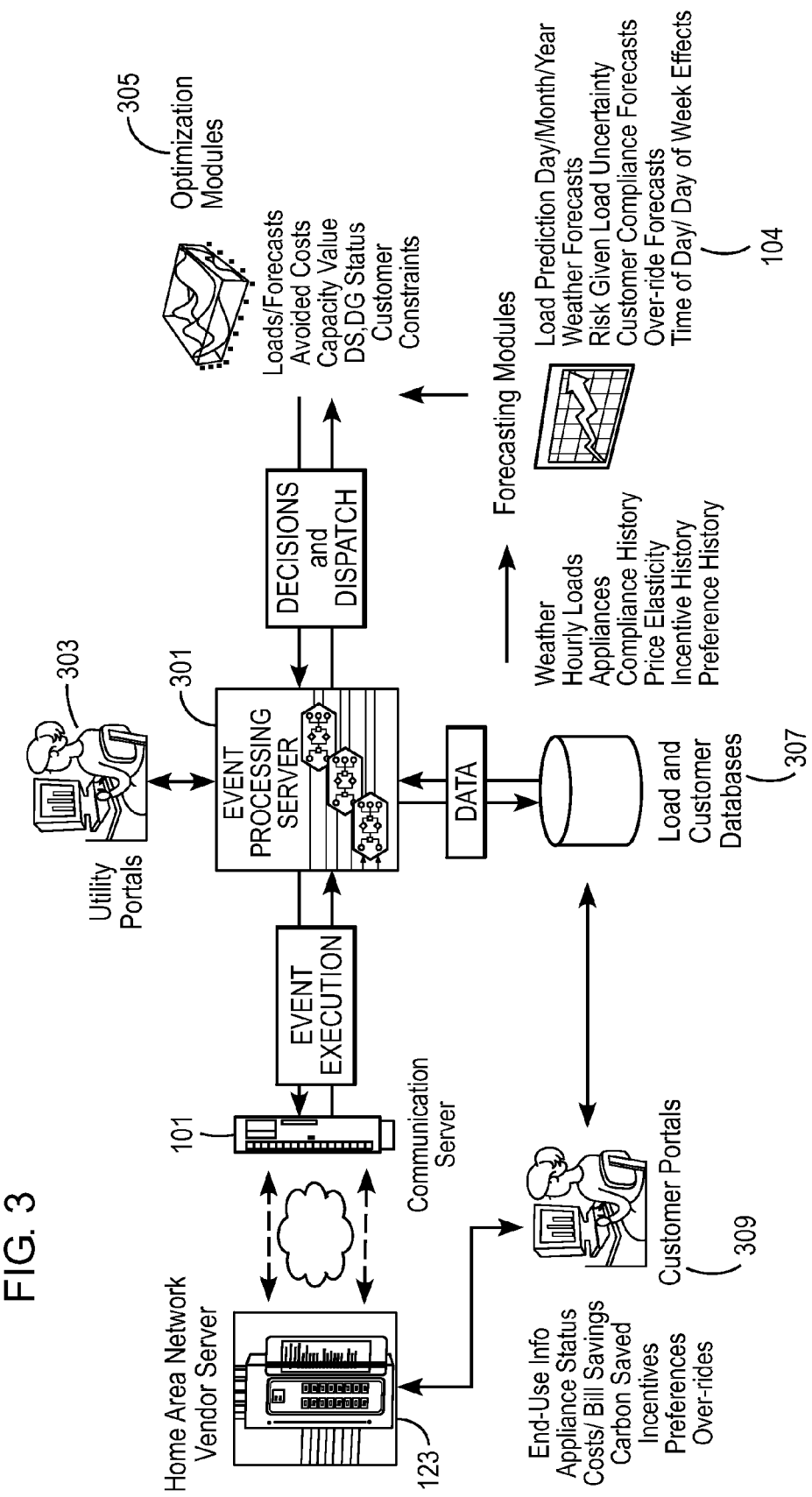
FIG. 3 is a schematic overview of how data flows through the communication server in an embodiment of the present invention.

FIG. 3 is a schematic overview of how data flows through the communication server 101. As shown in FIG. 1, the communication server 101 may communicate with a HAN vendor server 123. The communication server 101 may also communicate event executions with an event processing server 301. The event processing server 301 may be in communication with a utility portal 303, optimization modules 305 and one or more databases 307.

The optimization modules 305 may provide decisions and dispatch to the event processing server 301. The optimization modules 305 may process: loads and forecasts; avoided costs; capacity values; distributed storage and distributed generation status; and/or customer constraints. The optimization modules 305 may receive information from a forecasting system 104. The forecasting system 104 is discussed in more detail below, but may provide: load prediction; weather forecasts; risk given load uncertainty; customer compliance forecasts; override forecasts; and/or time of day and day of week effects. The forecasting system 104 may receive information from the one or more databases 307.

The one or more databases 307 may contain information regarding: weather; hourly loads; appliances; compliance history; price elasticity; incentive history; and/or preference history, among other data. A customer portal 309 may be in communication with the one or more databases 307 and/or the HAN vendor server 123. The customer portal 309 may provide information regarding: end-use information; appliance status; costs and bill savings; carbon saved; incentives; preferences; and/or overrides, among other data.

Figure 4:
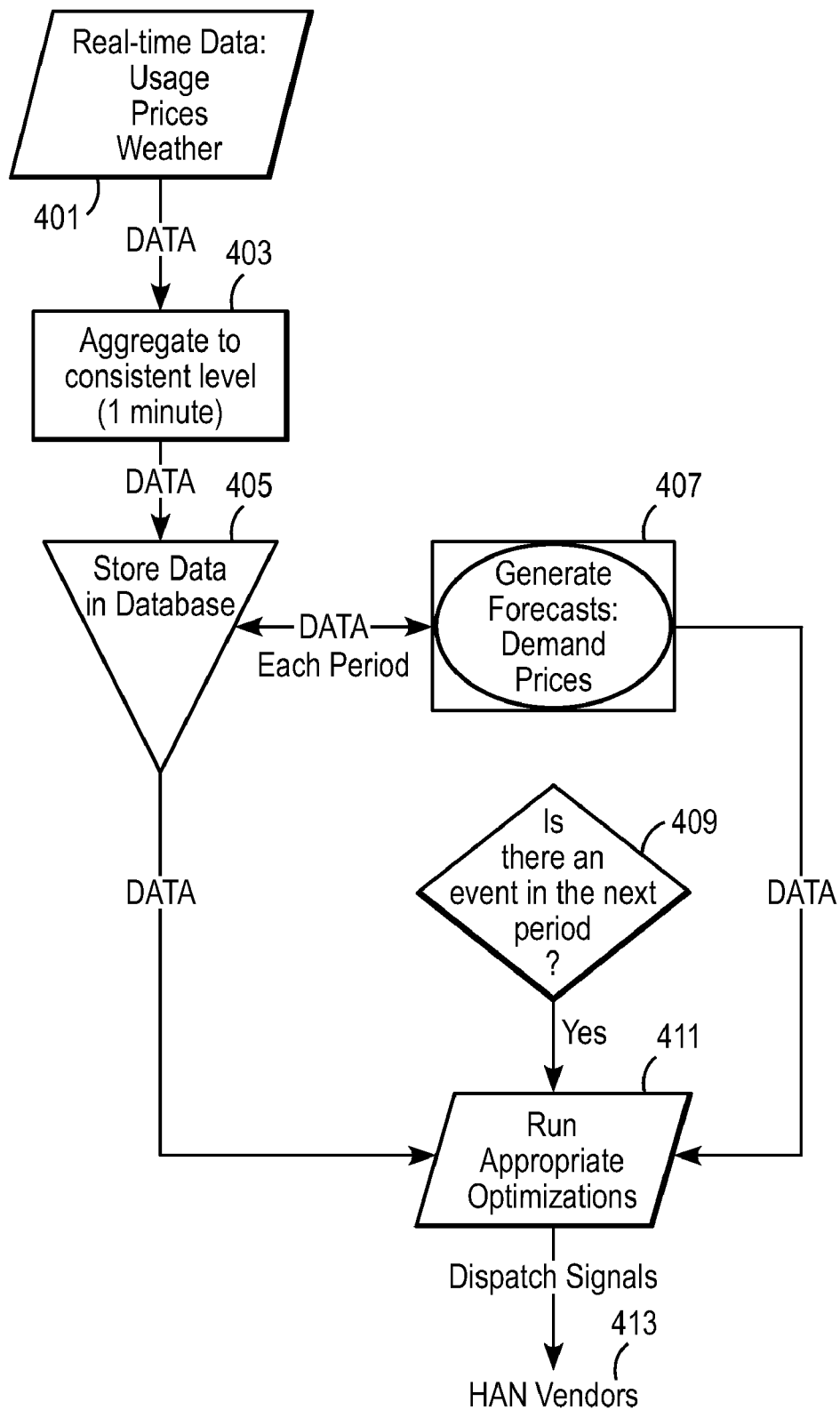
FIG. 4 shows an exemplary path for optimization.

FIG. 4 shows an exemplary path for optimization. Real or near-real time data may be received 401, such as usage, price and weather data. The data may be aggregated to a consistent level 403, such as the one minute level. The data may then be stored in a database 405. For each period data may be exchanged between the database 405 and a forecasting module 407. The forecasting module 407 may generate forecasts of demand and/or prices. A query may be performed to determine if there is an event in the next period 409. If yes, appropriate optimizations may be run 411 using data from the database 405 and forecasting module 407. Dispatch signals may then be sent to HAN vendors 413.

The following is more detailed information regarding various components of the communication server 101.

Communication Engine

One or more communication engines 155 may be housed within the communication server 101. A communication engine 155 may relate to a given grid circuit or substation bus. The communication engine may serve as a direct link between the communication server 101 and any HAN devices that are controlling appliances in the HAN buildings 143.

The communication engine 155 may send, receive and/or acknowledge messages to the HAN vendor server 123 through standard (TCP/IP) protocols, as specified by the HAN vendor, or through other communication conduits as available. The communication engine 155 may be in constant communication with a HAN activity server, and may continually receive data from the appliances in the HAN buildings 143 regarding their current status. The communication engine 155 may receive data from the HAN vendor server 123, and may perform initial processing of the data. Initial processing may include aggregation of sub-second data into minute level data, streaming of data to the complex event processor 157, and conducting frequency drop checks, or other rule-based requirements as specified by the user that are consistent with the capability of the HAN device. The communication engine 155 may also translate dispatch signals from the optimizations 105. The communication engine 155 may translate instructions into a communication format as required by the target HAN devices. The communication engine may communicate with any in-house HAN provider that uses TCP/IP communications, or other non-proprietary communication conduits, or establishes their own communication link to the optimal dispatching signaling capability.

Complex Event Processor

A complex event processor 157 may be a low-latency filtering, correlating, aggregating, and computing system that processes real or near-real time data efficiently. Preferably, the complex event processor 157 may have a latency of about one minute or less. The complex event processor 157 may combine data from many sources quickly and send them to the various other components of the system. The system preferably does not use the complex event processor 157 for extensive real or near-real time analysis of the data. Instead, perhaps preferably, the real-time analysis may be performed in the forecasting system 104 and/or the optimizations 105.

The real or near-real time data being processed through the complex event processor 157 may include: HAN data from the communication server 101; weather data including forecasts; whole building consumption data for HAN and non-HAN household from smart meters or communicated from other wireless communication devices; nodal locational marginal prices (LMP) from independent system operators or the utility; and inputs by customers and the utility via the customer and web portals, respectively.

The complex event processor 157 may handle real or near-real time "traffic control" components. The complex event processor 157 may be used to feed real or near-real time data to the utility and customer portals 159, take data from the complex event processor 157 and store it in the one or more databases 133, call up the forecasting system 104, supply the forecasting system 104 with the required input data, store the forecasting results into the one or more databases 133, call up the optimizations 105 when decisions are required by the utility 121, supply necessary data, confirm and calculate dispatching results, and feeding dispatching results back to the utility 121.

The complex event processor 157 may be scalable up to five million events per second, per server, or more. This may be sufficient to optimally dispatch a region or collection of circuits on several buses, assuming an average of three dispatchable end-uses per customer. Additional system capacity simply requires more servers, or faster complex event processors. Ideally, systems should be architected to minimally include coverage of the analytics for all customers on a given bus, although broader coverage is possible, given complex event processor and processing performance. In this manner, a bus level focus enables the use of a common bus level LMP cost to be used for dispatching customers located on that bus, either from direct signaling from the utility or from an ISO based pricing signal, or other transmission level price signaling. These LMP costs may be generally based on simpler, often quickly derived, linear programming solutions, and for which existing software solutions exist. Note that the CEP/Forecasting/Optimization system may leverage additionally complex and unique customer-specific or location-specific marginal cost differences within its dispatching decisions, beyond the bus level LMP. Where users desire to optimize their dispatching strategies more broadly across multiple buses, and multiple LMPs per bus, in addition to the microgrid level dispatching, a more broadly defined architecture, with additional servers, is necessary.

Ideally, systems should be established individually for circuits radially linked to a bus, with one server dedicated to the peak load management for that bus or collection of circuits. In this manner, nodal level LMP prices can be directly integrated with the system, to ISO based pricing signals, or other transmission level price signaling.

Generally, dispatching at a minute by minute level is sufficient to optimize peak loads on a circuit and obtain desired value optimizations. This may assume market share penetrations of HANs along the circuit of approximately 30% to approximately 50% and minute by minute signaling of the total household or business loads for non-HAN customers is signaled back to the system through the complex event processor 157. Beyond 50% market share penetrations, the value obtained from system operation begins to experience diminishing returns, as the optimally dispatched signals already account for the observed loads of non-participants, and has optimized the loads of participating end uses in concert with these non-participating loads. So, for energy management objectives which pertain only to peak load reduction with constantly maintained energy levels, sufficient load leveling is achieved using approximately half of the customers on a circuit. For energy management objectives which additionally desire energy reductions in addition to peak load reductions, additional market share penetrations are desirable.

For sub-minute load sheds, the complex event processor 157 can respond to a frequency-motivated load shed or other shed as pre-specified into the system, where the response may be triggered by pre-established criteria. To enable some management of frequency management at the sub minute level, however, this type of load management is not a choreographed or optimized dispatch. Rather, it is a one way, single load shed dispatch targeted at desired locations, without regard for end use coordination, or optimal least cost supply or distribution cost minimization objectives. This is simply an auxiliary use of the system, which can be leveraged during times of system reliability emergency.

Here, the complex event processor 157 may issue commands to all appropriate appliances using a single, quick signal sent to connected appliances on a circuit. Typically, this type of emergency load shed is an infrequent event (1 in 5 year or 1 in 10 year event). This type of emergency load shed, however, may have significant value to system operators as a backstop for emergency response. This operational capability of the system may not require optimization or forecasting components. Rather, the set of execution heuristics desired may be established by the user for execution only when those pre-set conditions are met.

The complex event processor 157 may also contain a review procedure and interactive environment that may allow the integration of several databases into a single portal, and a query environment for the user to observe the resulting effects of the dispatch signaling solutions. The complex event processor 157 may also enable the user to send frequent information to customers regarding their appliance usage or the results of the dispatching signals. The complex event processor 157 may enable automated notification to customers and reporting of loads, appliance usage, appliance health diagnostics, bill forecasts, bill management, and real or near-real time performance measurements, where desired.

Utility and Customer Web Portals

The utility and customer web portals 159 may be web clients that allow the utility and customer, respectively, to interact with the communication engine 101 and vice versa. The communication engine 101 may use the utility and customer web portals 159 to provide real or near-real time information about usage, prices, and other important factors. HAN customers may use the portal to provide the communication engine 101 with information about premise energy usage, which end-uses can be dispatched, when they can be dispatched, and the value the customer places (monetarily or subjectively) on the output of the end-uses.

The utility portal 303 may be used by the utility 121 to provide details about: system real or near-real time energy usage; when an "event", such as curtailment, load leveling, or other type, is planned; target reduction amount; length of the event; and other necessary information for the optimizations, such as targeted geographic areas or customers. The system may work with any communication-enabled web portal as long as the information needed for the optimizations is collected and customer settings can be updated from the portal to the system over time.

The utility portal 303 may perform real or near-real time monitoring of customers and end-uses, as well as other distributed resources, such as storage and generation, for a specified location, region, time period or collection of customers. The utility portal 303 may also provide real-time monitoring at the transformer level, feeder level, substation level, or system level, in user defined formats, where more local control is desired. The utility 121 may also set the utility portal 303 to dispatch customers directly, either optimally, geographically, or across pre-specified grid segments or circuits, or via pre-set heuristics for emergency load shed or other special criteria. The utility portal 303 may provide reporting. Reporting may include real or near-real time and cumulative reports on the results of the control events, impacts relative to forecasts, including financial, system, reliability and load reduction impacts. The functionality of the utility portal 303 may allow a customizable interface so the end-user may get the information they need for execution and operation. The end-user may also interact with the communication server 101 such that the dispatching solutions meet user needs.

Different utilities and users may find more or less value in specific aspects, capabilities or controls of the system. As such, user defined utility portal 303 functionality may evolve over time as users begin to learn which optimally dispatched strategies are more desirable for their needs.

The system may be capable of interfacing with any TCP/IP enabled customer portal 309, wireless enable portal or other communicating hardware, assuming five minute, or less, communication signaling is feasible. Such customer portals 309 may have any level of functionality. For example, a customer portal 309 may need to be able to provide real or near-real time information to the customer to help them manage their electricity use and energy costs, or simply observe usage or control status. Additionally, the portal may allow the customer to communicate their preferences, profiles or constraints to the utility and the system, to control end-uses, comfort, carbon emissions saved, time home, bill settings, bill forecasts, energy usage preferences, or related factors that serve to constrain dispatching.

The customer portal 309 may also provide a mechanism for the customer to override the controls during an event or to adjust comfort settings. The customer portal 309 can allow the utility 121 to provide the customer with customer specific program offerings, messages, prices, or incentives, customer offers, appliance monitoring and diagnostics, bill or tariff information, and test offer programs.

The utility portal and/or customer portal can be replaced by existing HAN vendor portals, where necessary, provided communication conduits are established for the optimal dispatch signaling.

Forecasting System

The forecasting system 104 may forecast end-use and total premise loads, energy costs, energy prices, avoided costs and renewable resource generation. Forecasting, in a preferred embodiment, may include taking data inputs, processing those outputs to determine an expected value at a future time, and supplying those outputs to the optimizations 105. Forecasts may be performed at the minute and/or the hourly level for the next hour, the next day and/or the remainder of the month. The following may be forecast: energy costs, energy prices, avoided load; avoided costs; capacity values; lost revenue; customer bills; regulatory earnings; and/or utility margin. Energy costs, in a preferred embodiment, may include the cost of an energy provider to supply energy. Energy prices, in a preferred embodiment, may include cost at which an energy provider supplies energy to a customer. The amount of resource extractable today versus waiting until the end of a specified peak pricing period may also be forecast.

The forecasting system 104 may use regression-based modeling procedures that include weather conditions, time of day, and day of week variables to forecast the end-use for each customer until the end of the current month or season. The usage forecasts may be called automatically by the complex event processor 157. The results of the forecasting system 104 may be stored in the one or more databases 133. As new information continually arrives, the forecasts may be continually updated. During a dispatch or control event, the forecast values are stored in a separate table, representing the most accurate and current baseline for use in calculating measurement, verification and evaluation results for the peak load reduced and the net energy saved. These results are also useful for future ex-post evaluations or new program redesign, pricing incentives and related re-specifications of system inputs.

Figure 5:
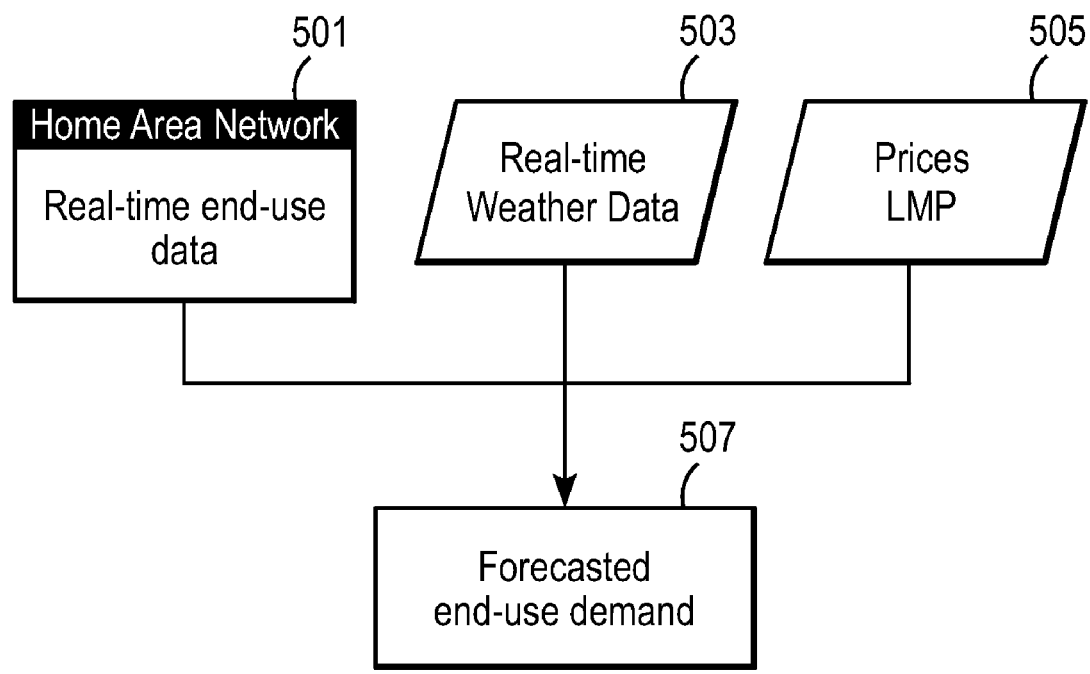
FIG. 5 is a flow chart illustrating end-use forecasting in an embodiment.

FIG. 5 is a flow chart illustrating end-use forecasting. A HAN may provide real or near-real time end-use data 501. The system may also receive real or near-real time weather data 503 and/or prices/LMP 505. This information may be input into the forecasting system 104 and processed to produce a forecast end-use demand 507.

The following is an exemplary process for forecasting electricity demand in the forecasting system 104. The forecasting system 104 may forecast electricity demand for all major end-uses that can be dispatched and are predictable, as well as total premise usage. Examples may include, but are not limited to, HVAC, electric vehicles, plug loads, and water heating. This may also be a model useful for a battery discharging context within a plug-in hybrid electric vehicle context (PHEV) as well, although the weather variables may not be included in that case, and vehicle battery discharging carries additional complexities related to the vehicle's performance and customer satisfaction, or lack thereof, that do not similarly constrain electric vehicle charging management, which simply delays a vehicle's charge over an optimally determined schedule, given utility costs and pre-set customer parameters. However, operationally, the system executes either charging or discharging, or both, equally effectively. To begin the model, consider:

$Y_{ijt}$=Electricity usage during period t for customer i of appliance j.

$X_{ijt}$=Set of explanatory variables during period t for customer i of appliance j.

X consists of variables such as temperature, humidity, time of day, day of week, and month.

t is at least hourly, although in some cases it may need to be every 1 to 5 minutes.

So, at every time t the forecasting system 104 may estimate the parameters (the βs) of the following equation for all customers and appliances using regression techniques:

$$Y_{ijt} = \beta_{ij} X_{ijt} + \epsilon_{ijt} \qquad (1)$$

$Y_{ijt}$ may consist of all the available electricity usage data for that customer for that appliance that has been collected from the HAN.

Therefore, the longer the HAN has been installed and monitoring information, the better the fit of the model.

The weather forecasts may be obtained in real or near-real time from, for example, the National Oceanic and Atmospheric Administration's (NOAA) Meteorological Assimilation Data Ingest System (MADIS) using standard data import formats or methods, such as database transfers, File Transfer Protocol (FTP), batch flat-file process, text, XML or web services. Using the fitted parameters and forecasts of the X variables, the system may develop forecasts of T+1, T+2 ... T+n values of Y and store them in a database according to the following equation:

$$\hat{Y}_{ijt+k} = \hat{\beta}_{ij} X_{ijt+k} \quad k=1 \ldots n \qquad (2)$$

In some cases, the entire load of a house may be needed. Rather than model each individual load, all of which is may be not measured in real-time, all loads may be lumped together into a "non-dispatchable" load equation, which may be monitored. Specifically:

$ND_{it}$=Electricity usage during period t for customer i of the non-dispatch load of the house.

This non-dispatchable load may be the total load of the house $TL_{it}$, which is measured in real-time, less the total dispatchable load discussed above, or:

$$ND_{it} = TL_{it} - \Sigma_j Y_{tij} \qquad (3)$$

The non-dispatchable load can now be forecast using the same approach as the dispatchable load using the same explanatory variables:

$$ND_{it} = \beta_i X_{it} + \epsilon_{ijt} \qquad (4)$$

As before, the $ND_{it}$ may consist of all available electricity usage data for that customer that has been collected from the HAN. Therefore, the longer the HAN has been installed and monitoring information, the better the fit of the model. Forecasting this load is the same:

$$\widehat{ND}_{it+k} = \hat{\beta}_i X_{it+k} \quad k=1 \ldots n \qquad (5)$$

Cost of Service System

Figure 6A:
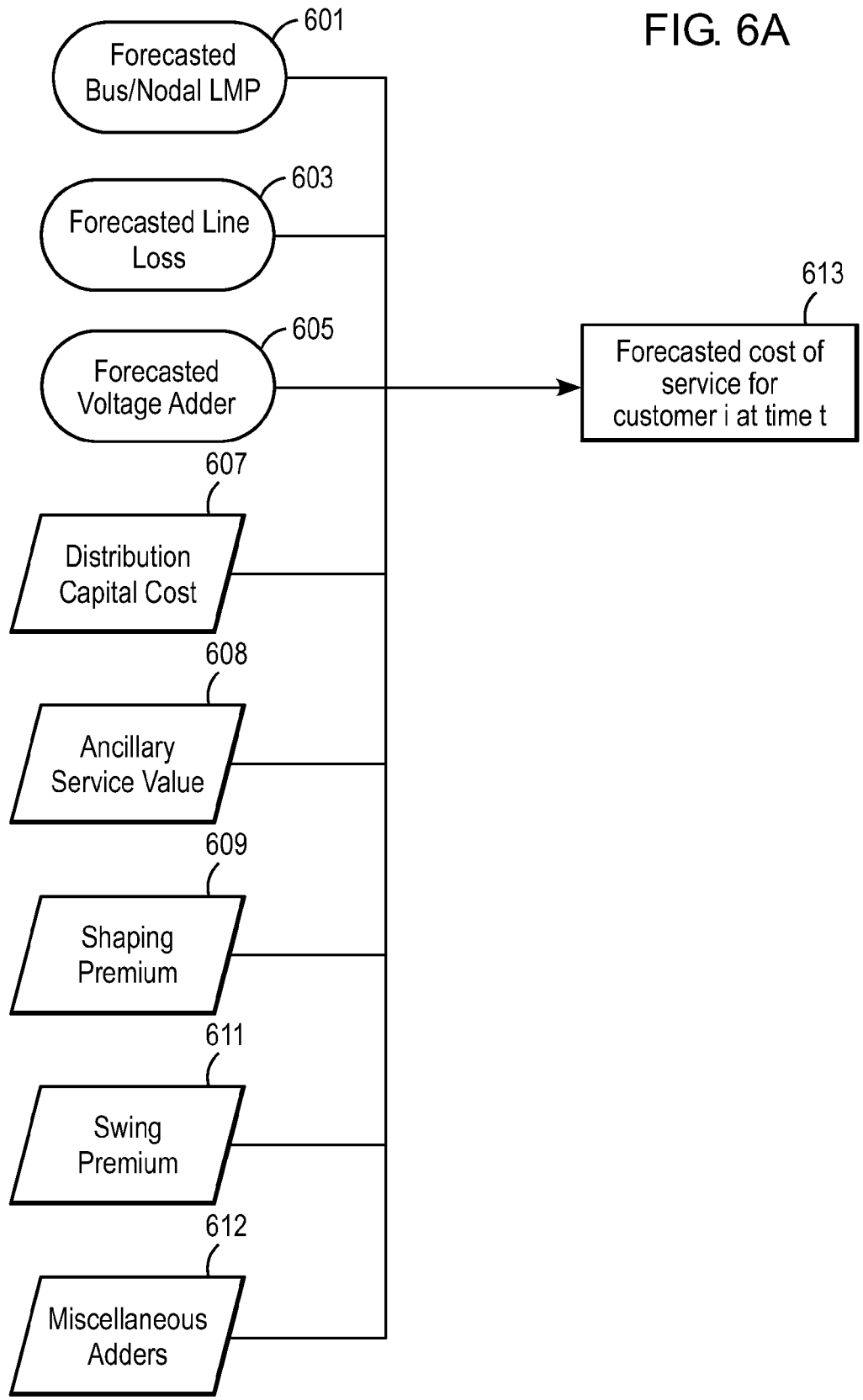
FIG. 6A is a flow chart illustrating calculation of a customer cost of service in an embodiment.

The communication server 101 may also include a system for forecasting cost of service (COS) or avoidable cost 103. Cost of service, in a preferred embodiment, may be the cost associated with supplying energy to a customer. Avoidable cost, in a preferred embodiment, may be the cost saved by using one particular distribution strategy over another distribution strategy. FIG. 6A is a flow chart illustrating calculation of a customer cost of service. The system for forecasting cost of service or avoidable cost 103 may receive as inputs: forecast bus/nodal LMP 601, forecast line loss 603, including primary and secondary line losses and transformer losses; forecast voltage adder 605; distributed capital cost 607; ancillary service value 608; shaping premiums 609; swing premiums 611; and/or miscellaneous adders 612. The inputs may be processed by the system for forecasting cost of service 103 to produce a forecast cost of service for a customer i at time t 613. Forecast inputs are determined as described below.

Figure 6B:
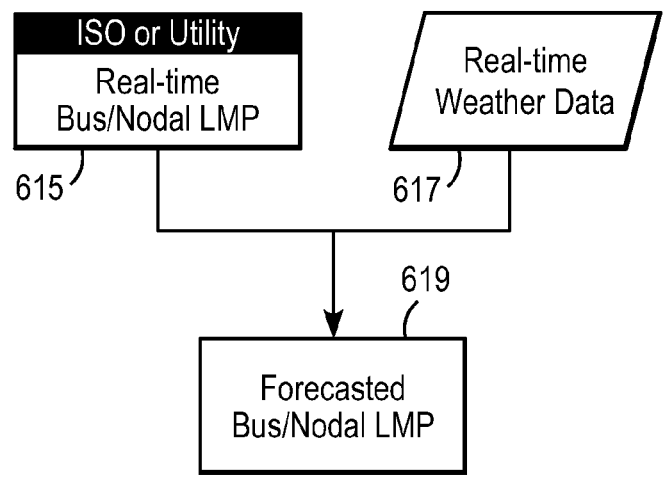
FIG. 6B is a flow chart illustrating forecasting of bus locational marginal price (LMP) in an embodiment.

FIG. 6B is a flow chart illustrating forecasting of bus locational marginal price (LMP). The system may receive inputs from the utility 121 or an independent system operator (ISO) regarding real or near-real time bus/nodal LMP 615. The system may also receive inputs of real or near-real time weather data 617. The system may process the inputs and forecast a bus/nodal LMP 619 to be used in the determination of cost of service.

Figure 6C:
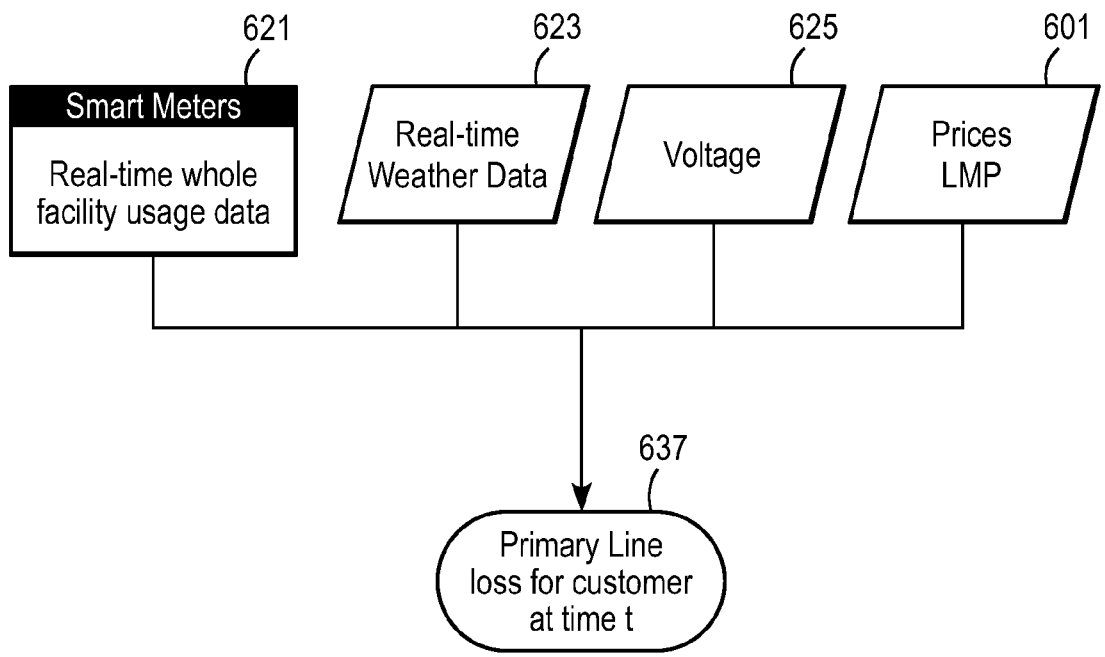
FIG. 6C is a flow chart illustrating forecasting of primary line loss in an embodiment.

FIG. 6C is a flow chart illustrating forecasting of primary line loss. The system may receive inputs from the utility regarding real or near-real time estimates of how primary line losses varies by customer, based on: real or near-real time whole facility usage data 621; changing real or near-real time weather data 623; voltage 625; and/or prices/LMP 601. The real or near-real time electricity prices 601 or LMP may be received, against which the forecasted percentage of primary line losses, per customer, may vary. These inputs may be established per customer location, outside of the system, in conjunction with distribution planners within the utility who are familiar with the bus and circuit characteristics, power factor, voltage conditions, load balancing, circuit capacity, capacitor characteristics, circuit topography, and other circuit-specific characteristics which influence primary line losses. This circuit analysis may be conducted by the utility, such that a reasonable relationship or forecast is constructed which predicts the primary line loss at customer location as a function of a) customer load, b) voltage conditions, and c) weather. These forecasted inputs and relationships may be used to forecast primary losses at a given location, or for a given circuit section or customer location. The system may process the inputs and forecast primary line loss for the customer at time t 637 to be used in the determination of cost of service.

Figure 6D:
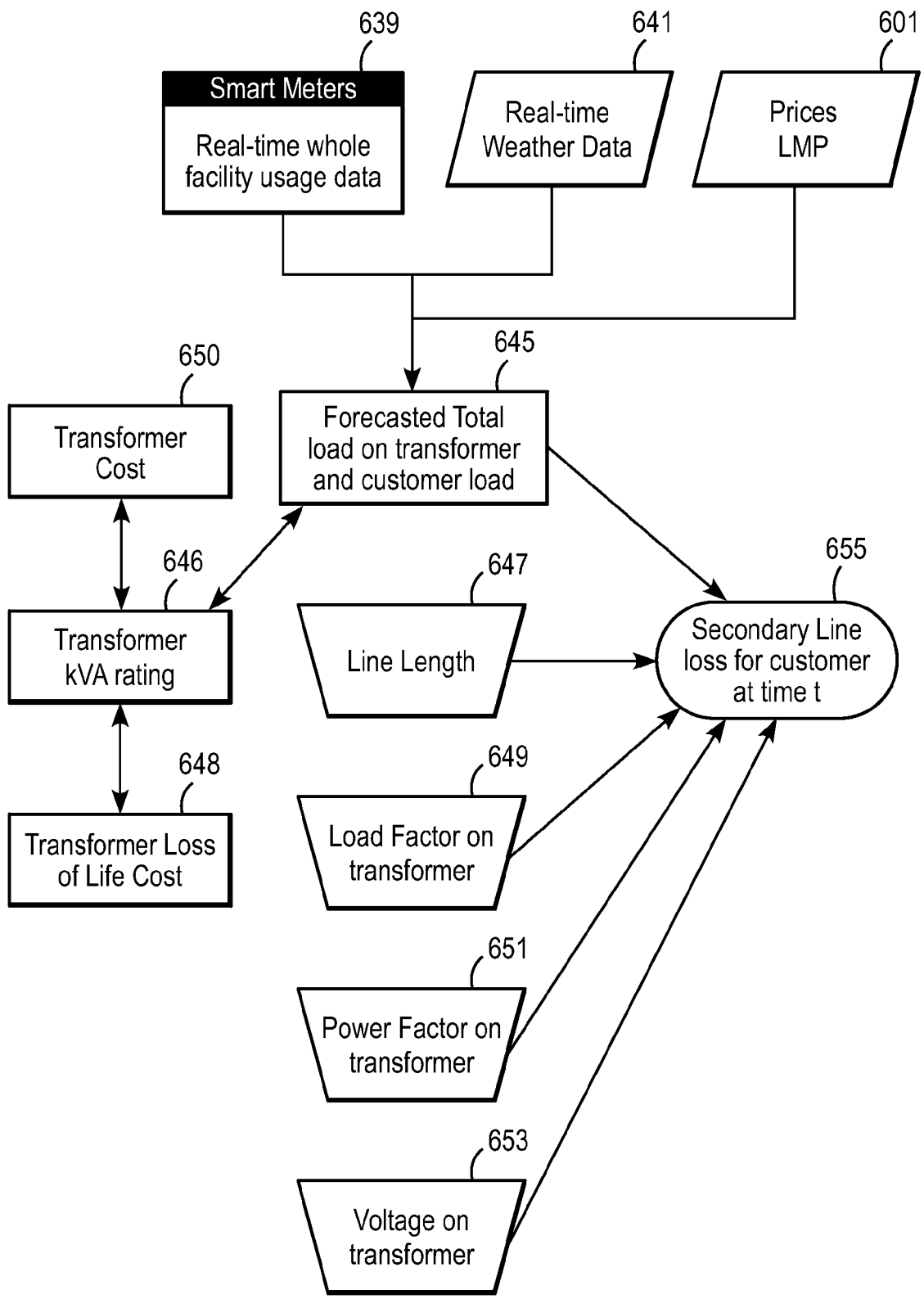
FIG. 6D is a flow chart illustrating forecasting of secondary line loss in an embodiment.

FIG. 6D is a flow chart illustrating forecasting of secondary line loss. The system may receive inputs from smart meters regarding real or near-real time whole facility usage data 639, and unlike primary losses, the secondary losses may be wholly forecasted within the system, using system inputs and forecasts. The system may also receive inputs of real or near-real time weather data 641, and inputs of real or near-real time prices/LMP 601. The inputs may be used to forecast total load on a transformer and customer load 645. Other inputs for the determination of secondary line loss may be: line length 647; load factor on the transformer 649; power factor on transformer 651; and/or voltage on the transformer 653. The system may process the inputs and forecast secondary line loss 655 for the customer i at time t to be used in the determination of cost of service, more specifically, as follows. Where individual customer voltages, line lengths or transformer characteristics are not known, average customer inputs may be used. Secondary line losses (LineLoss$_{it}$) may be directly estimated within the system based on user provided line lengths and loss characteristics. The secondary line losses may be added to the primary line loss described above.

SLoss$_{it}$ may follow Ohm's law (I$^2$R), and, thus, may be a function of line resistance and the square of the power going through the lines:

$$SLoss_{it} = \left( \frac{kW_{it} / \sum_T kW_t}{PF_T} \right)^2 \cdot kVA_T \cdot CL_{TF} \cdot LF_T \cdot 1{,}000 \qquad (6)$$

Where:
kW$_t$=Customer i's demand at time t.

$$\sum_F kW_t, \sum_T kW_t =$$

the total demand at time t on the feeder line and the transformer line customer i, respectively.

kVA$_F$, kVA$_T$=the voltage of the feeder line and the transformer line, respectively, to the customer.

PF$_F$, kPF$_T$=the operating power factor of the feeder line and transformer line, respectively.

CL$_F$, CL$_T$=The cable length of the feeder line and transformer line to the customer, respectively.

LF$_F$, LF$_T$=The load factor of the feeder line and the transformer line, respectively.

The winding's loss in the transformer (or load loss) may also follow I$^2$R, and thus can be expressed as:

$$WndLoss_{it} = \left( \frac{kW_{it} / \sum_T kW_t}{PF_T} \right)^2 \cdot kVA_T \cdot WndImp_T \cdot 1{,}000 \qquad (7)$$

Where the WndImp$_T$ is winding impedance of the transformer associated with the customer. The induction loss (IndLoss$_i$) may be referred to as the "no load loss" of the transformer because it is independent upon the load passing through the transformer. Therefore, it is essentially a constant term specific to the transformer associated with each customer.

The above discussion shows that line loss for a give customer may be a function of demand for that customer, kW$_{it}$ as well as the demand for all the customers on that customer's transformer $$\sum_T kW_t$$

as well as all the customers on that customer's feeder line.

Therefore, the system may conduct forecasts for all these demands in addition to the end-use demand forecasts discussed previously. There are two differences between these forecasts and the ones presented earlier. First, the demand on each transformer and feeder line may be at the premise or transformer level, not the end-use level. Second, this data may be collected from the utilities smart meters system, and not the Home Area Network data.

Finally, the forecasted customer loads 645 may be compared to the service transformer KVA rating 646, to estimate the number of times, and for what duration, total transformer load may exceed recommended transformer capacity. Using American National Standards Institute (ANSI) suggested peak load rating tables, or comparable transformer loss of life protocols operationalized within the utility, the system may multiply the percentage loss of life 648 times the utility input transformer cost of replacement 650, to arrive at a cost adder for the system which promotes the reduction of peak loads on transformers that are at risk of overloading.

Figure 6E:
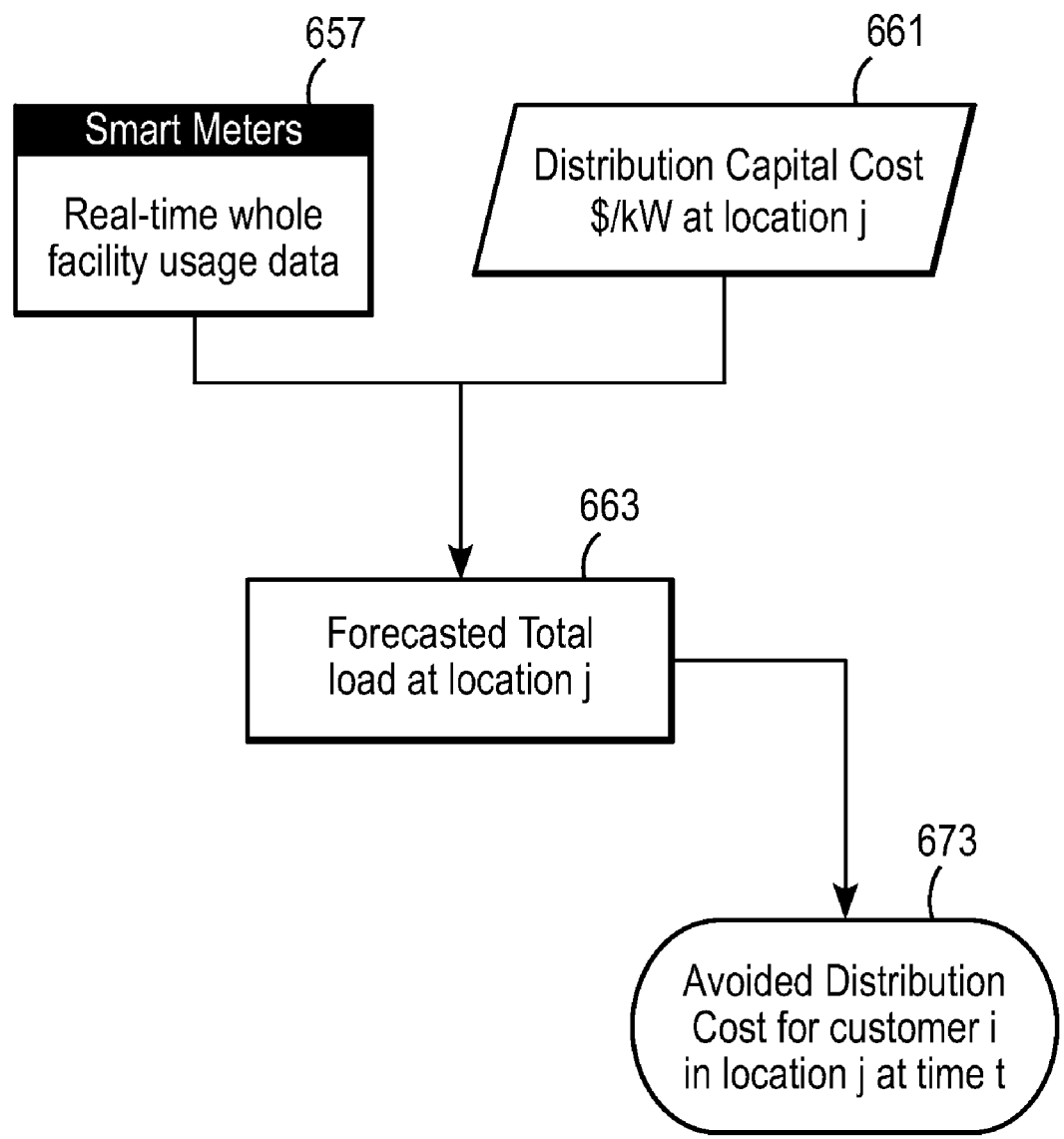
FIG. 6E is a flow chart illustrating forecasting of transformer loss in an embodiment.

FIG. 6E is a flow chart illustrating use of deferred or avoided distribution costs ($CC_{it}$) 673. $CC_{it}$ 661 may represent the annual marginal cost per KW of new distribution capital expenditures by the utility. These costs may include deferred distribution capital due to line upgrades, substation additions, capacitor additions, or related capital costs. In the same way that distribution planners may establish primary loss estimates per customer location, and established as a function of load, weather and circuit characteristics, distribution planners may also specify avoided, or deferred, distribution capital costs, established as a $/kW value for location j, which may contain one more customer i, for time t. Generally, the value does not vary over time, and is established for peak conditions, or a single time t. Further, this value requires comprehensive knowledge and familiarity with the local distribution system, and as such, cannot be estimated in real time within the system. Rather, the utility may specify the values to be assigned per location, to be applied to all customers located within that region j. The values may increase as distribution capacity decreases, relative to increasing customer loads. As locational distribution costs are avoidable through customer load reduction, or load leveling effects from optimized dispatching, the distribution cost adder applied to specific customers within targeted locations may realize more dispatching signaling as their avoidable or deferrable distribution capital cost adder increases. Real or near-real time whole facility usage data 657 may be used for calculations. The whole facility usage data 657 and/or the distribution capital cost 661 may be used to forecast total load at a location 663, which may in turn be used to calculate avoided distribution cost 673.

Figure 6F:
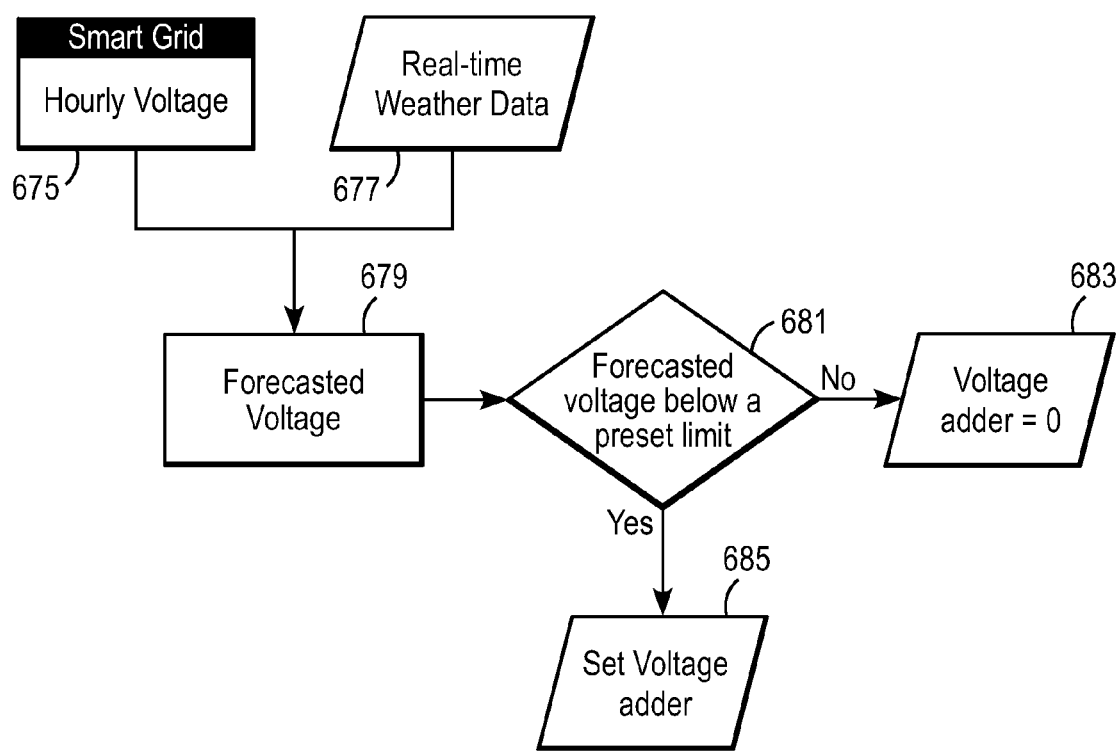
FIG. 6F is a flow chart illustrating forecasting of a voltage adder in an embodiment.

FIG. 6F is a flow chart illustrating forecasting of a voltage adder or benefit. The system may receive inputs from a smart grid regarding hourly voltage 675. The system may also receive inputs of real or near-real time weather data 677. The system may process the inputs and forecast a voltage 679 to be used in the determination of cost adder or benefit, which reflects the value forecasted to be gained from improving voltage conditions for a given customer location. Alternatively, the system may be operated such that a threshold voltage target is not exceeded, through the optimal dispatching of end use loads, or voltage objectives may call for improved voltage objectives at or near specific transformers, in which case the system may assign load leveling dispatching to those areas, to better manage voltages. A query determines whether the forecast voltage is below a preset limit 681. To ensure that load is levelized on a transformer, or to ensure that load is reduced for a given set of premises, in an effort to improve voltage within a targeted circuit section, an appropriately large cost, or adder, is used to motivate the application of load reduction in those areas. If no cost adder is included, then the voltage adder is set to zero 683. If yes, the voltage adder is set 685.

In this manner, the system can be used to complement existing or planned parallel distribution energy management efforts targeted specifically for distribution management purposes, such as integrated volt/var distribution management systems, or voltage reduction activities. The system may run in parallel with distribution management systems that control only grid assets, and not loads directly. In this sense, the system may enable a highly targeted and focused load reduction only in those areas or circuit sections where other distribution management systems are less able to control voltage to desired levels. In some cases, a very small circuit section's voltage drop may be too low to achieve overall voltage control objectives for the whole circuit. The system may be able to target a single, or a set of few, areas where targeted load reductions or load leveling on targeted service transformers improve voltage support beyond what the distribution management system alone can provide. This may complement the ability of the distribution management strategies for the whole circuit, without requiring the direct integration of otherwise separate systems. Importantly, the system is designed to avoid direct integration with other operational systems. Rather, the system may interface with other operational systems, which often contain their own optimization routines specific to specialized needs within their operations that either pre-existed smart grid application, or if they were to be directly integrated, the combined system may not be able to derive real time or near real time optimized dispatching. Optimization solutions become notoriously slow as the number of inputs, constraints and objectives increase. Therefore, the system may provide significant advantages in light of its interfacing strategy being emphasized over direct integration with other optimization solutions which may exist for either distribution management or supply side management.

Miscellaneous Cost Adders. Several non-forecastable, constant cost adders may be input by the user, to reflect non-load risks, as desired. These cost adders generally reflect risks in serving load, and as such, may be additive to the overall cost to serve, but they may not necessarily vary with load, be forecastable from weather or other conditions, and may require unique analysis outside of the system, by the user or the utility, to establish appropriate inputs that may be added to the cost to serve, and on which load dispatch decisions may be based. If the user determines that a particular cost adder should not contribute to dispatching decisions, the user may not desire to include that miscellaneous cost adder in the system. Miscellaneous cost adders may include estimated costs for credit and collections, bad debt risk, execution risk, load following or supply/demand balancing costs, supply fee costs, purchase power agreement costs, legal costs, administrative costs, customer service costs, marketing costs, billing costs, hedging or risk management fees, ISO costs or fees, load diversity (negative cost), or metering costs, among others.

The system may optimally dispatch end uses in 1 to 5 minute increments, or less, which may provide support to spinning and supplemental reserves, within 10 minute time windows, such that ancillary service benefits may be achieved. Here, the forecast of the hourly LMP may be used to arbitrage the 5 minute LMP, such that end use loads can be dispatched through a series of commands which force end use loads to run or charge, or be delayed. This subroutine within the system may take advantage of the often variable nature of the 5 minute LMP, relative to the hourly forecasted value, given weather and system conditions. Conceptually, loads may be dispatched to run, or charge, when the forecasted 5 minute LMP is below the forecasted hourly LMP. Loads may be dispatched to delay running, or charging, when the forecasted 5 minute LMP is above the hourly forecasted LMP. Although the system may forecast the 5 minute LMP, the intra-hour volatility in the LMP, at the five minute level may not be accurately forecastable. As such, the user may desire to employ this, or similar, simple dispatching heuristic. The user may adjust the sensitivity around which the system takes advantage of ancillary service value by weighting the cost adders higher or lower relative to the other cost of service adders. Where ancillary service benefit value is forecasted to be significant, as during extreme weather conditions, load leveling objectives may be of secondary importance, and the user may observe more volatility in the resulting peak load patterns. In this sense, dispatching objectives that strive to extract more ancillary service value may be likely to decrease the user's ability to achieve other objectives, such as load leveling, voltage support or other load management goals which benefit more from levelized loads.

The non-forecast inputs into the system for forecasting cost of service 103 may be directly accessed without forecasting. These may include miscellaneous adders 612, shaping premiums 609, or swing premiums 611.

Customer-specific cost to serve may be an important variable in the optimizations 105. One of embodiments of the present invention may be quantification of customer-specific marginal costs. Historically, utility system operators, independent system operators, and other entities involved in short term energy markets took actions and made decisions based on real-time hourly energy prices or next day price forecasts, which reflect an average of all buys and sells in a region or hub, or the average costs of supply side resources. The resulting index price, or ISO price, or internal utility specific supply cost, which reflects an average of these buys and sells or the average cost of supply, given demand, generally reflected the aggregate supply versus demand within a region, and did not reflect the longer run cost to serve for the next month, next year, or longer. Further, the index values, or short term prices, did not reflect the variance in marginal costs to serve specific customers, over extended periods, within that region. Where a customer uses significantly more energy during extreme weather, or during peak price hours, or pays a fixed $ per kWh rate without volume restriction, the cost to serve that customer over the planning horizon of a utility serving that load, is subsidized by other customers in the utility service area which exhibit lower than average costs to serve, or use less energy during peak priced time periods.

So, there may be an inherent subsidy that occurs within traditional supply side operations and dispatching, which may be remedied by the application of smart grid systems. Because current day or next day operations are only informed by the average load during the current day or next day, and do not consider longer term costs related to capacity, volume risk or energy use patterns of customers, ISO based or next day based dispatching systems may subsidize peakier, more costlier loads by overcharging less peaky loads. This subsidy generally does not occur within more competitive markets, where a single customer's hourly loads are evaluated, and forward risk captured as a swing, shaping and/or capacity premium, in the derivation of an annual or monthly price signal which incorporates the cost of risk or uncertainty in when, or how much, load is realized. However, within regulated utility dispatching contexts, or energy management contexts where average prices, rates or tariffs are employed, this micro level view may be lost among the service-are wide focus of traditional supply dispatching systems. Since smart grid technologies increasingly provide a system to secure substitutes to the receipt of power from the grid, customers may increasingly create more risk, and cost, to these utilities that experience increased customer migration, or arbitraging activity through renewables, distributed generation, competing aggregations, non-regulated providers or end use load management, among others.

The average market price for an hour potentially leads to sub-optimal decisions on the part of less costlier customers, or may contribute to sub-optimal utility decisions made regarding customer pricing or dispatching of load reduction resources. A micro focus of the system may provide an important hedge to the user, to more appropriately determine optimal dispatching solutions which minimize total costs and are more consistent with integrated resource planning principles over the long run.

Figure 7:
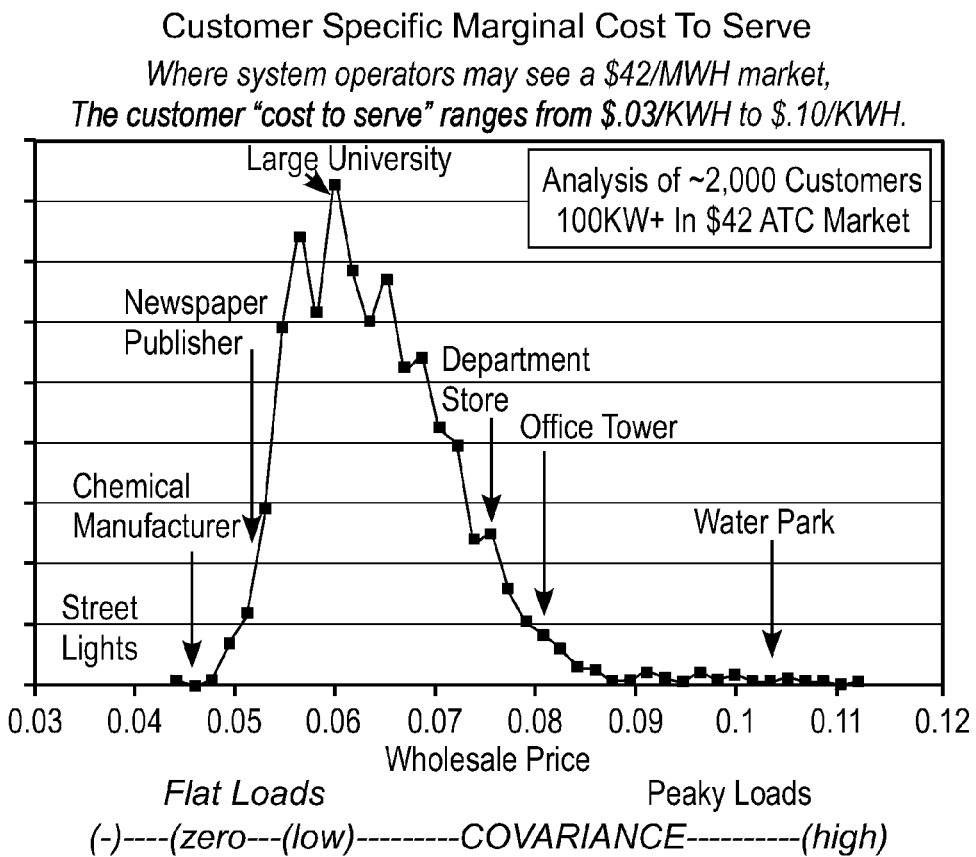
FIG. 7 shows a customer specific marginal cost to serve in an embodiment.

FIG. 7 shows a customer specific marginal cost to serve. As shown in FIG. 7, the average hourly price for a year is $42/MWH, or $0.042 per kWh. In the example, the range of the cost to serve values for a sampled set of commercial customers spans $0.03 per kWh for street lighting load, which operates during nighttime when electricity is less expensive, to more than $0.10 per kWh for a water park, which operates during peak summer afternoon hours when electricity is most expensive.

An optimally dispatched system may reflect the more appropriate longer term cost to serve, beyond current day or next day costs, such that the long run least cost planning can be achieved, in addition to short term, daily or next day, operational requirements. There is more value to all utility customers to have more costly loads under the direct control of optimally dispatched systems, or to base the dispatching solutions on this higher cost to serve, rather than to dispatch loads assuming that there are no differences in each customer's cost to serve. Utilities and regulators are not required to price customers differently, although the system can be used toward that end, if desired.

Rather, a contribution of the system of embodiments of the present invention with respect to micro level cost focus is to estimate and forecast micro level cost of service values such that the dispatching of these loads across a service area achieves long term least cost planning objectives. Where utilities use only the short term, daily, or next day costs, without regard for long run volume risk, hourly usage patterns, capacity risk, or distribution specific avoided costs (e.g., losses, voltage, distribution capacity), potential price discrimination inequities emerge as lower cost customers subsidize higher cost customers, and utilities may begin to overpay pricing incentives to lower cost customers and still not be able to attract enough higher cost customers to optimally achieve least cost planning and operations objectives.

Targeting load reduction opportunities, or pricing incentives, or marketing and promotional resources, to higher cost to serve customers, such as a water park customer, in the case of a summer peaking utility, provides more effective load reduction hedges against future extreme weather conditions and increases long term and short term operational hedging opportunity and least cost supply planning, than targeting lower cost to serve customers, or an average, the information of which is not reflected in an average LMP price signal, but unfortunately becomes the consequence of ignoring costs to serve a customer at the micro level, or individually. In this sense, the system combines the strengths of appropriately pricing individual customer loads, including volume risk, capacity premiums and distribution related costs, as is often done within non-regulated contexts (e.g., purchased power agreements or structured bilateral deals for electricity), with the regulated requirements of integrated resource planning (IRP) principles, which do include long term capacity related needs. Hence, the system uses, individual costs to serve which more appropriately reflect true marginal costs of service than the average marginal cost reflective of the real time energy market, ancillary service market, ISO market or related energy pricing signal that reflects an aggregation of individual loads or pricing indices.

Users, however, are not required to use a full cost to serve, nor a fully individualized cost to serve. Where less variability between customers relative to their individual cost estimates, or pricing signals, is desired, users may decrease these differences, or the variability between individual customer costs, through the use of Relative Marginal Cost (RMC) Index specifications. Here, the cost to serve differences between customers can be converted into numeric values (e.g., standardized, relative to the overall average), which simply compares one customer to another, with the average cost specified as 1.0, and a customer with 50% higher cost than average becoming a 1.5 RMC score. By normalizing, or standardizing to the overall average cost, the customer costs can be weighted to drive the differences between customers to be closer and closer to 1.0 for all. Where the variance weights are zero, all customers receive the cost score of 1.0, which becomes the special case equivalent to traditional daily or next day supply side operations, or LMP equivalent. The closer that the variance weight approaches the individual customer's long run cost to serve, the closer the dispatching solutions get to optimality for a given supply demand context. The system can operate on either relative, or actual, marginal costs, per customer. In this case, the system does not optimize directly on dollar values, but rather on individualized RMC factors, times an importance weighting assigned to that particular cost to serve category, centered on the short term real time energy price, or standard ISO based price. Importantly, the use of RMCs may be useful within contexts where users do not desire to issue, or enforce, differential customer costs or prices. Rather, the benefits of optimal dispatching, driven by more accurate cost of service estimates per customer, can be realized without direct application of individualized pricing signals.

In FIG. 7, the cost to serve category shown pertains to supply side hourly energy costs. The average in this case is approximately $0.06 per kWh, and exemplified most typically by a large university customer load. This customer would receive an RMC weight of approximately 1.0, whereas a street lighting load would receive an RMC of approximately 0.67 (derived by approximating 0.04/0.06=0.67), signifying that the cost to serve a street lighting load is approximately two-thirds that of serving an average type load, over the course of an average, weather normal year, and most closely represented in FIG. 7 by the load of a large university. The difference in cost between the 4.2 cents per kWh annual average short term ISO based cost and the long run annual average cost (approximately $0.06 per kWh) depicts the difference between the energy-only, short term price (daily, ISO based) and the long run cost to serve which includes capacity premiums (e.g., shaping premium and swing premium), which concerns long term IRP planners more so than short term operational dispatchers. This difference is larger the more that a customer's annual hourly load pattern diverges from the average. So, in the case of very peaky loads (e.g., a water park), the approximate average difference of 143% (0.06/0.042) can grow to be as large as 200% or more (0.10+/0.042) than the average cost to serve a given customer. Hence, attention to micro level costs within smart grid application contexts, or any context where customers have substitute options to purchasing power based on an averaged grid-based LMP price, may provide an important innovation where integrated into short term operational dispatching systems, given smart grid technologies.

Finally, the user can leverage the system for estimation of swing and shaping premiums for customers to spread this added cost to serve over targeted operational hours. Some users may choose to spread the premium over all peak hours (approximately 47.5% of all annual hours), or some users may wish to spread the premiums out over fewer hours to increase the pricing incentive's effect on the dispatching decisions. These are choices which must be made by the user in addition to the choice of what weight to apply for the Relative Marginal Cost Index, but which must be considered in tandem with that choice as the combined effect of the two is what will determine the nature and amount of the inter-customer cost of service differences, and hence influences, on the dispatching solutions The system may allow for the use of RMCs for all its cost categories, both grid-specific (e.g., voltage reduction value, primary line losses, secondary line losses, power factor improvement, or deferred T&D capital costs assigned per acre or per region, the cost amount of which is the same for all customers in that acre or region) or supply side specific (e.g., energy reduced, capacity reduced, plant type avoided, reliability, emissions volume risk, hourly usage risk). Where actual costs are desired, the system uses these actual costs instead of the RMCs and their assigned importance weight.

Where the user wishes to use only RMCs and importance weights, a single average cost value is specified for the 1.0 value, typically the average market price or ISO price within the region, to ground the system's optimization solutions for dispatching. Here, the RMCs and their weights may be multiplied times the average market, and the closer the weights are to zero, the less variability will be reflected between customers in the dispatching decisions. Mixed use of RMCs and actual cost estimates is also possible. The system's primary focus is on insuring optimal dispatching of resources, given the supply and demand mix available, and helping users get as close to an optimal dispatching solution as is allowed within their current capabilities, even if the user has not yet applied micro level cost to serve valuation directly.

To use individualized cost to serve, the system for determining cost to serve 103 may take a locational marginal price (LMP) from an independent system operator (ISO) at a node. The node may be a predefined system injection point nearest the customer.

The bus level LMP may be the cost of supplying the next MW of power considering generation marginal cost, transmission costs, and losses. This bus level LMP is one component of the micro level cost to serve, and users may choose to use this level of individual customer cost to serve instead of the overall average for the system, or they may add on additional differences to get closer to the true avoided costs for the customer at that location. This information may be readily available in real or near-real time from the ISO, such as in five minute increments, or it may be determined internally within a utility service territory, given the loads on buses, plant output and transmission capacity between buses.

With this information, the system 103 may incorporate these values into an extension of the line loss formulas combined with distribution premiums to determine the cost of service at the customer level. The details of this approach are presented below. Some utilities may not have all of this information readily available. For example, the system may require the user to establish relationships and functions for estimating primary losses and for avoided, or deferred, distribution capital costs.

As shown in FIG. 6A, the system 103 may require that some of these costs be directly specified by the user, and added to the total LMP estimated for that customer for a given time period. Cost inputs that can be input into the system by the user may include: (1) the 5 minute nodal or bus LMP ($LMP_{it}$); (2) line losses ($LL_{it}$); (3) voltage cost ($VC_{it}$); (4) marginal distribution capital costs ($CC_{it}$); (5) a shaping premium (ShP$_{it}$); (6) swing premium (SwP$_{it}$), and ancillary services (Anc$_{it}$). Cost of service may be calculated as follows:

$$COS_{it}=F(LMP_{it},LL_{it},VC_{it},CC_{it},Sh_{it},SwP_{ti},Anc_{it}) \quad (8)$$

The user may choose to not vary some of the values over time, and where this is the case, the user may not need to forecast values that do not vary with time. For example, a single annual value may be used for distribution capital cost savings or value, for all customers within a region, or on a given circuit or bus. Or, the user may choose to apply the avoided distribution capital cost adder in terms of the locational $ per KW avoided, which is then forecast individually for each customer, but which is generalized in terms of the avoided cost per KW. Or, a capacity premium may be applied as a single value, related to a constant avoided supply unit, such as a natural gas peaker where the assigned capacity savings is assigned a constant dollar per KW reduced value, consistently applied across all customers equally, or as an avoided $ per KW value. In these cases, the costs may be computed externally by the end-user, and applied to all loads without regard for individual differences.

The Shaping Premium 609 (ShP$_{it}$) may be the weighted average of typical peak and off-peak energy consumption of the customer for the entire year, season or month. A customer that uses a disproportionate amount of peak power may have a cost to serve that may be higher compared to business that uses relatively more off-peak power. To forecast both Shaping and Swing Premiums, hourly load and price forecasts may be developed using future expectations of weather, a customer's load response to weather, and across expected forward prices. Users may develop their own price or load forecasts, to be used in the derivation of the Shaping and Swing Premiums, or following one of the following methods for doing so.

Forecasting Annual Cost of Energy Over Peak and Off Peak Periods. The simplest method for forecasting energy costs, or LMPs, may be done over designed peak and off peak times. Here, the cost of energy may be simply the time weighted average of the forward peak and off-peak price. And the user may be free to determine which periods are assigned and peak versus off peak. An advantage of this method may be its simplicity, its transparency and ease of execution; however, it may not adequately incorporate hourly level of detail, costs or risks within the dispatching decisions.

$$FCE = \sum_{t}^{T} \frac{1}{n_t + m_t}(P_t \cdot n_t + OP_t \cdot m_t) \quad (9)$$

Where
FCE=Forward cost of energy
n$_t$=Total peak hours in month t
m$_t$=Total off-peak hours in month t
T=Total months in the term of the contract
P$_t$=Monthly forward peak price
OP$_t$=Monthly forward off-peak price Alternatively, the user may elect to use a more rigorous method for forecasting energy costs, based on, for example, a generalized autoregressive conditional heteroskedastic framework (i.e., GARCH). The general framework of GARCH based forecasting is well known, however, the system may extend the general GARCH framework to more appropriately meet the unique needs of estimating shaping and swing premiums within an energy management context. Here, the system may estimate daily and hourly energy prices, consistent with many years of hourly weather, such that the user is able to more accurately estimate the cost of serving loads under different weather conditions. This methodology may include parameters for hours, days, weeks, day type, fuel prices, forced outages and weather variables, such that a reasonable forecast of forward hourly prices can be generated, to be subsequently aligned, hour by hour, with the forecasts of hourly loads. Because these hourly price and load forecasts may be simulated over many years of possible hourly weather conditions, the system may ensure that the full range of financial risk, and hence costs, are fully reflected in the shaping premium estimate.

Given that hourly analysis is used, the user may elect to assign the shaping premium over any number of hourly aggregations, as appropriate. The shaping premium may be established for each of 12 months, or each of 4 seasons, for example, and only over designated peak periods, as desired by the user. The fewer hours over which the shaping premium is spread, the higher the cost may be for those fewer hours. Further, the spreading of the shaping premium over these peak hours by the user may reflect the unique supply side capacity risk faced by the utility, and may be revised from time to time, to reflect variability in these supply risks. For example, a reasonable rule of thumb for spreading costs over these hours may be to calculate assignment or allocation weights proportionate to the loss of load probabilities for the utility. In this manner, relatively more shaping premium costs may be allocated to more extreme, or peakier, times of the day. Generally speaking, for a summer peaking utility using natural gas combustion turbines for capacity planning, a user might allocate the shaping premium for July over the peak and near peak hours between 2 pm and 7 pm, during the 20 example July weekdays, yielding approximately 100 hours over which to spread July's premium, and then choose to proportionally weight the allocation relative to July's price forecasts for those hours. Applied in this same manner across 3 or 4 summer months, the resulting 300 to 400 hours of availability reasonably reflects the operating characteristics of the avoided supply alternative, the natural gas peaker. In addition, the proportional allocation, relative to the price forecast, helps further boost cost to serve premiums or adders more toward those hours where load reduction, or optimal dispatch is needed most. In this sense, the hourly price forecast may serve as a proxy for the loss of load probability during those hours. At the beginning of the month, the system may establish similar premium adder allocations for similarly situated hours, since price forecasts beyond one week, given weather uncertainty after one week, typically reverts to a weather normal price forecast which, for example, would predict a similar price for all weekday 2 pm hours during July. As daily weather updates are input into the system, new price forecasts are generated and new allocations are possible. Hence, the extent to which extreme weather is realized early in the month, too much of the overall monthly premium may be allocated too soon in the early part of the month. As such, the system provides for optimal decision dispatching under conditions of future uncertainty, described later.

The following example model is a GARCH (1,1) with an AR(2) specification, the framework of which is well-known. The innovation of the system lies with the unique process, calculations and application of the framework, juxtaposed with the load forecasts described shortly, to uniquely calculate a cost to serve shaping and swing premium individualized to a customer, based on smart meter usage data observations.

The following is an example of GARCH price forecasting using a GARCH (1,1) with AR(2) model.

Core ln($PD_t$)=constant+$\beta_1$ Day of Week+
$\beta_2$ Temp+$\beta_3$ Month+$\upsilon_t$ Here, the core part of the model resembles a traditional regression model. Price may be taken as a log in order to both prevent negative prices and to more appropriately reflect the non-symmetric, lognormal distribution that electricity prices.

$$AR\ \upsilon t = \phi 1 * \upsilon t - 1 + \phi 2 * \upsilon t - 2 + \epsilon t$$

Second, the AR equation may specify two (arbitrary) autoregressive terms and its residual error. These terms may reflect the tendency for current price levels to depend on the price levels observed in the last two hours.

$$\text{Shock } \epsilon_t = \text{SQRT}(\sigma_t * e_t) \text{ where } e_t \sim N(0,1)$$

Third, a shock may be applied to the residual error term (or alternatively, the error is randomly distributed after controlling for these other pre-specified effects).

$$\text{Garch } \sigma^2_f = \omega + \alpha * \epsilon^2_{t-1} + \gamma * \sigma^2_{t-1} + \ldots, \text{e.g. } \delta_t(\text{Fuel,Outages})$$

Fourth, the magnitude of the shock may depend on the current time period's variance, reflected in the combined ARCH ($\alpha \epsilon^2_{t-1}$) and GARCH ($\gamma 1 \sigma^2_{t-1}$) terms, along with two other structural variables (e.g., peaks, force outages) that give an extra boost to the volatility during pre-specified peak hours and/or hours within which plant outages occurred.

Given the intra-day volatility of hourly prices, the user may choose to forecast an average daily price, or an average afternoon or peak period price using a GARCH based framework, and then apply this daily price forecast to historically observed price shape patterns (i.e., a 24 hour set of price values, taken each day, normalized to the average value, set as 1.0). Then, the user may denote this daily price by $P_t^D$, with its appropriate regressors on daily data, prior to applying an appropriate price shape pattern of 24 hourly normalized weighting factors, randomly pulled from among a bin of similar weather conditions (e.g., a bin of day type price shapes observed when temperatures were between 92 degrees and 95 degrees during July). The general form is reflected more simply as:

$$P_t^D = f_1(\vec{P}_t, \vec{W}_t, \vec{Y}_t, \vec{X}_t, \epsilon) \tag{10}$$

Where $f_1$: The underlying regression function $P_t^D$ Daily average electricity price of day t $\vec{P}_t$: Past daily average electricity price vector at day t $\vec{W}_t$: Past weather condition vector at day t $\vec{Y}_t$: Seasonality variables vector at day t $\vec{X}_t$: Other independent variables vector at day t $\epsilon_t$: White noise error terms at day t In the above function, the underlying regression $f_1$ may take arbitrary function form, linear or nonlinear, in inputs, vector or scalar. For example, $f_1$ can be an ARIMA model with regressors. $\vec{P}_t$ may be a vector of past daily average electricity prices. $\vec{P}_t$ may serve as an autoregressive component of the regression function $f_1$. The past weather condition vector of day t, $\vec{W}_t$, may contain weather information such as temperature, humidity, etc. The vector of seasonality variables of day t, $\vec{Y}_t$, may contain seasonal dummy indicator variables. The vector of seasonality variables of day t may serve as the seasonality component of the regression function $f_1$.

The method may focus on the persistence of volatility over time; incorporating past measures of volatility into the current volatility and incorporates shocks to the current return. The conditional variance h(t) may depend on its own past values as well as on lagged values of the error terms.

$$R_t = \mu + \beta R_{t-1} + \epsilon_t$$

$$\epsilon_t = \sqrt{h_t} e_t, e_t \sim \text{IN}(0,1)$$

$$h_t = \alpha + \gamma_1 \epsilon_{t-1}^2 + \eta h_{t-1} \tag{11}$$

Volatility depends on all the past values of the error terms. This can be seen by solving recursively:

$$h_t = \frac{\beta}{1-\eta} + \gamma(\epsilon_{t-1}^2 + \eta \epsilon_{t-2}^2 + \eta^2 \epsilon_{t-3}^2 + \eta^3 \epsilon_{t-4}^2 + \ldots) \tag{12}$$

Different regions or price hubs may reveal different GARCH model specifications, based on the observed history of energy prices and the forward expectations of price volatility and level. GARCH forecasts may be generated for increments of possible future prices, generally from $25 per MWH ATC to $75 per MWH ATC, which typically allows the system to quantify the cost to serve a particular load under the possible set of forward price expectations. The system may hold twenty or more, or less, different forward hourly price expectations over 1 to 30 or more years of hourly weather, and databases the cost to serve a particular customer load under these price/weather combinations. The user may elect to use one of these price forecast scenarios, typically the current forward price expectations (i.e., short run shaping premium), or the user may leverage all of the forward price expectations, calculate shaping premiums under all these future cost expectations and use a long run shaping premium. The advantage of the long run shaping premium is that the user may currently face lower market prices this year, than what is usually typical, and as such, the use of the current forward expectations may exhibit lower shaping premiums than what might be realized, on average, over many years of load realizations.

The use of the long run shaping premium, which in this case may be higher than the short run shaping premium, may reflect an inherent hedge against future higher prices. This hedge is the financial value the utility or the user is willing to pay to customers to hedge against serving their load under extreme weather conditions, where prices may increase higher than today's expectations. Including the long run premium into today's cost to serve enables more efficient long term planning and operations on the part of the utility, mitigating future supply risk, and reflecting a long term value more consistent with integrated resource planning than with short term operational considerations, or concerns, alone.

This long term perspective may be more consistent with traditional utility planning where reserve margins and added capacity are secured in advance of the real time need, given long lead times for construction of new supply capacity. With this system, the cost to serve value over the long run is more appropriately ascribed to each customer, consistent with their hourly usage pattern, reflecting their risk to serve, and mitigating future supply costs and risk, by disproportionately realizing dispatching solutions which secure, reward and reinforce load reductions from those end uses which are more costly to serve.

Traditionally, regulated utilities may issue a single stream of hourly prices, reflective of average system costs and not customer specific costs to serve. Individual cost to serve methodologies may be used within bilateral or competitive markets, but these processes and methods do not consider optimal dispatching solutions within regulated contexts, or contexts where power is secured for aggregations of customers who pay an average rate over the course of a year or month. The system may combine the advantages of both perspectives through the use and application of the embedded forecasts, processes, systems, algorithms and execution to optimally dispatch end uses, subject to supply and price conditions, within such a captive customer, context.

Importantly, the use of shaping and swing premiums within the system may assume that a weekly, monthly, seasonal or annual contractual commitment exists between the utility and customer to insure the sustainability of such arrangements, similar to the regulated tariff framework, or structured bilateral power agreements. These contractual arrangements may be developed at the discretion of the user and their customers. Additionally, where the user does not desire to apply the system within a regulated context, the application of the system may be the same, but the values of some of the component parts of the cost of service change, or become zero. In more competitive contexts, it may be the case that only the LMP and/or market based ancillary service components of the COS are employed. However, the operation and execution of the system does not change.

Hourly Load Forecasts. Because shaping and swing premiums require the user to multiply loads times prices, to derive a cost to serve, the system may provide a method for forecasting hourly loads to be multiplied by the hourly prices described above. These load forecasts may be regression based forecasts, and as such, their derivation and application are well-known. Rather, the unique contribution of the system derives from the joint set of automated processes, calculations and cost to serve calculations as applied to the energy management and end use and microgrid resource dispatching context described herein. The user may choose to apply a non-regression based methodology to estimate future loads, provided these forecasts depend on weather conditions expected within the utility's area, and that the price forecasts also depend on this same hourly weather data. First, hourly customer loads, by customer, or customer class, may be regressed against hourly weather conditions, for each hour, day type, and month. The estimation process may analyze, and choose from, candidate regression equations, may apply splines, knots (i.e., X values where slope changes occur), or may specify possible changes in load response over both independent weather variables and non-weather dependent variables (e.g., December or July variable, school hours, etc.), based on predictive ability or Fit diagnostics, such as adjusted R-squared and/or mean average percent error. The selected regression functions may then be used to select the best equation for that customer, or class, for a given hour in a given month for a specific day type.

Hourly electricity demand $Q_k^H$ may be simply represented on hourly data as follows:

$$Q_k^H = f_2(\vec{Q}_k, \vec{W}_t, \vec{Y}_k, \vec{X}_k, \epsilon_k) \tag{13}$$

Where
$f_2$: The underlying regression function
$Q_k^H$: Hourly electricity demand of hour k
$\vec{Q}_k$: Past hourly historic energy consumption vector
$\vec{W}_t$: Past weather condition vector at day t which hour k belongs to
$\vec{Y}_k$: Seasonality variables vector at hour k
$\vec{X}_k$: Other independent variables vector at hour k
$\epsilon_k$: White noise error terms at hour k In the above, the underlying regression function $f_2$ may take arbitrary function form, linear or nonlinear, in inputs, vector or scalar. For example, $f_2$ can be an ARIMA model with regressors. $\vec{Q}_k$ a may be a vector of hourly historic energy consumptions. It may serve as an autoregressive component of the regression function $f_2$. The weather condition vector $\vec{W}_t$ may contain weather information such as temperature, humidity, etc. The vector of seasonality variables, $\vec{Y}_k$, may contain seasonal dummy indicator variables. It may serve as the seasonality component of the regression function $f_2$.

The resulting set of regression equations may number 576 in total, reflecting 24 hours, for weekday and weekend day types, over 12 months, or 576 hourly regression equations. The user may also choose to group similar types of hours together, for modeling purposes, such as all afternoon hours, to gain statistical power where insufficient sample exists. Each of these regression equations may then be applied to several years of hourly weather data, to simulate a range of possible loads that the utility faces in serving that load over a long term planning horizon. The average of these load simulations may reflect the load normal load shape for a given day type and month. The average of these load simulations may also reflect the interaction and influence of all weather, and non-weather factors, and as such, may be a more accurate reflection of the load at risk during peak weather times than traditional weather normalization methods might predict.

Importantly, this approach may differ from traditional weather normalization practices conducted among utilities. In this system, loads may be simulated or forecasted over many years of weather, yielding a full distribution of possible loads, the average of which becomes a load normal result, reflecting average weather conditions. In contrast, traditional utility weather normalization may construct a weather regression function for a load, and then score that function with weather normal data. In this latter case, the system does not have a full distribution, and the system may not be able to observe the range of risk the utility faces in serving that load. As such, the system may not be able to accurately value the cost to serve that customer, under varied future weather conditions, like one can with the more robust causal simulation methodology described herein.

Derivation of Shaping Premium from Load and Price Forecasts. Given the development of hourly load forecasts and hourly price forecasts above, both keyed to the same hourly weather, simulated over many years of weather, the system may then multiply prices times loads for all hours and derive the average shaping premium by dividing by the average price for a given period, be it seasonal, or monthly, or other, to be shaped over the user-specified peak hours for that period, as described previously.

Average Load Weighted Cost of Energy $$LWFCE = \sum_{t}^{T} \frac{1}{\left(\sum_{i}^{n_t} Q_i + \sum_{j}^{m_t} Q_j\right)} \left(P_t \cdot \sum_{i}^{n_t} Q_i + OP_t \cdot \sum_{j}^{m_t} Q_j\right) \tag{14}$$

Where
LWFCE=Load Weighted Forward cost of energy
$n_t$=Peak hours in month t
$m_t$=Off-peak hours in month t
T=Total months in the term of the contract
$Q_i$=Energy demand in peak hour i
$Q_j$=Energy demand in off-peak hour j
$P_t$=Monthly forward peak price
$OP_t$=Monthly forward off-peak price The Load Factor (shaping) Premium (LFP) may be represented:

$$LFP = LWFCE - FCE \tag{15}$$

The shaping premium may be viewed as the cost of energy above the around the clock (8760 hours per year) cost of forward energy. The premium may be characterized by the unique load weighting of individual energy consumers. The premium may be typically a positive number, but can be negative for large off-peak energy consumers. Street lighting for example will have a negative premium. The magnitude of the premium may be related to the covariance between price and consumption. Thus, the higher the covariance, the higher the premium.

Capacity Premium Alternative Method. A user may choose to use a simpler capacity premium, in some cases, to reflect the shaping and swing premiums, instead of derivation via hourly energy estimation. Here, a user may use a capacity premium, or fraction thereof, based on qualifying supply facility or other capacity cost equivalent (e.g., cost of capacity on the market). This value may replace both the shaping and swing premiums, and does not necessarily require that the cost vary by customer but varied cost allocation based on the per KW reduced is recommended. Here, a qualifying facility may reflect the construction cost of a natural gas peaker, or other peak serving supply resource, usually reported as a dollar per KW served. The user may also decrement the cost value, depending upon operational factors, including, but not limited to, hours of load reduction availability, advance notice, KW reduction available, over-ride or compliance history, duration of reduction, or the hours in which reductions are realized. The capacity value may be spread over targeted peak hours as determined by the user, or across various months, or only in a given season.

Where regulation has established an avoided capacity value for a qualifying facility, this method may provide more consistency with existing avoided cost frameworks, and less complexity than the aforementioned hourly estimation method. Nonetheless, this capacity cost addition to the LMP, even if assigned to be the same per KW cost for all customers, does reflect the long term supply risk faced by the utility in serving uncertain loads. Assigned as per KW cost value, this approach proportionately reflects higher or lower KW reductions offered by customers, during the hours specified. Again, the fewer hours over which the capacity premium is spread, the higher the hourly cost. And again, this capacity premium can be allocated proportional to the loss of load probability or to future price expectations. However, this approach does not distinguish between customers with regard to their unique cost to serve. It may reflect a system average cost, over all customers.

The Swing Premium 611 ($SwP_{it}$) may represent that some customer's loads are more volatile relative to other customers. Thus, the utility may invest in additional resources to cover the uncertainty associated with these customers' loads. This added risk and associated investment is termed the swing premium. All load serving entities whether they are utilities or on-site distributed generators are faced with the problem of demand uncertainty, or volume risk. Energy consumption may be largely determined by weather. However, actual temperatures can never be exactly known prior to the physical supply of energy. Planners have developed means to estimate consumption and schedule supply resources in anticipation of these forecasts. Typically, overall consumption may be matched with physical generation assets in energy and capacity markets and hedged with financial contracts. These assets and/or contracts may serve to mitigate the base-load consumption risk.

During mild or expected weather events, overall demand can exhibit significant load diversity, and less risk, among the various consumers within the system. During these hours there may be an equal likelihood that there are individual consumers using more than anticipated as there are consumers using less than anticipated. Overall, the system may balance as these loads cancel out and sum up to the expected forecast. However, during extreme weather events (either cold weather or hot weather), load diversity tends to decrease as loads work together in response to the weather event. During these hours, the planning forecast may deviate from actual exposing the load serving entity to supply risk. Because of load and price covariance, it is during these hours that the utility can be faced with high cost supply alternatives. And the higher the loads, generally the higher the costs to serve, and under a flat $ per KWH rate structure, customers are not constrained in terms of how much energy they use. This may be termed volume risk, due to the covariance between prices and loads, thereby necessitating the estimation of the risk, via application of one of the possible swing premium estimation methodology options, described below.

Conceptually, the covariance premium may be equal to the future cost of supplying the uncertain marginal energy above the "baseload" or hedged consumption. Because of the uncertainty, the premium is often referred to as a risk premium. There are four possible cash flows: 1) less than planned (forecast) consumption when spot prices are high; 2) less than planned consumption when prices are low; 3) more than planned consumption when prices are high; 4) more than planned consumption when prices are low. Whether a price is high or low is measured relative to the hedge cost, or the cost of the energy that was originally allocated for the planned (forecast) consumption. If the spot price is above the cost of the hedge, then the energy supplier may have positive revenue only if the consumer uses less than was planned, and may have negative revenue if the consumer uses more than was planned. When spot prices are less than the cost of the hedge the opposite may be true.

During strictly mild conditions, during times of load diversity, the cash flow from these four conditions may cancel out thus eliminating much of the supply risk. However, during extreme conditions, price and load covariance may work to reduce positive revenue and increase negative revenue resulting in a net loss to the energy supplier. This net loss may be what is measured by the risk premium and added to the retail cost of supply.

During mild (diverse) weather conditions, positive and negative cash flow may largely cancel-out. During extreme weather conditions, when prices and loads are co-varied, the positive cash flow may be reduced and the negative cash flow may increase. The energy supplier is short a straddle. The value of the short straddle is equal to the cost of the swing premium (risk transfer fee).

The value of the covariance premium (risk transfer straddle) can alternatively be measured using financial engineering tools such as the Black-Scholes equation, simulating the average monthly covariance risk, or using Monte Carlo simulation. The user may choose which method best fits the particular end use energy management framework, or calculate the premium using all options and incorporate the average or maximum value estimates into the system. If the user has adopted the hourly estimation process described above, including hourly price forecasts, hourly load forecasts, and simulations conducted over multiple weather years, then the volume risk premium can be calculated as the average monthly covariance over multiple years of simulated observations. This method is based on robust hourly analysis, and is reasonably accurate where the forecasts themselves are acceptable.

Alternatively, a Black-Scholes/Short Straddle Method estimation can be generalized and employed, by considering the regional and customer characteristics with the most impact on covariance premium. Regionally, price volatility creates the most impact in measuring the cost of uncertain consumption. Thus, the higher the price volatility, the higher the risk premium. From the perspective of the consumer, load volatility creates the most impact in swing premium. Thus, the higher the load volatility, the higher the uncertainty and the higher the risk premium. An advantage of the short straddle method for calculating the covariance cost of energy is in the ability to use the Black-Scholes formulas to calculate the cost of the contract, which for some users, may be a simpler method to estimate a reasonable proxy for the shaping and swing, or capacity, premiums.

Correlated Diversity. When viewed as a hedged position, the portfolio risk can be priced as equivalent long straddles. When the hedger is long, the forward option contracts (hedge) and short the underlying energy, the change in the value of the hedger's position during the life of the hedge is $$\Delta S - h \Delta F \quad (16)$$

The variance, v, of the change in the value of the hedged position is given by:

$$v = \sigma_S^2 + h^2 \sigma_F^2 - 2h\rho\sigma_S\sigma_F \quad (17)$$

So that:

$$\frac{\partial v}{\partial h} = 2h\sigma_F^2 - 2\rho\sigma_S\sigma_F \quad (18)$$

Setting this equal to zero, and noting that $\partial^2 v/\partial h^2$ is positive, we see that the value of h that minimizes the variance is:

$$h = \rho \frac{\sigma_S}{\sigma_F} \quad (19)$$

Where $$E(\Delta S) - E(\Delta F) = 0$$

ΔS Change in spot price S, during a period of time equal to the life of the hedge
ΔF Change in futures price, F, during a period of time equal to the life of the hedge
$\sigma_s$ Standard deviation of ΔS
σF Standard deviation of ΔF
ρ Coefficient of correlation between ΔS and ΔF
h Hedge ratio The hedge ratio in this method may be used to price available straddle positions the value of which is equal to the cost of the covariance premium. Price and Demand Covariance. Let the historical daily weather data set denoted by $\Omega_{\vec{W}}$. Note that $\Omega_{\vec{W}}$ is a set whose elements is $\vec{W}_t$ and $\Omega_{\vec{W}}$ may have a large number elements. Let N be the number of elements in the set $\Omega_{\vec{W}}$. The probability of drawing any sample from $\Omega_{\vec{W}}$ is 1/N. For each random sample $\vec{W}$ drawn from $\Omega_{\vec{W}}$, we compute the pair: $\{Q_k^H, P_k^{H\zeta}\}$ using (12) or a comparable load forecast), and (8) or comparable price forecast, where (8) is forecast of average daily peak price, and (11) creates hourly prices from the daily average peak price, by randomly sampling a 24 hour price shape pattern from among available observed actual price shape patterns (24 hours) occurring during similar weather conditions for the day.

Hourly Price Shapes. Let the set $\Omega_{\vec{P}}$, we call it Price Shapes, to be the set of historical hourly prices of each 24-hour day. That is, $$\Omega_{\vec{P}} = \{[P_{i,1}^H, P_{i,2}^H, \ldots, P_{i,24}^H]\}_{i=1}^n \quad (20)$$

where $P_{i,k}^H$ denotes the historical price of hour k of day i and n is the total number of historical days, $1 \leq k \leq 24$ and $1 \leq i \leq n$. To further simplify the notation, we use $\vec{P}_i$ to denote the 24-hour prices of day i, i.e. $\vec{P} = [P_{i,1}^H, P_{i,2}^H, \ldots, P_{i,24}^H]$.

Hourly prices $\vec{P}_i$ are then drawn randomly from $\Omega_{\vec{P}}$ with probability 1/n. Suppose that $\vec{P}_j$ is the current random sample of 24-hourly prices, we rescale each coordinate of $\vec{P}_j$ by a common scalar ζ such that the resulting daily average price is equal to $P_j^D$. That is, $$\zeta \sum_{k=1}^{24} \frac{P_{j,k}^H}{24} = P_j^D \quad (21)$$

Note that $P_j^D$ is obtained from (8) using the regressors corresponding to the day j. We denote the ζ scaled scalars $P_{j,k}^H$ by $P_{j,k}^{H\zeta}$. Under the context where there is no confusion about day j, we will write: $P_k^{H\zeta}$ for simplicity.

The system may then define the resulting set of pairs to be:

$$\Omega_{Q,P}^k = \quad (22)$$

$$\left\{ (Q_k^H, P_k^{H\zeta}) \,\Big|\, \vec{W}_t \xrightarrow[(12)]{} Q_k^H, \vec{W}_t \xrightarrow[(8)]{} P_t^D \xrightarrow[(11)]{} P_k^{H\zeta}, \forall \vec{W}_t \in \Omega_{\vec{W}} \right\}$$

As with forecasting of electricity demand discussed above, the system 103 may forecast cost of service in a forward looking optimization. The system may forecast cost of service using similar methods to the electricity demand forecasting discussed above. In other words, a statistical model is used that relates the cost of service to variables such as temperature, humidity, time of day, day of week, and month. The parameters of the model, as before, may be estimated using historical data, and the forecast may be constructed using the same sources as the electricity demand model above.

As more and more system enabled end use and microgrid resource dispatching is enabled via more and more market share adoption of the smart grid application technologies, more PHEV charging, more renewable, more distributed generation, such as solar, wind and storage emerge, the price setter for peaking capacity is likely be, at least in some cases, the end use dispatchable resources, where increased customers' willingness to participate in peaking capacity markets occurs at prices lower than the alternative cost of supply. As such, the system may protect users and utility decision makers from over supplying demand response into a market, by valuing the marginal capacity costs as a function of the end use and microgrid resource dispatching resource's magnitude, relative to the system and the hours of resource availability. However, the user may opt to avoid using the simpler capacity premium, in this case, as this proxy for valuation does not reflect changes in, or consequences derived from, customer loads. The capacity premium method may be informed only by the marginal cost of peaking supply. Conversely, the hourly level valuation methodologies used for shaping and swing premiums may provide demand side information in the derivation of the premiums, as reduced loads during peak times may be reflected in the hourly level load forecasts. As such, lower premiums may emerge over time as more and more load reductions are observed, realized and incorporated into the system's load forecast estimation process.

Optimization Modules

Optimizing, in a preferred embodiment, may include taking data and forecasted inputs, processing the data and forecasted inputs to produce instructions for energy distribution and energy use based upon one or more desired goals. As shown in FIG. 1, the optimizations 105 may include one or more sub-optimizations, such as, but not limited to, demand response optimization 107, peak demand optimization 109, micro dispatch optimization 111, bill target optimization 113, renewable generation optimization 115, and/or microgrid optimization 117. Sub-optimizations may be chosen for particular purposes depending on particular goals. One or more optimizations may be used for a particular application. For example, if minimizing peak demand is a goal of the utility, then the peak demand optimization 109 may be used, whereas if demand reduction is desired, then the demand response optimization 107 may be used. If both goals are desired, both sub-optimizations may be used in combination with results processed to maximize benefits of both sub-optimizations.

The various sub-optimization systems may use a series of complex linear and/or non-linear mathematical models. The models may be applied within customer-specific constraints, along with micro-locational costs and value, which are uniquely specified for a particular customer. Preferably, dispatching occurs for a 1 to 5 minute period, but other time periods may be possible. Dispatching may be subject to the constraints of, for example: a total allowed number of controls per customer per month or season; a maximum cycling for an appliance; soft and hard costs associated with controlling customers, which can be expressed as RMCs, or the loss of comfort, cost of incentives, or direct payments to customers, i.e., bids; and/or costs that vary by appliances or end-uses.

The optimization systems may capture both a decrease in costs (LMP including adders), as well as the decrease in revenue. The optimization systems can be refined to capture any regulatory shared savings aspects, which depend on avoided costs, down to a customer level. The formulations may be general enough to include other end-uses and customers, with or without distributed generation, such as solar water heat, PV, storage or PHEV battery charging and discharging. Additional control options may lead to less need for all customers to have control boxes, or may create more options for utilities to alternatively tap into houses.

Figure 8:
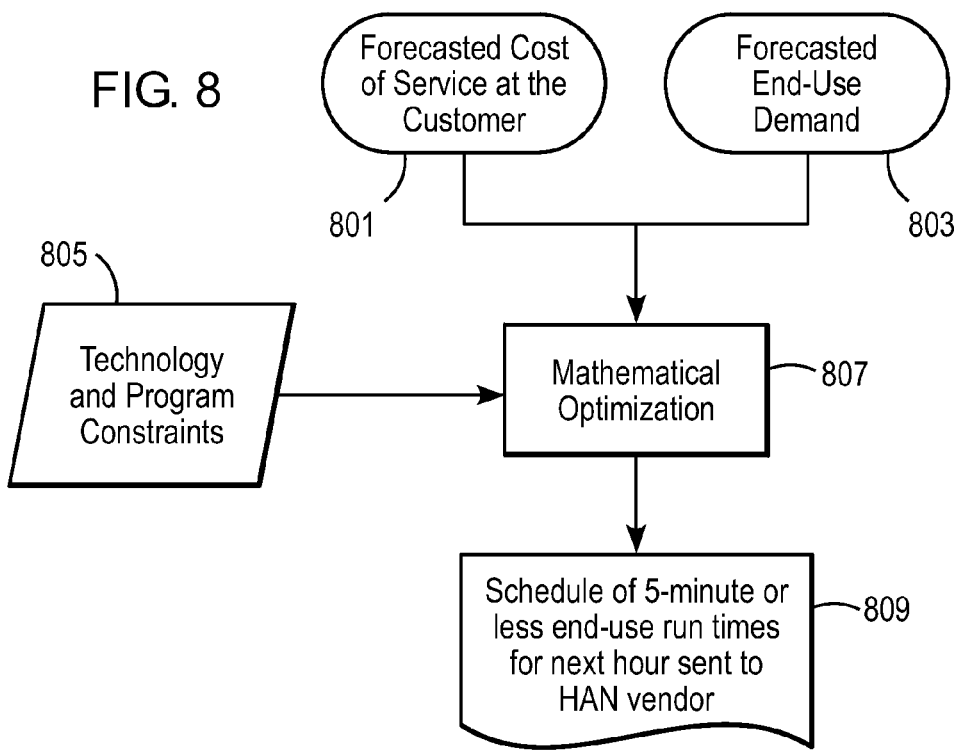
FIG. 8 is a flow chart showing a general flow for optimizations.

FIG. 8 is a flow chart showing a general flow for optimizations. An optimization system may receive forecast cost of service at the customer 801, a forecast end-use demand 803, and/or technology and program constraints 805. A mathematical optimization 807 may then use the inputs and output a schedule of end-use run times, such as at a five minute level or less for the next hour 809, which may be sent to the HAN vendor server 123.

In various optimizations, at a minimum, there may be a constraint that individual demand reductions must sum to the total required reduction needed by the utility. Other constraints that may be included in the system are: cycling of the appliance is within the lower and upper bounds; maintaining a certain level of indoor temperature for each customer; maintaining a minimum level of water temperature in the hot water heater; not cycling an appliance faster than its manufactured limits, as well as other technical limitations of the appliance; staggering starts to avoid rapid load increases; and determining probability that a customer may override based on statistical modeling of past events.

The mathematical algorithms within the optimizations may determine the optimal combination of distributed resource and appliance control, coordination and dispatching, given set constraints and conditions. Every dispatching solution, however may be uniquely defined by the customers, the loads, the forecasts, constraints and objectives of each new desired solution. Therefore, it is impossible to pre-specify the exact set of optimal dispatching solutions. Rather, the optimizations may enable an optimal dispatching and cycling of these resources to achieve the maximum energy and peak demand savings, subject to customer or utility specified constraints. In subsequent hours, or span of hours, as new constraints and conditions are observed, a new and different optimal dispatch solution is determined and made available for execution.

Specific Optimizations

The next sections address several sub-optimization models included in the optimizations 105.

Demand Response Optimization (Curtailment)

The demand response optimization 107 may involve curtailment of use by customers.

In certain situations, a utility may be faced with a condition where there is no inventory, or buffer, between supply and demand. As such, supply must follow demand in real or near-real time to ensure a supply/demand balance. Embodiments of the present invention may provide a systematic solution to demand adjustments. The demand adjustments may be subject to changing marginal costs of supply, such that overall costs are minimized, creating a virtual, real or near-real time inventory buffer between supply and demand.

During specific peak hours, the expected total peak demand (kW) for electricity may exceed the availability of power supplies, increase costs of providing power, or jeopardize reliable supply. In response, the utility can purchase power from other power generators, which can be very costly or not feasible where constraints exist in the transmission system. Alternatively, the utility can adjust demand to mitigate the shortfall in the supply/demand balance by sponsoring load reductions in demand.

Embodiments of the present invention may provide an optimal dispatching of specific end-uses under this situation, subject to constraints pre-set by customers, and accounts for variable costs to serve each customer, such that the overall dispatching strategies are jointly optimal across varying supply and demand conditions. Other demand response methods do not: (1) jointly optimize demand with supply, subject to customer constraints or multiple utility objective functions; (2) consider customer specific marginal costs, (3) update in real time (5 minutes or less); (4) capture ancillary service value; and/or (5) consider grid benefits such as leveling load on service transformers, reducing line losses or targeting specific grid areas in need to increased voltage support.

An objective of demand response optimization 107 may be to maximize utility revenue while achieving a demand reduction specified by the utility.

Mathematically, the problem is described below. Decision variables may include:

$X_{ijh}$=the fraction of hour h to interrupt customer i, appliance j

Data may include:

$I_{ijh}$=the cost per hour to interrupt customer i in hour h, appliance j (the incentive)

$COS_{ih}$=the forecast cost to serve electricity to customer i in hour h $R_{ih}$=cost per hour charged to customer i in hour h (the rate, it can also be a flat rate, which does not vary over time)

Demand$_{ijh}$=the forecast demand for energy for customer i, hour h, appliance j Hours$_{ij}$=total hours of interruption allowed for customer i, appliance j Reduction$_h$=the utility's required energy reduction for hour h UB$_{ijh}$=upper bound on fraction of hour h that the utility can interrupt customer i, appliance j (0<=UB$_{ijh}$<=1)

The system can be set to maximize the revenue, and, thus, maximize avoided cost:

$$\text{Max} \sum_{i \in I} \sum_{j \in J} \sum_{h \in H} (R_{ih} Demand_{ijh}(1 - X_{ijh}) - $$

$$(I_{ijh} Demand_{ijh} X_{ijh} + COS_{it} Demand_{ijh}(1 - X_{ijh})))$$

s.t.

$$\sum_{h \in H} X_{ijh} \leq Hours_{ij}$$

$$i \in I, j \in J$$

$$0 \leq X_{ijh} \leq UB_{ijh}$$

$$i \in I, j \in J, h \in H$$

$$\sum_{i \in I} \sum_{j \in J} Demand_{ijh} X_{ijh} = Reduction_h$$

$$h \in H$$

The same model can also be used to address different situations. For example, if the incentive cost ($I_{ijh}$) is not set by the utility, but is allowed to be set by individual customers through bids (real or near-real time, prior to the actual event), then this same approach can be used for a bidding program irrespective of a sector. Alternatively, the cost of curtailment can also be replaced by the customer's self-reported cost of curtailing the end-use. This can include the cost of lost comfort, the cost of lost production, etc.

There may be several inputs into the demand response optimization for curtailment. Before addressing the details about the input variables, it may be noted that this problem is a forward looking situation. A relevant issue may concern how much demand reduction must be achieved to balance demand and supply in the next period. Therefore, a majority of the variables in the optimization must be forecast as they cannot be measured. In contrast, there may be variables that need not be measured as they are known before a problem arises. These two types of inputs are addressed separately.

The list of inputs for this optimization may be known or forecast. Inputs may include: customer has agreed to participate at that time; technology constraints; upper bound of curtailment; allowed total hours of reduction; required reduction; incentive; allowed hours of reduction; forecast inputs; cost of service; demand by end-use; voltage/power factor; line losses; total premise load; 5 Min LMP forecast; and/or weather forecast.

Known inputs may include: allowed hours of interruption (Hours$_{ij}$), incentive ($I_{ijh}$), rate ($R_{ijh}$), and required reduction (Reduction$_h$). Other inputs that are likely to be known at the time of optimization but that are not explicitly shown in the equations may include constraints such as whether or not the customer has agreed to curtailment during that specific period or has opted-out, and technology constraints about the specific end-uses (e.g., minimum battery charge times, recovery time). For example, it is not possible to force a water heater to run on, the system can only issue commands for when the water heater is not allowed to turn on. Note, however, that by observing the length of time between a system imposed off signal and when the water heater turns on due to its natural duty cycle (by doing small scale testing including different lengths of shut-off periods), it is possible to develop a customer specific relationship between the cut-off period and the maximum recovery period. This relationship may then be incorporated within the optimization to ensure that the on and off times capture the both the required load as well as recovery times.

As noted above, the allowed hours of interruption (Hours$_{ij}$) may be a known variable. The allowed hours of interruption are generally stated as part of the terms and condition of the program. If the allowed hours of interruption are not included in the optimization, then it is possible that some customers would be dispatched more than they agreed.

The incentive ($I_{ijh}$) may also be part of the terms of conditions of a utility program. Since utilities are often regulated, incentives are usually the same for all customers within a given rate class to avoid any indication of discrimination. However, since the cost of supplying electricity differs across customers, it is more efficient and less costly to offer different incentives to different customers. It also may be beneficial to vary incentives by time period, cost to serve, or to dispatch costlier loads in ways that lower overall total costs for the system. In these cases, the system may adjust the dispatching specifications to accommodate individual customer costs to serve, to yield optimal incentives, to respond to bid-in prices from customers for their load, for pricing signal setting or for overall customer load dispatching. Note that the concepts of incentives and "bids" are analogous within the description. The system dispatching solutions operate in the same manner, but the inputs may vary, given the extent to which the utility has flexibility to optimize overall dispatching down to individualized customer or end use costs, or bids.

Every customer may have a different response to incentives offered by the utility to control appliances during an event. Once price elasticities are measured, either through surveys, customer bidding programs, past events or other means, and a program is set up whereby customers are paid on the basis of how much energy they are likely to save during an event, the system may maximize the avoided cost while minimizing the total incentive cost.

Table 1 shows different incentive elasticities across customers. In the first column there is a flat rate for all customers, but in the second column the incentive varies as the customer saves more. In both cases, the required demand reduction may be met, and the total avoided cost is similar, but the incentive cost (the customer payments) is substantially smaller when incentives are based on price elasticity, and customers are disptached using the system and this price elasticity.

TABLE 1

| | Incentives | |
| --- | --- | --- |
| | Flat | Behavioral |
| Avoided Cost | $348 | $351 |
| Customer Payments | $200 | $23 |

This same behavioral model in the system can be used to capture such things as probablility of overrides during an event, forecasting when customers will come home or leave the house, predicting when there will be a sudden increase in water heating use due to showers/baths, etc. All this information can be incorporated into the dispatching descions by the system.

The rate ($R_{ijh}$) may be a generalized term that accommodates any type of rate, such as a flat rate or a time-differentiated rate. Examples of time differentiated rates may include real-time pricing (RTP), where the rates vary by the hour, time-of-use (TOU) rates, where the rates vary by well defined periods of the day, and/or critical-peak prices (CPP), where customers are charged a very high price during periods where the utility is experiencing critical demand conditions. These prices or rates may be issued in advance, or in real time. When issued in advance, the rate may be known within the optimization. Where the rate is forecast (i.e., 5 min LMP, real time RTP), or where the utility is responding to prices in real-time, the rate may not be known and the system may use a marginal costing estimation process, which includes both supply and demand resources, to estimate the magnitude of change in forecast prices, given the duration, magnitude and hours of availability for demand side resources.

The required reduction ($Reduction_h$) may also be known. The utility may have the ability to forecast total demand and total supply. Therefore, it may be more efficient to respond to system level load reduction specifications or to report to system operators hourly forecasts of enabled load reduction realizations. The optimization may project current day and/or next day load reduction capability, the level of which may be ultimately selected by users or system operators. As is the case with rate ($R_{ijh}$), as the level of demand under management of the system increases the demand reduction may change from being known to requiring forecasting. These effects may be estimated by a marginal costing estimation process, where the incremental cost of the last unit of demand reduction is matched to the incremental supply cost. In this manner, the utility does not overpay for too much demand reduction. As such, the system may stop short of joint dispatching of both supply and demand directly, opting instead to estimate the cost consequences of varied demand reduction realizations on supply, as a proxy. This approach may be used because a true joint dispatch of all these resources may be too slow and cumbersome to operate efficiently given the time constraints involved.

In addition to the above known inputs, forecast inputs may also be used. The key sets of forecast inputs into the optimization are (1) demand ($Demand_{ijt}$) for dispatchable end-uses, and (2) costs to serve (COS) the dispatchable end-uses.

Demand may be forecast for dispatchable end uses. Examples of dispatchable end-uses that may be forecast may include HVAC and water heating, but may extend to electric vehicle battery charging needs, lighting, pool pumps, spas and other end uses. While there are several methods for forecasting electricity demand, including neural networks and Markov Chains, a preferred method may use a statistical modeling framework.

A fitted value for each dispatchable end-use may be developed and used for demand ($Demand_{ijt}$). This forecast may extend out from the next hour to the end of the month and may be stored the one or more databases 133. These forecasts may be constantly developed and stored so that the utility can call a demand response event at any time and all the necessary inputs are available.

Cost of service (COS) may also be forecast. When forecasting cost of service, several variables may also need to be forecast as well. These additional sub-variables may include the cost of service adders, described previously. The forecasts of the additional sub-variables are individually described below.

LMP nodal cost at bus: The current 5-minute LMP nodal cost at bus ($LMP_t$) may be obtained directly from the independent system operator (ISO) or the utility. An actual system generation cost from the energy provider or a locational marginal cost of energy from an independent system operator for a bus may be received in near real-time.

The system, however, may need forecasts of the future LMP nodal cost at bus. There may be several methods for forecasting electricity demand, where a preferred method may use a statistical modeling framework where:

$LMP_t$=LMP nodal cost at bus at time $t$.

$X_t$=Set of explanatory variables during period $t$ for customer $i$.

The LMP at any point in time depends upon complex interactions of many variables including total system demand, total available generation units, system load, load on the bus, load on other buses, transmission system/capacity status and characteristics, microgrid distributed generation, power flows, and if it is a deregulated market, bidding strategies and future price expectations. Many of these variables may be difficult to obtain, particularly in near real-time. Forecasting a system generation cost may also use forecasted weather conditions, forced outage and transmission congestion inputs, generation units, forecasted system load, microgrid distributed generation forecasts, forecasted demand reductions, and/or a forecasted load at the bus. Therefore, as an approximation, a reasonable approximation may be to have the X matrix consist of variables, which may be separate, interactive, non-linear, and/or moving average terms, such as temperature, humidity, wind speed, and indicators for time of day, day of week, and month. However, to capture the complexity of the LMP variable, these variables may be expressed single variables, lagged variables, interacted variables, as well as moving averages. In addition, a series of past LMP terms may be included as well, either as lagged terms, interactive terms, or as moving averages.

Estimation may use an autoregressive moving average (ARMA) specification. Specifically, as new LMP nodal cost at bus data is received, the system may estimate the following equation using the autoregressive moving average (ARMA (p,q)) specification:

$$\phi(L)[(1-L)(LMP_t - X_t\beta] = \theta(L)\epsilon_t \quad (23)$$

Where $$L^j LMP_t = LMP_{t-j}$$

$$\phi(L) = 1 - \phi_1 L - \phi_2 L^2 - \ldots - \phi_p L^p$$

$$\theta(L) = 1 - \theta_1 L - \theta_2 L^2 - \ldots - \theta_q L^q$$

The parameters estimated may be $\emptyset$ (p×1), $\theta$ (q×1), $\beta$, and $\sigma^2$.

The output of the demand response optimization 107 may be a schedule of optimal load profiles for each controllable end-use. The optimal load profiles may be for a particular time period, such as each five minute interval, or less, for each customer that has a HAN device for the next hour during a demand response event. This schedule may be sent to the HAN vendor server 123. It may be the HAN vendor's responsibility to ensure that these signals are sent to the appropriate end-use at the appropriate location, and that their control technology can follow these dispatching signals.

Uncertainty: There may be some uncertainty with the demand response optimization 107. Since the demand response optimization 107 may be forward looking, it may require forecasting of demand and COS as discussed above. These variables may not be known with certainty. Therefore, any resulting solution of the optimization may have an associated degree of uncertainty. Therefore, this problem may be solved using stochastic optimization methods, rather than the deterministic optimization presented above.

Since this system may include both the optimization equation and the forecasting models of the demand and COS variables, a probability (mean and variance) of these variables as estimated from the customer-specific regression equations discussed above may be used. This approach may unify the forecasting and optimization analysis, and may more directly incorporate the inter-relationships between weather, appliance holdings, demand, and prices than would be found by prior art of Monte Carlo sampling of the data to develop the probability distribution of the variables.

The next step in developing the stochastic specification of the problem may require defining the optimization problem. Since the demand and COS input variables are no longer single points but random variables, the resulting optimal solution is also no longer a single point, and so maximizing profit, for example, is not sufficient. Alternatives include: Markov Variation to maximize the expected profit while minimizing the variance of profits; Value at Risk (VaR) to do no worse than a set profit level (the value at risk) with a given probability, or to protect downside risk; Conditional Value at Risk (CVaR), where CVaR extends the VaR concept by minimizing the probability of the expected having a profit below the VaR; Maximize the expected profit subject to a profit floor; robust estimation, which does not use probability, and just maximizes the minimum possible outcome.

The choice between these alternatives may be dependent upon a choice of the decision makers at the utility or user, so the system may be capable of any of these formulations. However, a preferred formulation may be the CVaR specification, since this is superior to the well-known and often used VaR approach. The CVaR specification of this optimization may be:

$$\text{Min} \sum_{k \in N} p_k v_k$$

$$\sum_{i \in I} \sum_{j \in J} \sum_{h \in H} (R_{ih} \text{Demand}_{kijh}(1 - X_{ijh}) -$$

$$(I_{ijh} \text{Demand}_{kijh} X_{ijh} + \text{COS}_{kih} \text{Demand}_{kijh}(1 - X_{ijh}))) = r_k \ k \in N$$

$$v_0 - r_k \le v_k \ k \in N$$

$$v_k \ge 0 \ k \in N$$

$$\sum_{h \in H} X_{ijh} \le \text{Hours}_{ij} \ i \in I, j \in J$$

$$0 \le X_{ijh} \le UB_{ijh} \ i \in I, j \in J, h \in H$$

$$\sum_{i \in I} \sum_{j \in J} \text{Demand}_{kijh} X_{ijh} = \text{Reduction}_h \ k \in N, h \in H$$

The additional Stochastic parameters may be:
  $p_k$=the probability of scenario k (based on the joint distribution of $COS_{kih}$ and $Demand_{kijh}$).
  $COS_{kih}$=the cost to serve electricity to customer i in hour h in scenario k (from the estimated forecast model).
  $Demand_{kijh}$=the demand for energy for customer i, hour h, appliance j in scenario k (from the estimated forecast model).
  $v_0$=the conditional value at risk (determined by the end-user).
  Additional Stochastic Variables:
  $v_k$=the return under scenario k.

Figure 9:
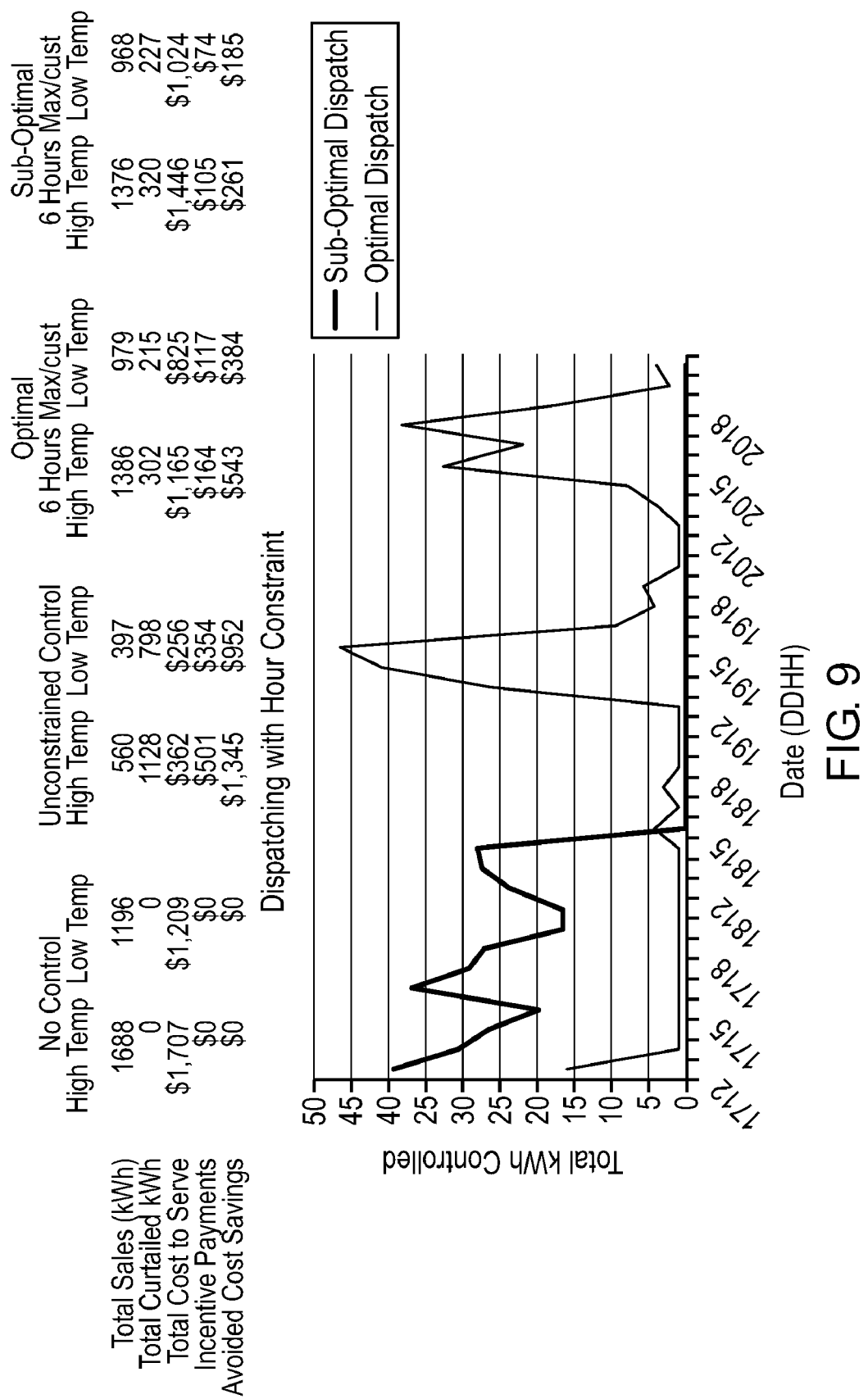
FIG. 9 is a graph and table showing dispatching with hour constraints in an embodiment.

FIG. 9 is a graph and table showing dispatching with hour constraints when accounting for uncertainty. As shown in FIG. 9, forward market price, capacity need and weather uncertainties may increase the complexity and value that can be derived from the system. A suboptimal scenario shows the utility releasing the demand response resource too early in the week in response to high temps. An optimal scenario requires waiting based on load forecast probability estimates, short term weather forecast, and pre-set customer comfort and price constraints. Optimal dispatch for the week may require waiting a day or more to preserve option value for later in the week.

A stochastic optimization approach such as the one above may be used to optimally allocate the capacity, swing and shaping premiums over peak hours given the uncertainty over future weather conditions. This may be accomplished by adding an additional constraint into the model that assigns a customer-specific premium allocation over a given period, the sum of which equals the required premium required by the utility. The demand forecasting may incorporate both weather conditions as well as price responses (elasticity), and the COS may also incorporate weather conditions, so the resulting forward looking premium allocations from this approach may capture the uncertainty of weather as well as the interactions between price and demand.

This approach may also be used to optimally allocate the ancillary service management under uncertain demand conditions. In general, if demand has low volatility (hence a low degree of error in the demand forecast), then the optimal solution to the stochastic optimization problem may also have a low level of uncertainty. Under the CVaR approach, this implies that the value at risk is low, so from the ancillary services perspective, the optimal management of the demand resources may be well defined. In other words, the dispatching signals have little uncertainty associated with them, and there is no need to defer or delay signals. Conversely, if demand is very volatile (hence the forecast is likely to have a large error term), then the solution to the stochastic optimization may also have a large degree of uncertainty. From the CVaR perspective, this would imply a large value of risk. For ancillary services perspective, this large value at risk may result in a situation where it may be better to delay the signals so that more information is obtained, which would lower the uncertainty and thus lower the CVaR, which would in turn lower the resources that are available at the 5 minute level.

Demand Response Optimization (Load Leveling)

In the previous demand response optimization 109 scenario, the utility decreased system peak demand by actually forcing customers to reducing their consumption, i.e., curtailment. With load leveling, it may be possible to reduce demand (kW) by coordinating customers so that all appliances do not start at the same time. To ensure that the utility does not lose revenue, which is determine by kWh, and the customers do not sacrifice comfort, also determined by kWh, a constraint may be that the total kWh for each hour is constant.

An objective of the load leveling optimization may be to minimize the utility's total peak kW, over a 5-minute or other length period, during an hour while keeping total kWh constant for each customer.

Mathematically, the problem may require a decision variable:
  $X_{ijt}$=1 if the appliance can run in period t, for customer i appliance j, 0 if not.
  Data may include:
  $Demand_{ij}$=the forecast demand for energy for customer I, appliance j $RP_j$ = the real power of appliance j (assumed for simplicity to be constant over time, but it can vary over time)

Thus, the optimization may be:

Min $P$ s.t.

$$\sum_{t \in T} X_{ijt} \cdot RP_j = Demand_{ij} \quad i \in I, j \in J$$

$$P \geq \sum_{i \in I} \sum_{j \in J} X_{ijt} \cdot RP_j \quad t \in T$$

In this specification, P may be the peak demand for the hour. This specification can readily be extended for more than multiple hours (H) by relaxing the demand constraint. Specifically, since water heaters generally keep water temperature even without regular electricity use, the demand constraint can be relaxed by having the just the total kWh for water heating being meet across all the hours of interest, while the HVAC kWh must be meet for each hour of interest. Specifically:

Min $P$ s.t.

$$\sum_{t \in T} X_{ijth} RP_j = Demand_{ijh} \quad i \in I, \ h \in H, j \in HVAC$$

$$\sum_{t \in T} \sum_{h \in H} X_{ijth} RP_j = \sum_{h \in H} Demand_{ijh} \quad i \in I, j \in J \neq HVAC$$

$$P \geq \sum_{i \in I} \sum_{j \in J} X_{ijth} RP_j \quad t \in T, h \in H$$

In this specification, P is the peak demand for all hours in H.

The end result of the load leveling optimization may be that kW is equal or approximately equal during all t periods. Thus, the peak load may become "levelized".

Figure 10:
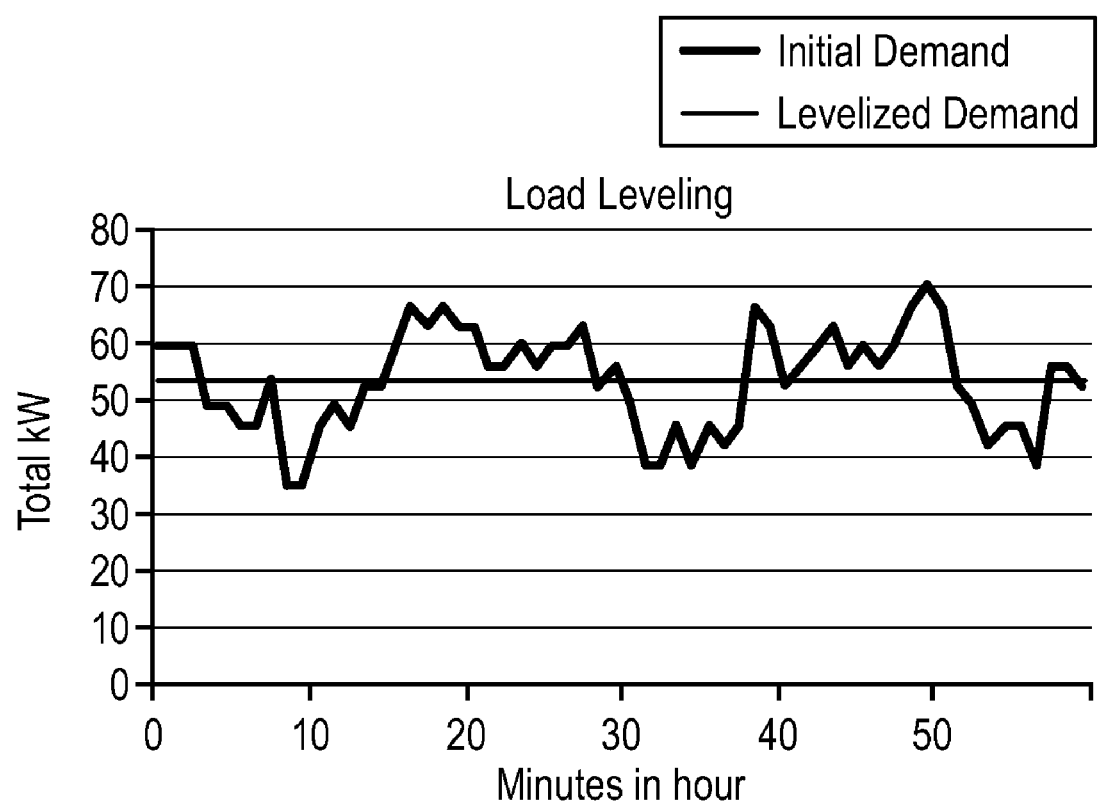
FIG. 10 shows an exemplary solution of a load leveling optimization.

FIG. 10 and Table 2 show an example of load leveling optimization for a single hour assuming a single end-use (AC). These results show that the kWh for each of the 24 customers is unchanged, and the peak demand is reduced from a maximum of 70 kW to 53.5 kW (a savings of over 23%). Notice that the peak kW is levelized, and is equal to the average of the un-levelized kW over the period.

TABLE 2

| | kWh | |
|---|---|---|
| | Original | Levelized |
| Cust1 | 59.5 | 59.5 |
| Cust2 | 199.5 | 199.5 |
| Cust3 | 140 | 140 |
| Cust4 | 91 | 91 |
| Cust5 | 87.5 | 87.5 |
| Cust6 | 168 | 168 |
| Cust7 | 91 | 91 |
| Cust8 | 105 | 105 |
| Cust9 | 196 | 196 |
| Cust10 | 206.5 | 206.5 |
| Cust11 | 182 | 182 |
| Cust12 | 665 | 66.5 |
| Cust13 | 101.5 | 101.5 |
| Cust14 | 196 | 196 |

TABLE 2-continued

| | kWh | |
|---|---|---|
| | Original | Levelized |
| Cust15 | 157.5 | 157.5 |
| Cust16 | 52.5 | 52.5 |
| Cust17 | 112 | 112 |
| Cust18 | 196 | 196 |
| Cust19 | 196 | 196 |
| Cust20 | 35 | 35 |
| Cust21 | 154 | 154 |
| Cust22 | 143.5 | 143.5 |
| Cust23 | 77 | 77 |
| Cust24 | 196 | 196 |

Finally, the load leveling optimization may also be extended to account for consumption of households that do not have the home area network (HAN) technology. When it is possible to develop forecasts of the total household electricity use of the non-HAN households from data collected by smart meters, for example, then it may be possible to use the HAN equipped households to levelize total demand for both HAN and non-HAN households by changing the optimization equations. The new optimization may become:

Min $P$ s.t.

$$\sum_{t \in T} X_{ijth} RP_j = Demand_{ijh} \quad i \in I, h \in H, \ j \in HVAC$$

$$\sum_{t \in T} \sum_{h \in H} X_{ijth} RP_j = \sum_{h \in H} Demand_{ijh} \quad i \in I, j \in J \neq HVAC$$

$$P \geq \sum_{n \in N} NDemand_{nh} + \sum_{i \in I} \sum_{j \in J} X_{ijth} RP_j \quad t \in T, h \in H$$

Where $NDemand_{nh}$ is the demand for the non-HAN customer n in hour h (this term can also be used to capture non-dispatchable end-uses at HAN premises).

Figure 11A:
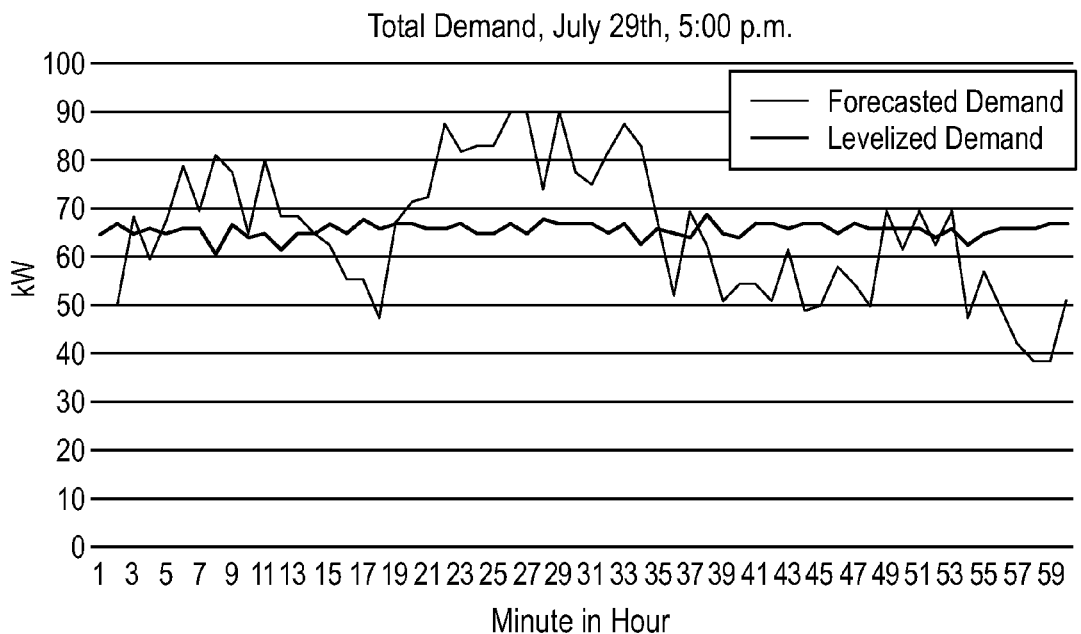
FIGS. 11A-11B show an exemplary solution of a load leveling optimization but adding non-HAN households.
Figure 11B:
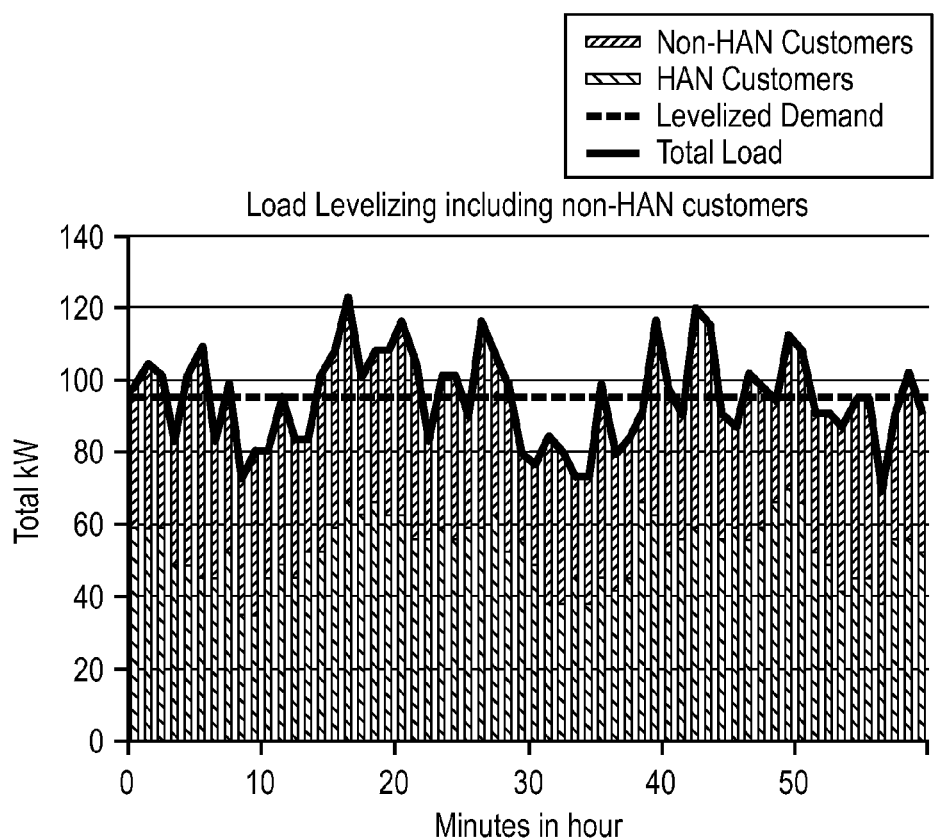

FIG. 11A and FIG. 11B show an example of the load leveling optimization for a single hour using the same data in the previous example but now adding 24 non-HAN households, also with a single-end use. These results show that the kWh for each of the 24 HAN customers is unchanged, and the peak demand is reduced from a maximum of 122 kW to 95 kW (a savings of over 22%). Table 3 shows the results of this optimization.

TABLE 3

| | kWh | | Non-HAN | kWh | |
|---|---|---|---|---|---|
| HAN Customers | Original | Levelized | Customers | Original | Levelized |
| Cust1 | 59.5 | 59.5 | Cust1 | 105 | 105 |
| Cust2 | 199.5 | 199.5 | Cust2 | 101.5 | 101.5 |
| Cust3 | 140 | 140 | Cust3 | 101.5 | 101.5 |
| Cust4 | 91 | 91 | Cust4 | 122.5 | 122.5 |
| Cust5 | 87.5 | 87.5 | Cust5 | 115.5 | 115.5 |
| Cust6 | 168 | 168 | Cust6 | 129.5 | 129.5 |
| Cust7 | 91 | 91 | Cust7 | 115.5 | 115.5 |
| Cust8 | 105 | 105 | Cust8 | 126 | 126 |
| Cust9 | 196 | 196 | Cust9 | 105 | 105 |
| Cust10 | 206.5 | 206.5 | Cust10 | 87.5 | 87.5 |
| Cust11 | 182 | 182 | Cust11 | 91 | 91 |
| Cust12 | 66.5 | 66.5 | Cust12 | 112 | 112 |
| Cust13 | 101.5 | 101.5 | Cust13 | 91 | 91 |
| Cust14 | 196 | 196 | Cust14 | 112 | 112 |
| Cust15 | 157.5 | 157.5 | Cust15 | 98 | 98 |

TABLE 3-continued

| HAN Customers | kWh Original | kWh Levelized | Non-HAN Customers | kWh Original | kWh Levelized |
|---|---|---|---|---|---|
| Cust16 | 52.5 | 52.5 | Cust16 | 98 | 98 |
| Cust17 | 112 | 112 | Cust17 | 80.5 | 80.5 |
| Cust18 | 196 | 196 | Cust18 | 105 | 105 |
| Cust19 | 196 | 196 | Cust19 | 122.5 | 122.5 |
| Cust20 | 35 | 35 | Cust20 | 87.5 | 87.5 |
| Cust21 | 154 | 154 | Cust21 | 80.5 | 80.5 |
| Cust22 | 143.5 | 143.5 | Cust22 | 112 | 112 |
| Cust23 | 77 | 77 | Cust23 | 119 | 119 |
| Cust24 | 196 | 196 | Cust24 | 84 | 84 |

The load leveling optimization may have several input variables. As discussed above for the curtailment optimization, the load leveling optimization uses both known and forecast variables.

Known inputs may include: (1) whether a customer has agreed to participate; (2) real power of the end-uses; (3) technology constraints; (4) forecast inputs; (5) cost of service; (6) demand by end-use; (7) voltage/power factor; (8) total premise load; and/or (9) weather forecasts. Note that this load leveling optimization does not include prices.

Since the load leveling optimization does not affect the customers total energy usage, this optimization may not involve incentives, reduction targets, or other types of data commonly found in a typical demand response program. Essentially, the only inputs that may be known when the load leveling optimization is run include (1) whether a customer has agreed to participate, and (2) the real power of the end-uses, which may be measured either at the time of installation of the HAN or by sensors associated with the HAN system.

Two sets of forecast inputs into the load leveling optimization may include: (1) demand for dispatchable end-uses, and (2) forecasts of total premise load for HAN and non-HAN facilities.

Demand for Dispatchable End-Uses: The load leveling optimization may forecast electricity demand for participating dispatchable end-uses at each customer's house as described above for forecasting electricity demand.

Demand for Non-Dispatchable End-Uses: For non-HAN households, the total premise usage may be forecast using the same statistical procedure for dispatchable end-uses, where the dependent variable may be the 5 minute premise level total energy use collected from smart meters, and the independent variables may include such terms as the temperature, humidity, time of day, day of week, and month. If the rate is time-differentiated, then X would include terms to capture the price elasticity effects of the changing rate.

If there is a significant component of the HAN households that contribute to peak demand that is not dispatchable, then it may be necessary to explicitly incorporate these end-uses in this optimization through an N Demand term. Rather than trying to compute the non-dispatchable demand directly though each individual end-use, the system may compute the non-dispatchable demand by developing a total electricity demand for the household and then subtract the forecasts of the dispatchable end-uses discussed above. The difference may be assumed to be the non-dispatchable household load. Since the total household electricity demand may be composed of a wide variety of different end-uses, many of which are unknown, the model for forecasting the load may include weather and non-weather terms. In general, the procedure may be identical to the procedure used for the dispatchable end-uses and may use the same statistical framework.

Demand Response Optimization (Real-Time Curtailment)

It may be possible to combine the two demand response optimizations described above and dispatch customers in real or near-real time 111. Real-time curtailment may utilize a real or near-real time cost to serve the customers by moving consumption to less expensive periods, such that over the entire time period energy use (kWh) is constant. Thus, the utility may gain a significant amount of avoided cost, yet the customer may not have any change in comfort or total usage of the end-use.

An objective of real-time curtailment may be to minimize the utility's total peak kW (over a 5-minute period) during an hour while keeping total kWh constant for each customer. Mathematically, the problem may use a decision variable:

$X_{ijth}=1$ if customer i appliance j can run in period t in hour h, 0 if not.

The real-time curtailment may also use data:

$COS_{ith}$=the forecast cost to serve electricity to customer i in period t, hour h $R_{ih}$=cost per hour charged to customer i during hour h (the rate, it can also be a flat rate, which does not vary over time)

$RP_j$=the real power of appliance j (assumed for simplicity to be constant over time, but it can vary over time)

$Demand_{ijh}$=the forecast demand for energy for customer i, appliance j during period t, hour h.

The real-time dispatching problem may be used to maximize revenue, and, thus, maximize avoided cost:

$$\text{Max} \sum_{h \in H} \sum_{i \in I} \left( R_{ih} - \sum_{t \in T} COS_{ith} \sum_{j \in J} (X_{ijth} \cdot RP_j) \right)$$

s.t.

$$\sum_{t \in T} X_{ijth} \cdot RP_j = Demand_{ijh} \quad i \in I, j \in J, h \in H$$

To capture ancillary service value, which must be available at the 10 minute or finer level, the t interval in the optimization in the system may be set to 5-minutes. Any longer time period may significantly diminish the value of any demand or cost reduction from dispatching resources.

A concept in real-time curtailment may be to dispatch customers at a 5-minute level so most of the energy consumption occurs at the lower cost-to-serve periods and little energy is used during the higher cost-to-serve periods. However, the total energy use for each hour for each appliance and each customer may be held constant, so that the customers do not have to sacrifice any comfort for the utility to achieve these least cost solution.

As specified above, the optimization does not incorporate any constraints regarding the peak (kW) demand. It is possible that the intra-hour shifting would result in very high kW usage during low cost-of-service periods. There are several ways methods that may avoid this issue including incorporating a specific peak demand constraint or incorporating costs that increase with increasing kW to capture capacitor, circuit upgrade, and substation addition costs.

Figure 12A:
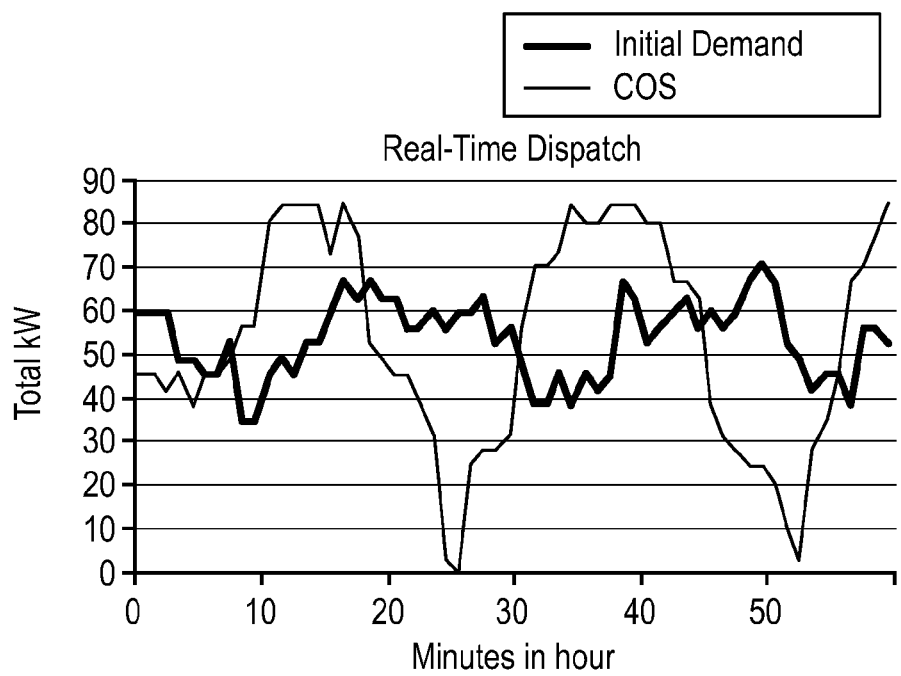
FIGS. 12A-12B show exemplary solutions under real-time curtailment.
Figure 12B:
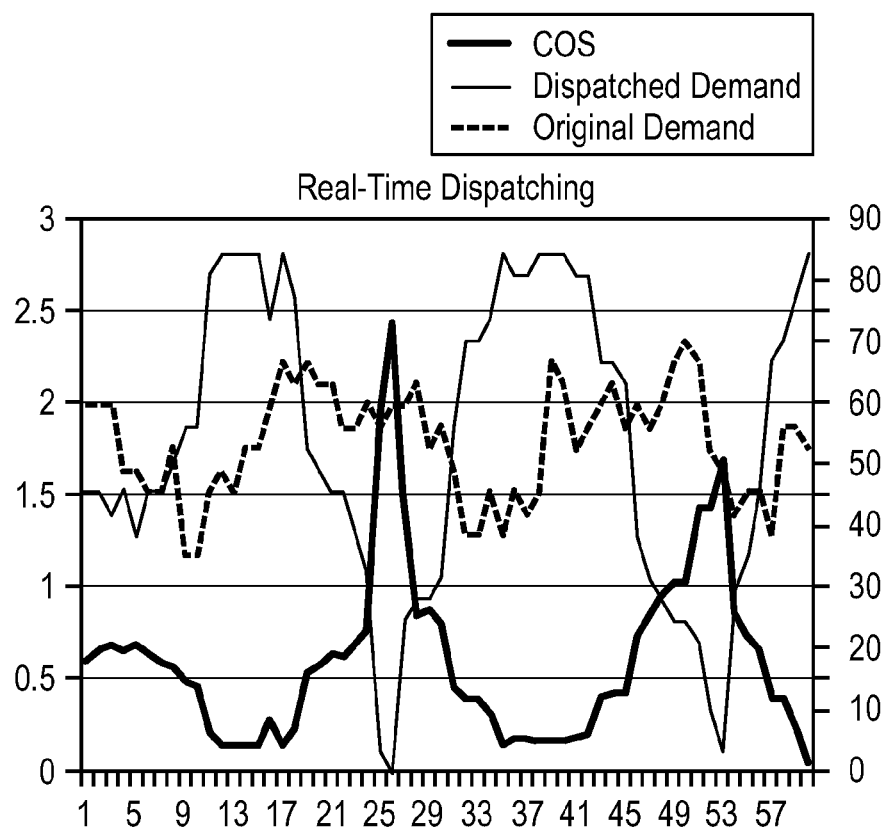

FIG. 12A and FIG. 12B show an example of real-time curtailment for a single hour assuming a single end-use (AC) and a single cost-of-service (COS) for all customers. FIG. 12A shows the resulting solution of real-time dispatching relative to original demand, and FIG. 12B shows the original and the optimal solution relative to the COS, showing how the optimal demand is reduced during the high COS periods and increased during the low COS periods. Table 4 shows how the total kWh is unchanged for each customer as well as showing the decrease in total COS in this example, a 38% reduction.

TABLE 4

| | kWh | |
|---|---|---|
| | Original | Levelized |
| Customer 1 | 59.5 | 59.5 |
| Customer 2 | 199.5 | 199.5 |
| Customer 3 | 140 | 140 |
| Customer 4 | 91 | 91 |
| Customer 5 | 87.5 | 87.5 |
| Customer 6 | 168 | 168 |
| Customer 7 | 91 | 91 |
| Customer 8 | 105 | 105 |
| Customer 9 | 196 | 196 |
| Customer 10 | 206.5 | 206.5 |
| Customer 11 | 182 | 182 |
| Customer 12 | 66.5 | 66.5 |
| Customer 13 | 101.5 | 101.5 |
| Customer 14 | 196 | 196 |
| Customer 15 | 157.5 | 157.5 |
| Customer 16 | 52.5 | 52.5 |
| Customer 17 | 112 | 112 |
| Customer 18 | 196 | 196 |
| Customer 19 | 196 | 196 |
| Customer 20 | 35 | 35 |
| Customer 21 | 154 | 154 |
| Customer 22 | 143.5 | 143.5 |
| Customer 23 | 77 | 77 |
| Customer 24 | 196 | 196 |
| Total COS | $1,994 | $1,311 |

The processing of known and forecasted inputs is similar to those discussed above for curtailment and load leveling. Voltage forecasts and uncertainty may also be similar to that discussed above for curtailment and load leveling.

Bill Target Optimization

The bill target optimization 113 may allow individual customers to set electric bills going forward over a period. In exchange for a set bill, the individual customers may allow the utility to control appliances to achieve the bill target amount at the end of the period.

Figure 13:
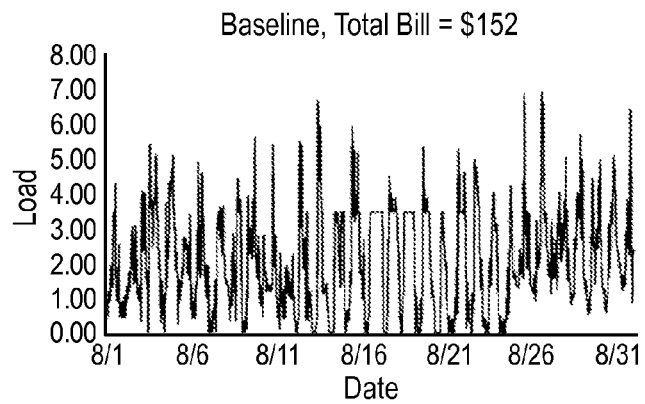
FIG. 13 shows an example monthly bill under a bill target optimization
Figure 13:
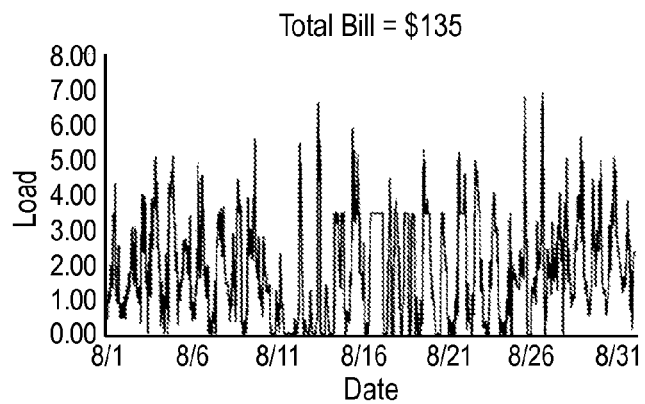
Figure 13:
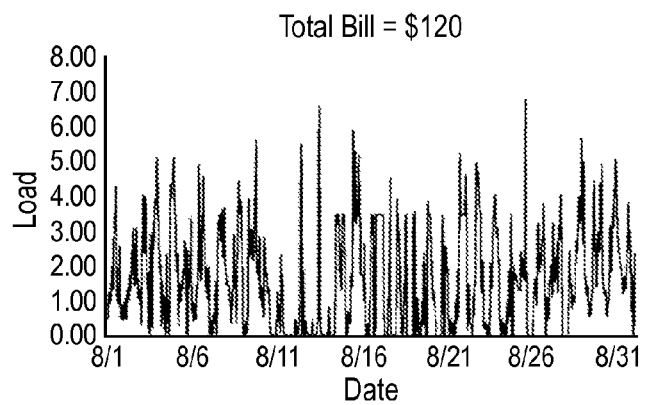

The bill target optimization 113 may dispatch a customer's major appliances, based upon a schedule supplied by the customer, to reach this bill level for the period. At the same time, the bill target optimization 113 may apply dispatching and control strategies to optimize and/or improve utility margins or revenues. By controlling appliance end use, subject to pre-set conditions and profiles permitted by the customer, the system may take load reductions during a higher marginal cost time period, or differentially more from higher cost regions. This system may also increase cost savings or margin for the utility because it allows the utility to minimize electricity use during high COS periods or within higher COS regions. FIG. 13 shows an example monthly bill under a bill target optimization 113 where the system dispatching solutions are established for various bill settings.

As discussed, utilities are a unique industry in that there is no existing inventory buffer. As a result, there may be certain hours where there are volatile costs of supply and inelastic demand. The system may create an inventory buffer using demand reductions and choreographing the operations of end use loads, as needed by utilities to meet necessary supply, but at the same time meeting customer needs and constraints regarding their preference, profile settings and pre-established criteria.

In the bill target optimization 113, an objective may be to minimize the utility's total peak kW (over a 5-minute period) during an hour while keeping total kWh constant for each customer. Mathematically, the problem may include a decision variable:

$X_{jth}=1$ if the customer's appliance j can run in period t in hour h, 0 if not.

The problem may also include the following data:

$COS_{th}$=the forecast cost to serve electricity to the customer in period t during hour h $R_{th}$=cost per hour charged to the customer during period t of hour h (the rate, which can also be a flat rate, i.e., does not vary over time)

$NonDisp_{th}$=the total non-dispatchable energy demand for the customer during period t of hour h.

$Demand_{jth}$=the forecast demand for energy the customer, dispatchable appliance j during period t of hour h.

Bill Target=the customer's targeted Bill (for the month or week).

The bill targeting problem may maximize the revenue (thus maximize avoided cost) subject to meeting the customer's bill target:

$$\text{Max} \sum_{h \in H} \sum_{t \in T} (R_{ht} - COS_{ht}) \cdot \left( \sum_{j \in J} (Demand_{jth} \cdot X_{jth}) + NonDisp_{th} \right)$$

s.t.

$$\sum_{h \in H} \sum_{t \in T} \left( \left( \sum_{j \in J} X_{jth} \cdot Demand_{jth} \right) + NDisp_{th} \right) \cdot R_{th} = \text{Bill Target}$$

$$0 \le X_{jth} \le UB_{jth} \quad j \in J, t \in T, h \in H$$

As before, to capture ancillary service value, which must be available at the 10 minute or finer level, the t interval in the optimization in the system may be set to 5-minutes, or less. Any longer time period may significantly diminish the value of the any demand or cost reduction from dispatching resources.

The fundamental concept in this optimization may be to dispatch customers at the 5-minute level, or less, so that most of the energy consumption occurs at the lower cost-to-serve periods and very little energy is used during the higher cost-to-serve periods. However, the total energy use for each hour for each appliance and each customer may be held constant, so that the customers do not have to sacrifice any comfort for the utility to achieve these least cost solution.

As specified above, the bill target optimization 113 may not incorporate any constraints regarding the peak (kW) demand. It is possible that the intra-hour shifting may result in very high kW usage during low cost-of-service periods. There are several ways methods that may avoid this, including incorporating a specific peak demand constraint or incorporating costs that increase with increasing kW to capture capacitor, circuit upgrade, and substation addition costs.

The processing of known and forecasted inputs is similar to those discussed above for curtailment and load leveling. Voltage forecasts and uncertainty may also be similar to that discussed above for curtailment and load leveling.

Managing Distributed Storage and Distributed Generation

A renewable generation optimization 115 may have the ability to manage distributed, micro level supply resources in conjunction with demand reductions or end-use choreography.

Generally, the operating characteristics of distributed resources are significantly different from other supply resources. For example, distributed resources, which are primarily installed for short-term supplemental reasons, can also be used to take advantage of market pricing and cost opportunities, known as arbitrage. Taking advantage of these arbitrage opportunities can add significant revenue, cost savings or margin to the utility from a resource that may otherwise remain unused and idle.

Figure 14A:
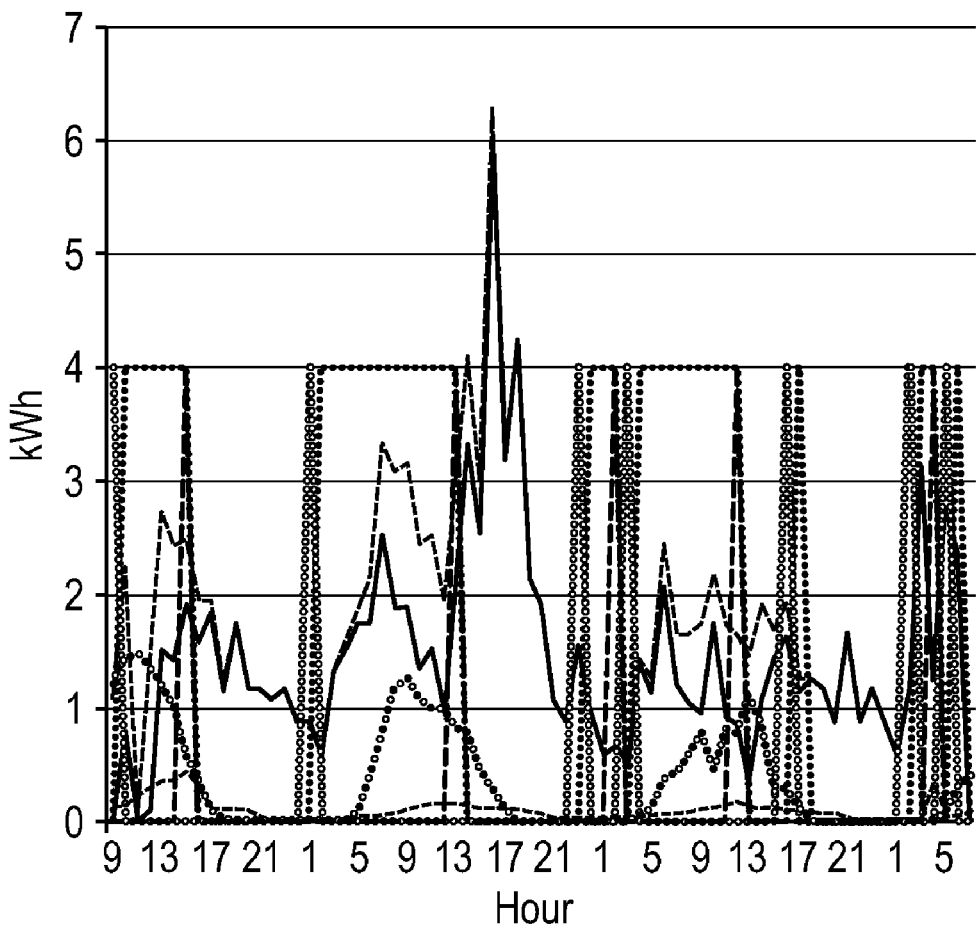
FIGS. 14A-14B show an exemplary dispatch of solar and storage by arbitraging market prices.
Figure 14B:
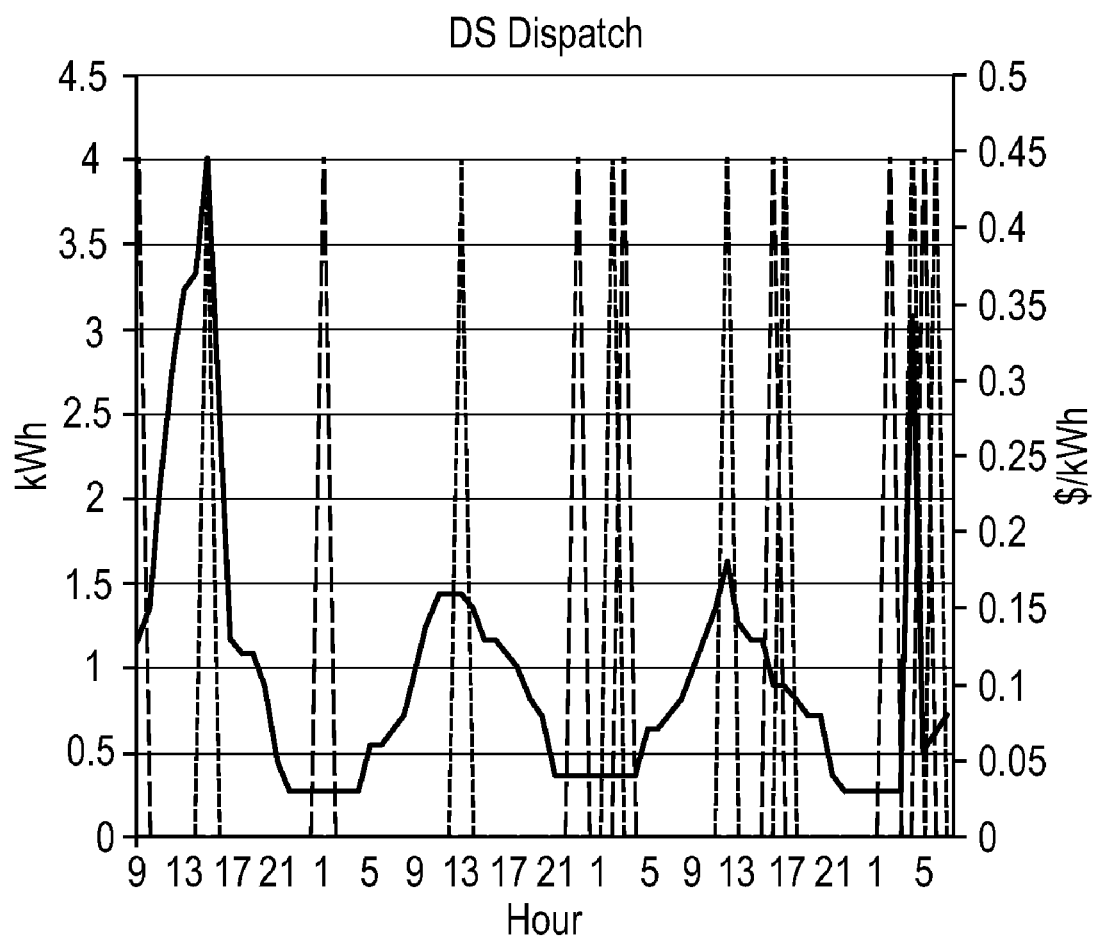

FIG. 14A and FIG. 14B show an exemplary dispatch of solar and storage by arbitraging market prices. As shown in FIGS. 14A-14B, forward market price, capacity need and weather uncertainties increase the complexity and value that can be derived from the system. An optimal dispatch for the week may require waiting a day or two to preserve option value for later in the week.

The system may have the capability to use stochastic optimization through the use of a conditional value at risk approach. In this methodology, a new parameter is introduced within the model, the conditional value at risk. The conditional value at risk may be evaluated as a function of uncertainty produced by the forecasts of the demand of the end-use in question (obtained directly from an estimated regression equation), and the forecast of the energy prices (also obtained directly from the estimated regression equation). By incorporating these parameters into the optimization, uncertainty about future conditions may be explicitly incorporated in the problem, as are risk preferences of the utility.

Electric Vehicle Smart Charging and Discharging

Electric vehicle smart charging and discharging may be part of the renewable generation optimization 115, other optimizations or a standalone optimization.

Significant joint planning between car manufacturers and utilities is currently underway. This joint planning may lead to new supply and revenue resources for utilities. Both electric vehicles (EVs) and plug-in hybrid electric vehicles (PHEVs) may be chargeable and dispatchable within normal dispatching solutions.

For discharging, the system may treat the battery as it would a power storage device. Therefore, the battery may draw a minimum amount of KW for a given time period, conditioned on the other factors and resources available to it along a given circuit or system, and subject to pre-set constraints or conditions placed on the system.

For recharging, the system may enable the smart charging of PHEV batteries in the same way that end use load are choreographed, scheduled and operated along a circuit or system. If there were a large population of PHEVs recharging in any one hour, or span of hours, the simultaneous recharging might strain a utility's resources, particularly if charging demands occur during existing peak system load hours. In response, the system may calculate optimal charging patterns for the vehicles participating on a circuit or system, subject to the peak load objectives on that circuit, the end use loads available for dispatching or control, and other distributed resources. Subject to pre-set conditions by the vehicle owner, including minimum charge levels, pricing incentives or offers, time of day charging constraints or other constraints established for that customer, the system may establish a smart charging pattern for the participating vehicles on a circuit or system, to achieve the overall goals to be achieved on that circuit.

The system's approach to minimizing the PHEV risk and value to utilities may be enhanced by having appliance control and/or HAN boxes along the circuit. Having both together, further supported by solar water heat or storage, may enable an optimization system to rely less on PHEV constraints alone, but rather on the joint dispatch of all distributed resources available on that circuit. However, there is no natural duty-cycle to PHEV charging, so the system may impose a preferred duty-cycle onto the battery that fits a customer's needs and cost or charging preferences, and which is optimally integrated with the other end use duty cycles observed along the same circuit. Different PHEV owners may receive different imposed duty cycle smart charging strategies, depending upon the availability and operation of the distributed resources, other PHEVs and other end uses operating or being dispatched on the circuit for a given hour. Furthermore, the imposed smart charging duty cycle for a given PHEV might be revised in subsequent hours, as conditions change along the circuit or new peak reduction or avoided cost goals are specified by the user.

Figure 15A:
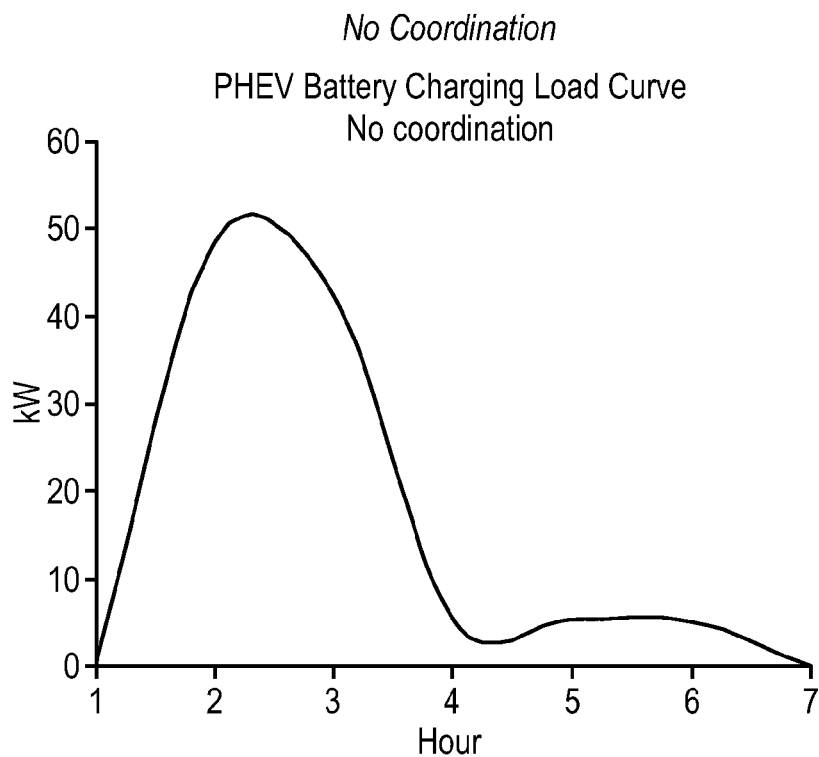
FIGS. 15A-15B show exemplary optimal dispatching strategies with optimization and without.
Figure 15B:
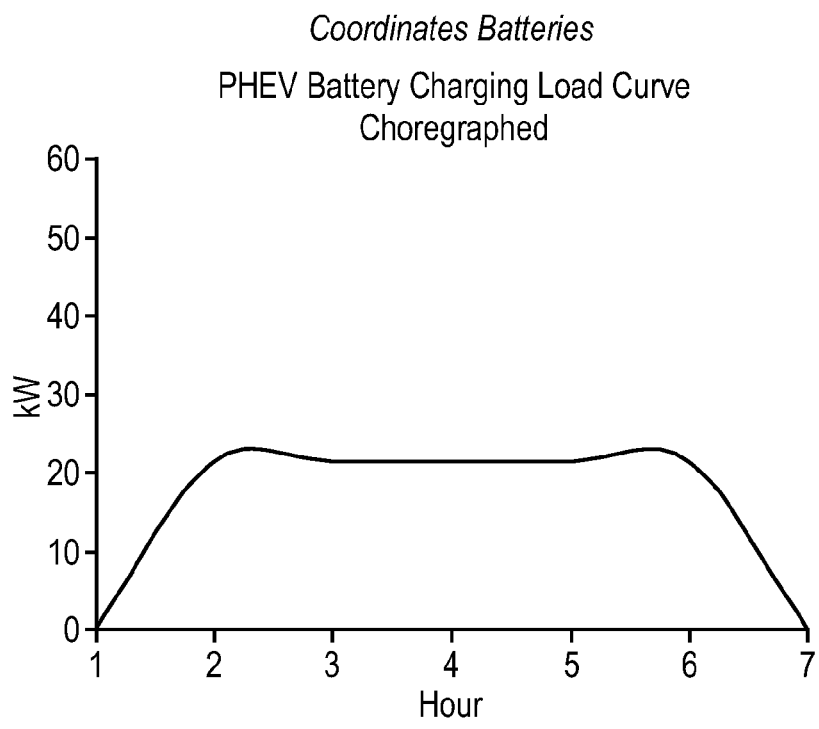

FIG. 15A and FIG. 15B show exemplary optimal dispatching strategies with optimization and without. In FIGS. 15A-15B, the system's optimal dispatching solution is graphed for 12 PHEVs, 3 with 120V 15 A chargers and 9 with 220V 20 A charges. The graphs depict a simple example where all customers come home and plug in at 6 p.m. and all batteries need a full charge. Left alone, these batteries may cause a peak of 50 kW versus charging over more hours to 21 kW (delta 40%).

Figure 16A:
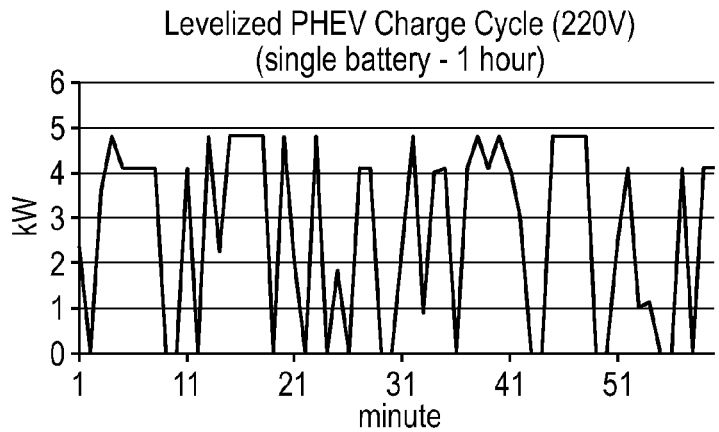
FIGS. 16A-16B show exemplary charging patterns of one battery versus three batteries.
Figure 16B:
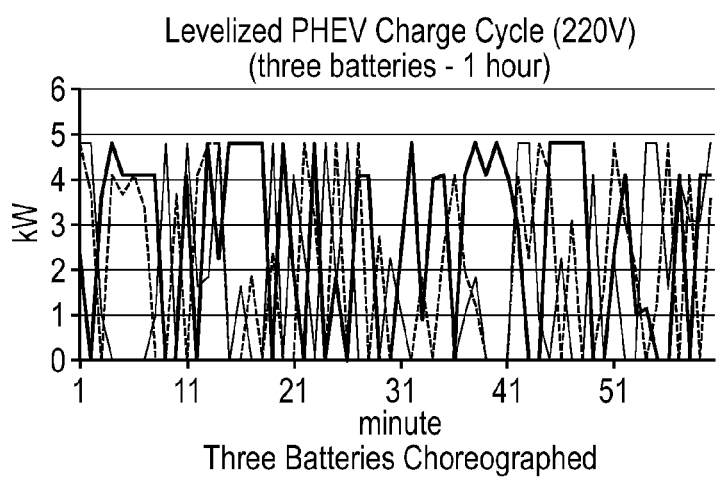

FIGS. 16A and 16B show exemplary charging patterns of one battery versus three batteries. Note that temperature/efficiency of charge is ignored here, but normally constrain the system's short run, spiked charging which is generally inefficient for battery charging. The system specifies constraints to allow a minimum charge time to ensure adequate temperatures.

Renewable Generation

The renewable generation optimization 115 may allow both adding and removing of electricity. A renewable generation optimization 115 may apply to stand alone batteries and/or batteries in a PHEV. Distributed storage may also allow for distributed generation.

There may be different basic optimizations contained in the renewable generation optimization 115.

Figure 17:
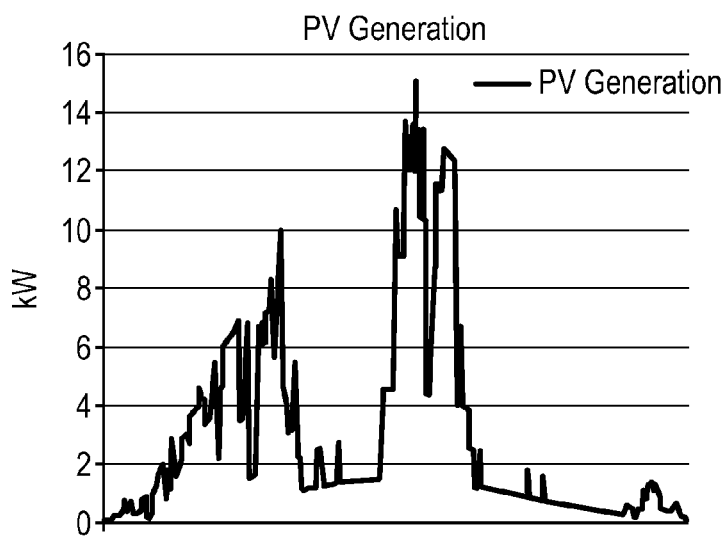
FIG. 17 is a graph of an exemplary day for a PV system.

Model 1. The first basic optimization may not involve the HAN at the customer location, and may minimize volatility associated with renewable generation resources, specifically wind and photovoltaic (PV). For both wind and PV, the output from a generation unit may be variable depending on natural conditions. For wind units, wind does not blow constantly, and so over time, the generation (kW) coming out of a wind generation unit may vary. The same is true for a PV unit, as clouds pass overhead and cover the sun, the amount of electricity generated by the PV system may be reduced. The extent of this volatility varies depending upon the part of the country. In California and Arizona, for example, there is very little cloud cover during the day, so the PV generation curve looks like a standard bell curve. However, for other parts of the country, clouds are constantly passed by, making it difficult to know how much power will be available from the PV system. FIG. 17 is a graph of an exemplary day for a PV system in North Carolina.

If there is a large percentage of such volatile generation in a utility system, it may make long-term planning difficult, and lead to overinvestment in capital or require the utility to buy power from the market to cover an unforeseen falloff in power. The system can minimize this volatility by coordinating renewable power with batteries so that the output from the system may be a constant amount of power, independent from the amount of power produced at even given point in time by wind or PV.

Within the renewable generation optimization 115, the optimization problem may be:

Max PVBatt
s.t.

$PVBatt \leq PVOut_t + BattOut_t, t \in T$ $PVOut_t = PVGen_t - PVIn_t, t \in T$ $BattLvl_{t+1} = BattLvl_t + PVIn_t - BattOut_t, t \in T$ $BattLvl_{t=0} = K$ $BattCap \geq BattLvl_t, t \in T$ Where:
PVBatt is the power output of the PV (or wind) and battery (or any distributed storage) system.
PVOut$_t$ is the power from the PV that is sent out to the Grid at time t.
PVIn$_t$ is the power from the PV that is sent out to the Battery for storage at time t.
PVGen$_t$ is the power generation from the PV at time t (exogenous).
BattLvl$_t$ is the storage level of the Battery (i.e., the amount of stored power) at time t.
BattOut$_t$ is the power from the Battery that is sent out to the Grid at time t.
BattLvl$_{t=0}$ is the initial storage level of the Battery.
BattCap is the capacity of the Battery (based on the characteristics of the battery).

Figure 18A:
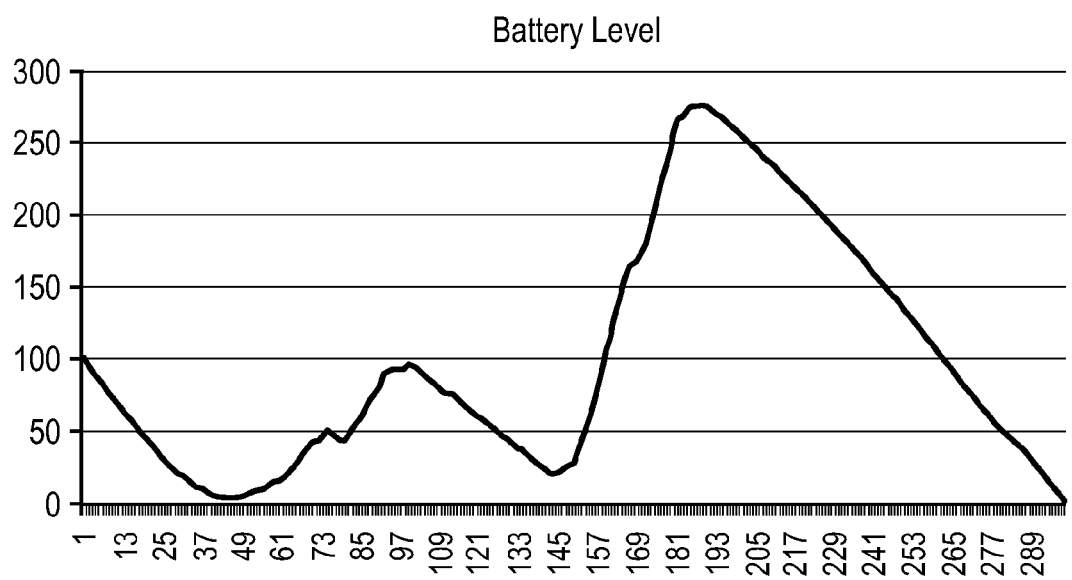
FIGS. 18A-18B show an exemplary generation profile for PV according to one embodiment.
Figure 18B:
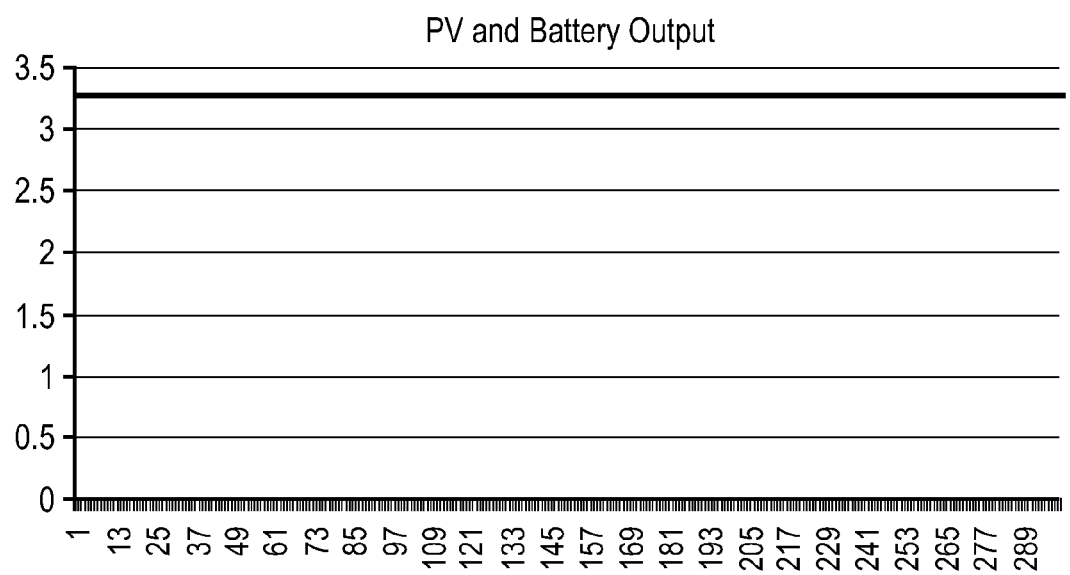

FIGS. 18A and 18B show an exemplary generation profile for PV. Using the generation profile of PV, and an initial battery level (K) of 100, and a non-binding battery capacity of 1,000, the renewable generation optimization 115 may produce a levelized output over time of 3.27 kW. FIG. 18A shows the associated battery level and FIG. 18B shows the output.

Figure 19:
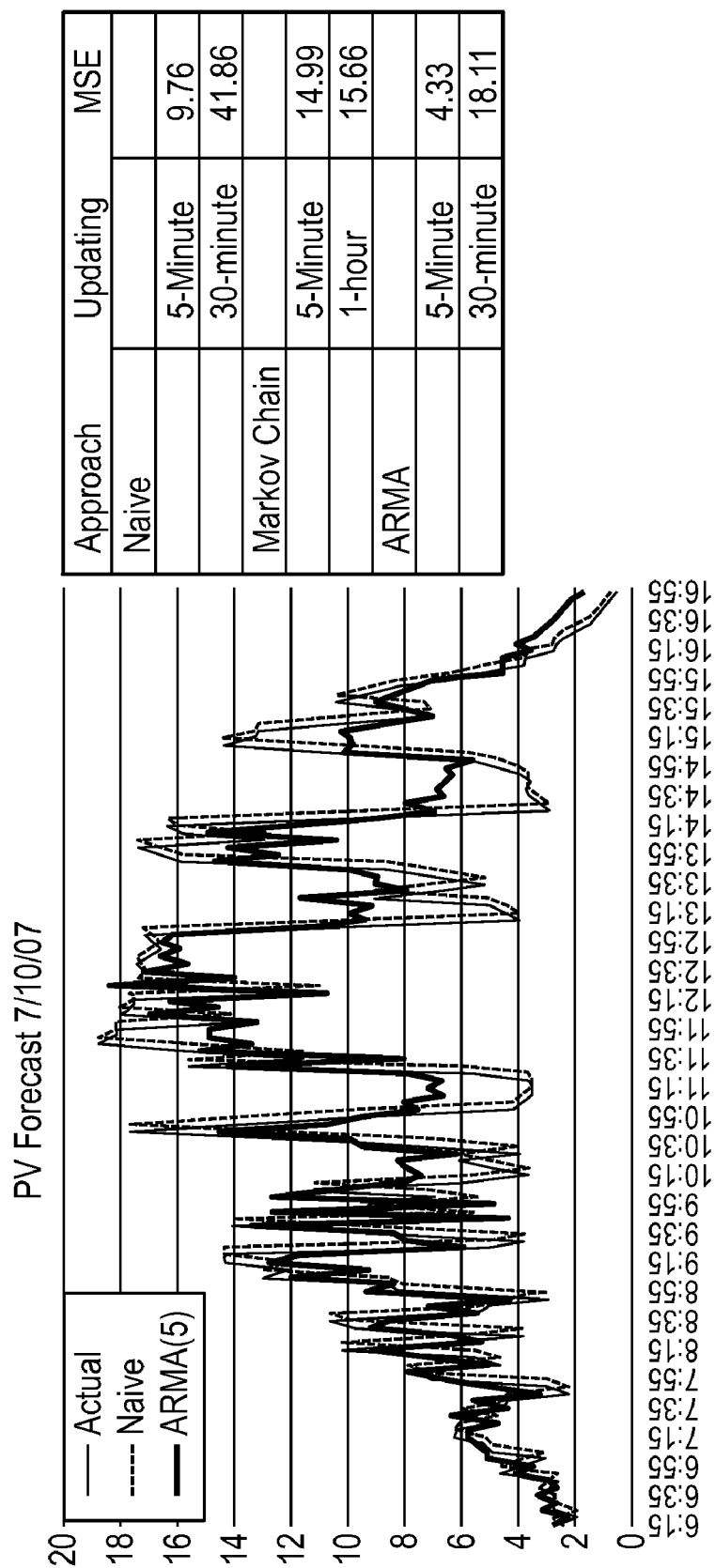
FIG. 19 shows an exemplary use of an ARMA model.

To employ the renewable generation optimization 115, a reasonable estimate of the shape of the PV or wind generation profile over time (PVGEN$_t$) may be required. A preferred approach, using a comparison of mean squared forecast error, may be an autoregressive moving average model (ARMA) using 5 minute data. Thus, in implementing the renewable generation optimization 115, the forecasting of the PVGEN term over time may be conducted using a multivariate ARMA (1,2) or ARMAX model. FIG. 19 shows an exemplary use of an ARMA model.

The algebraic specification of the ARMAX(1,2) model for PV generation may be:

$$y_t = \alpha_1 y_{t-1} + \beta_0 x_t + \beta_1 x_{t-1} + \epsilon_t - \theta_1 \epsilon_{t-1} - \theta_2 \epsilon_{t-2} \quad (24)$$

Figure 20A:
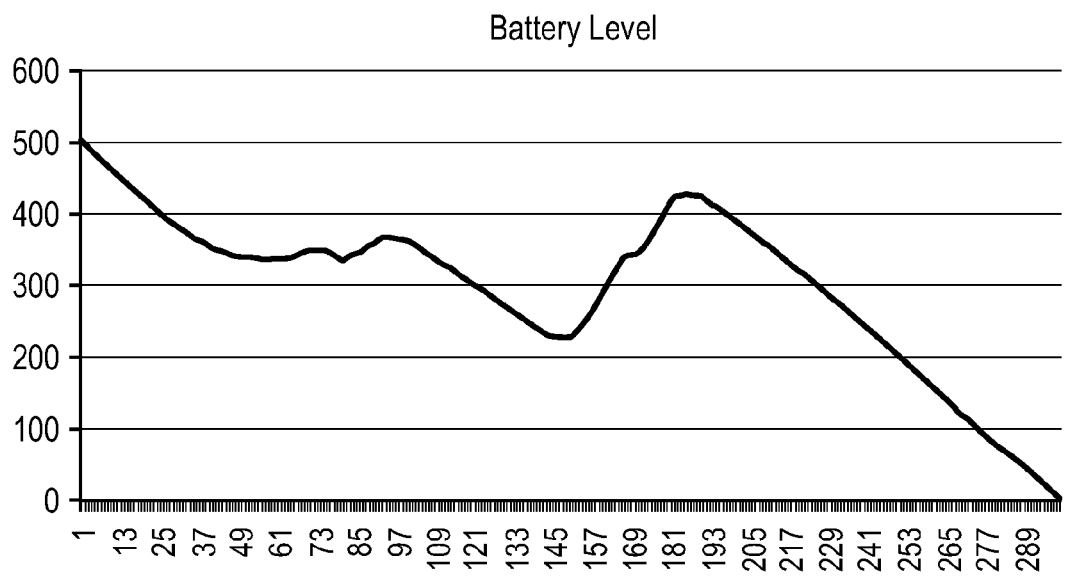
FIGS. 20A-20B show an exemplary generation profile for PV according to another embodiment.
Figure 20B:
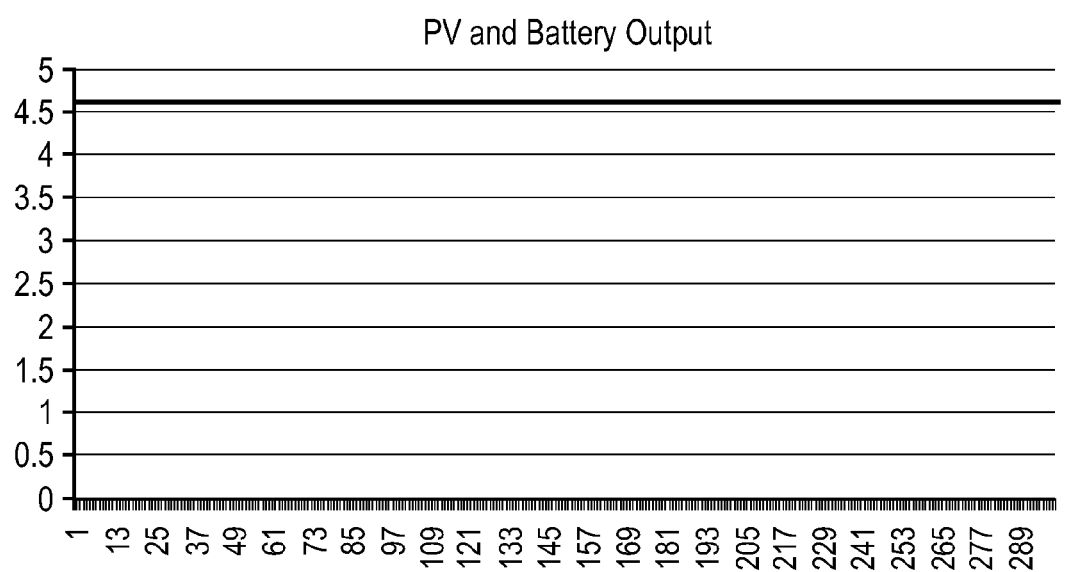
Figure 21A:
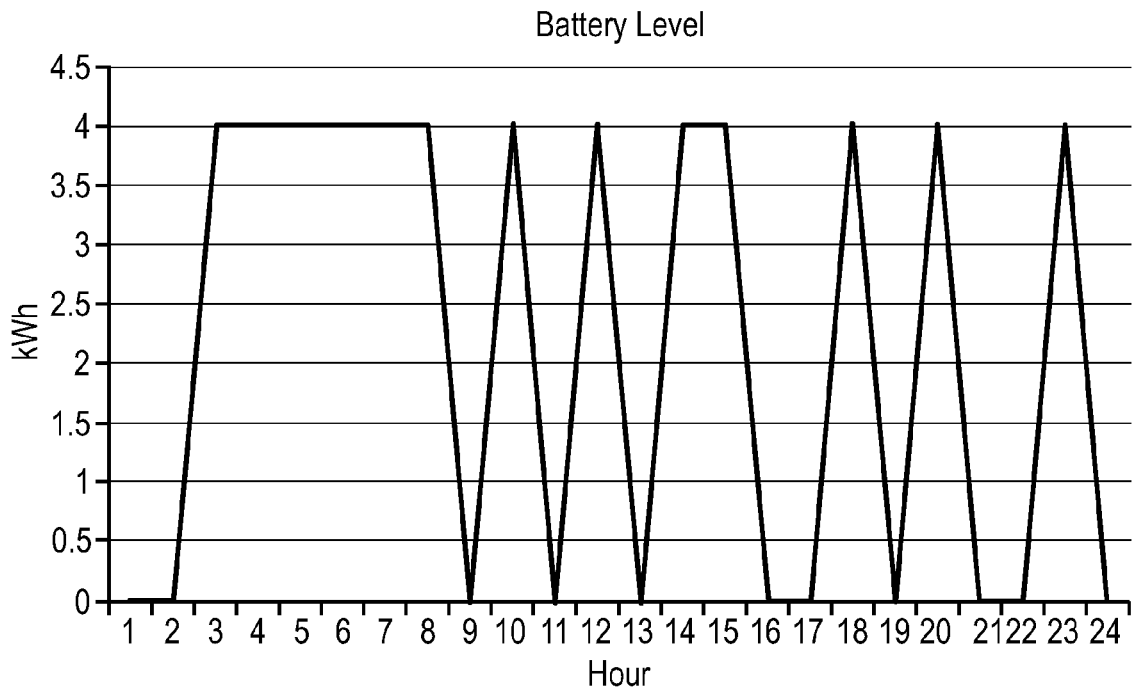
FIGS. 21A-21F shows results from an exemplary scenario with low incentive costs and high cost of service for certain customers.
Figure 21B:
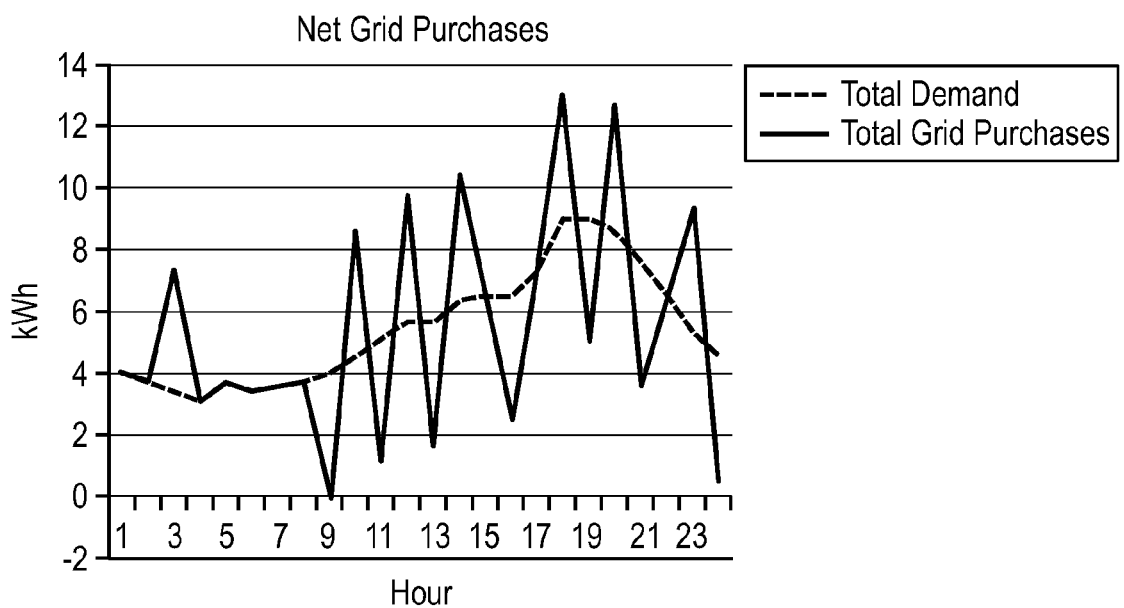
Figure 21C:
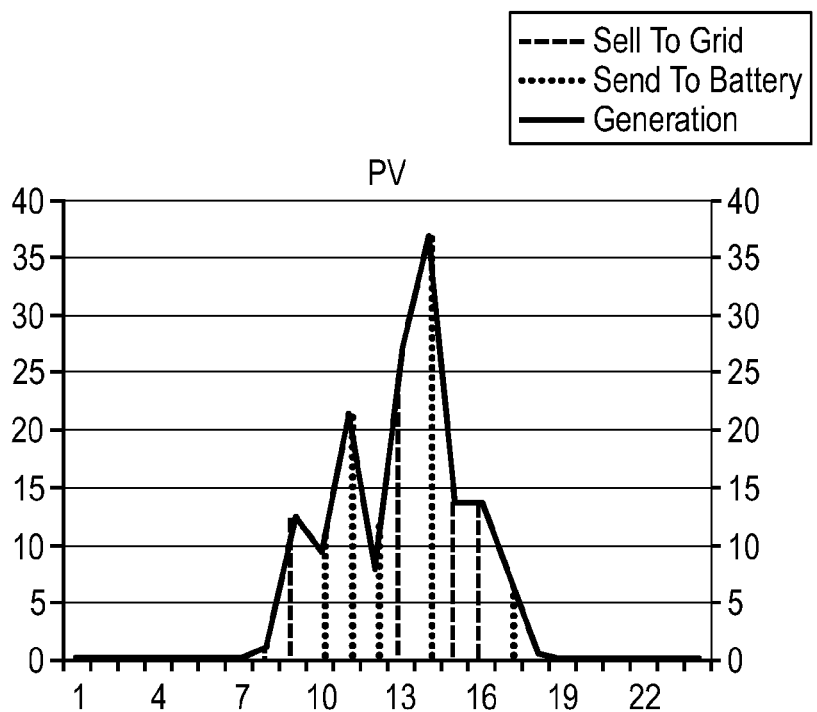
Figure 21D:
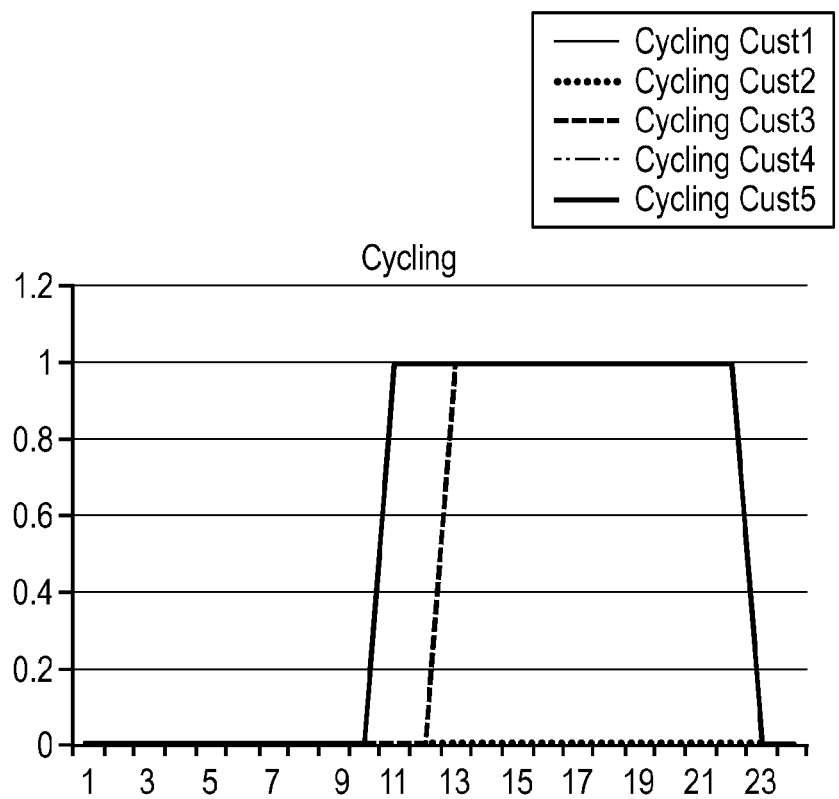
Figure 21E:
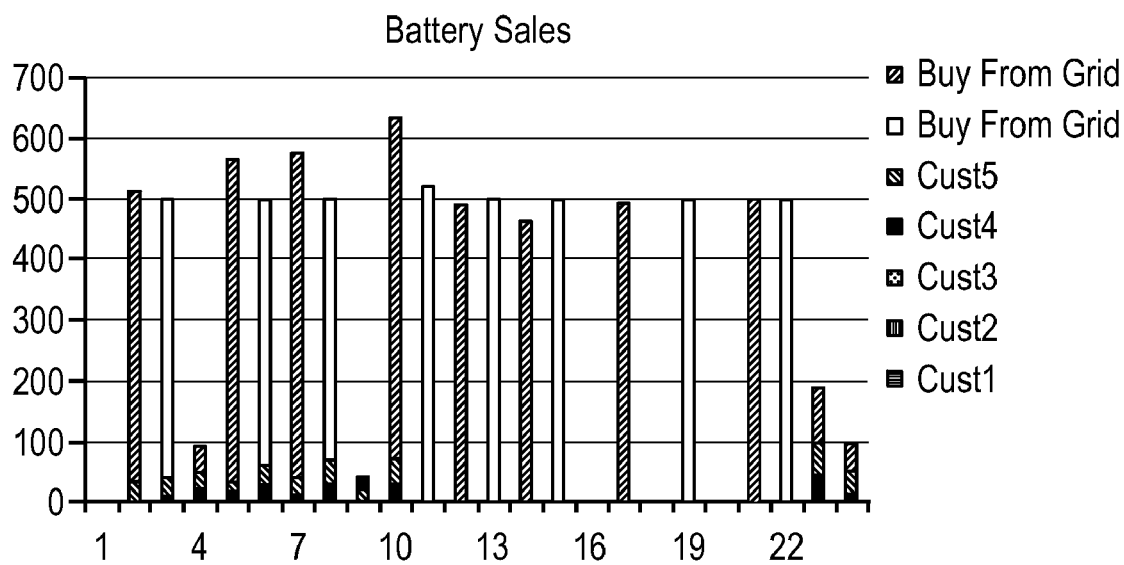
Figure 21F:
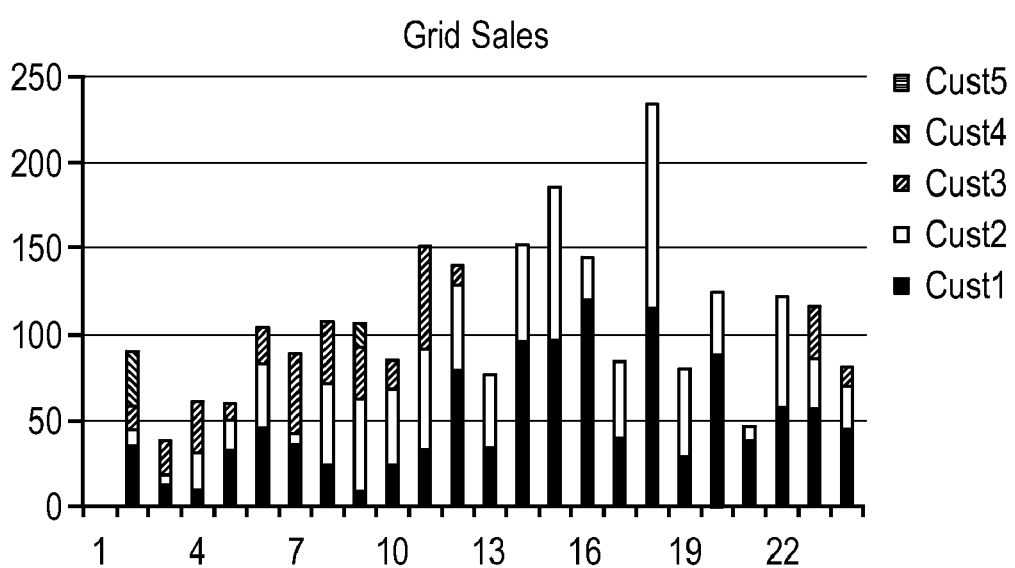

To effectively predict generation of a PV or wind unit, the t in the forecast equation must be very small, on the order of 5-minutes or less. The independent or exogenous variables in the ARMAX model are generally weather conditions such as temperature, wind speed, and cloud cover from areas "up wind" from the PV unit. Note that results of the renewable generation optimization 115 may vary depending upon the initial storage in the battery. In the above solution of FIG. 18A and FIG. 18B, an initial level of 100 kWh was assumed. If this assumption is changed to 500 kWh, the solution of FIG. 20A and FIG. 20B is obtained.

When comparing the 100 kWh and 500 kWh examples, a larger overall output is possible with 500 kWh. A natural extension of this model may include the cost of purchasing and storing this initial power, which can then lead to a solution which may consider the stored cost relative to the added leveled output. Furthermore, the model can easily include additional benefits in terms of "green" power, power reliability (having this power available when the grid is down), or incorporating the benefit of CO2 emissions reductions.

Model 2. The second basic optimization may expand upon the first basic optimization. The second basic optimization may include an ability to dispatch customer appliances in response to prices (LMP and COS).

As in other models, other possibilities may include minimizing CO2 emissions, minimizing peak demand, and/or minimizing customer discomfort. Much like the problems in the demand response optimization 107 discussion above, the optimization problem can be stated as:

$$\text{Max} \sum_{i \in I} \sum_{t \in T} (R_{it} Dmd_{it}(X_{it}) + LMP_t BtG_t + LMP_t PVtG_t) -$$
$$I_{it} Dmd_{it}(1 - X_{it}) - LMP_t GtB_t - PVC_t PVGen_t -$$
$$(LMP_t GtB_t + BtC_{it} + PVtC_{it}) \cdot (1 + COS_{it})$$

s.t.

$$Dmd_{it} X_{it} = PVtC_{it} + BtC_{it} + GtC_{it} \quad t \in T, \ i \in I$$

$$PVGen_t = PVtB_t + PVtG_t + \sum_{i \in I} PVtC_{it} \quad t \in T$$

$$BattLvl_{t+1} = BattLvl_t + PVtB_t + GtB_t - BtG_t - \sum_{i \in I} BtC_{it} \quad t \in T$$

$$BattLvl_{t=0} = K$$

$$BattCap \geq BattLvl_t \quad t \in T$$

Where:
$R_{it}$ is the cost charged to customer i in time t for energy, (we are ignoring appliances for ease of exposition).
$Dmd_{it}$ demand for energy for customer i, time t
$X_{it}$ is the fraction of period t to supply energy to customer i
$LMP_t$ is the Locational Marginal Cost at the battery and the PV (this model assumes that the battery and PV are located at the substation—multiple batteries and PV systems at different locations can be easily incorporated by adding an additional LMP terms).
$BtG_t$ is the sales of power at time t from the battery (or other type of distributed storage) to the Grid. Note this model assumes that the utility can buy and sell to the distributed storage unit at the LMP. A natural extension is to use the Cost of Service (COS) at the storage unit, and include any other adders such as bid/ask spreads.
$PVtG_t$ is the sales of power at time t from the PV (or other type of distributed generation) to the Grid. Note as above, this model assumes that the utility can buy and sell to the distributed generation unit at the LMP. A natural extension is to use the Cost of Service (COS) at the generation, and include any other adders such as bid/ask spreads.
$I_{it}$ is the incentive offered by the utility to customer i to curtail their power during time t.
$COS_{it}$, the cost to serve adder associated with moving electricity from the substation to the customer i during period t. This cost occurs whether or not power comes from the grid, the battery, or the PV unit.
$GtC_{it}$, $BtC_{it}$, and $PVtC_{it}$, are the power from the Grid, Battery, and PV respectively used to meet customer i's demand during period t.
$PVB_t$ is the power from the PV that is sent out to the Battery for storage at time t.
$PVGen_t$ is the power generation from the PV at time t (exogenous).
$BattLvl_t$ is the storage level of the Battery (i.e., the amount of stored power) at time t.
$GtB_t$ is the power sent from the Grid to the Battery for storage at time t.
$BattLv_{t=0}$ is the initial storage level of the Battery, and is set to some value K.
BattCap is the capacity of the Battery (based on the characteristics of the battery).

In essence, this basic optimization may account for power flows from distributed storage 131, such as battery, PV, and wind, and the grid 127. The optimization may compare the costs of each of these assets relative to the cost of demand response (i.e., curtailing individual customer end-uses).

A simple scenario may involve buying power from the grid at night 127, storing the power in a distributed storage 131 for use during the day (when Grid costs are higher), supply customers from the distributed storage 131 and the renewable generation 129 during the day, and if an incentive is below the COS, interrupting those customers that have a very high COS when there is not enough energy stored in the distributed storage 131 or available from the renewable generation 129.

FIGS. 21A-21F show results from an exemplary scenario with low incentive costs and high COS for certain customers. Note that the graphs make a distinction between sending power to specific customers. Clearly, an electron from the PV or battery does not know where it is going, but this distinction is made to attempt to make this interrelationship clearer.

Model 3. The model 2 optimization allowed for the curtailment of customers. This was a result of a relative cost to serve customers compared to the rate and the cost to curtail the end-uses (the incentive). An alternative may be to shift customer demand into other periods of the hour. This has the benefit of keeping customer energy (kWh) use constant for the hour, hence customer comfort is likely to be constant, and since the rate is based on kWh, the utility's revenue may remain unchanged. The optimization in this case may become:

$$\text{Max} \sum_{i \in I} \sum_{t \in T} (R_{it} Dmd_{it}(X_{it}) + LMP_t BtG_t + LMP_t PVtG_t) - LMP_t GtB_t -$$
$$PVC_t PVGen_t - (LMP_t GtB_t + BtC_{it} + PVtC_{it}) \cdot (1 + COS_{it})$$

s.t.

$$Dmd_{it} X_{it} = PVtC_{it} + BtC_{it} + GtC_{it} \quad t \in T, i \in I$$

$$\sum_t Dmd_{it} X_{it} = \sum_t Dmd_{it} \quad i \in I$$

$$PVGen_t = PVtB_t + PVtG_t + \sum_{i \in I} PVtC_{it} \quad t \in T$$

$$BattLvl_{t+1} = BattLvl_t + PVtB_t + GtB_t - BtG_t - \sum_{i \in I} BtC_{it} \quad t \in T$$

$$BattLvl_{t=0} = K$$

$$BattCap \geq BattLvl_t \quad t \in T$$

The variables are described above, except there is no longer the need for an incentive. Furthermore, a new constraint was added to ensure that demand for each time period t is held constant. The resulting solution has no change in the flow of power from the renewable generation 129 and distributed storage 131 to and from the grid 127. However, as one would expect, the usage of customers is now shifted to low price periods and there is no curtailment (cycling) of demand.

Exemplary Walkthrough

The following is a walkthrough of an exemplary application of the optimizations 105. The walkthrough is illustrative only and is not intended to limit the disclosure. In this walkthrough it is assumed there are five customers, all of which have two appliances: (1) an air conditioner (AC), which draws 3.5 kW of power, and (2) an electric water heater, which draws 4.5 kW of power. At 11:50, the forecasting system predicts the flowing 5 minute demands for each of the five customers as shown in Table 5.

TABLE 5

Forecast customer demand

| Time | Cust. 1 | Cust. 2 | Cust. 3 | Cust. 4 | Cust. 5 | Total |
|---|---|---|---|---|---|---|
| 12:00 | 8.0 | 8.0 | 0.0 | 8.0 | 4.5 | 28.5 |
| 12:05 | 8.0 | 8.0 | 4.5 | 8.0 | 3.5 | 32.0 |
| 12:10 | 8.0 | 8.0 | 3.5 | 8.0 | 0.0 | 27.5 |
| 12:15 | 0.0 | 0.0 | 0.0 | 0.0 | 0.0 | 0.0 |
| 12:20 | 3.5 | 3.5 | 0.0 | 4.5 | 0.0 | 8.0 |
| 12:25 | 0.0 | 0.0 | 0.0 | 3.5 | 0.0 | 7.0 |
| 12:30 | 0.0 | 0.0 | 0.0 | 0.0 | 0.0 | 0.0 |
| 12:35 | 0.0 | 0.0 | 0.0 | 0.0 | 0.0 | 0.0 |
| 12:40 | 0.0 | 0.0 | 8.0 | 0.0 | 8.0 | 16.0 |
| 12:45 | 0.0 | 0.0 | 8.0 | 0.0 | 8.0 | 16.0 |
| 12:50 | 3.5 | 4.5 | 8.0 | 0.0 | 8.0 | 24.0 |
| 12:55 | 8.0 | 8.0 | 8.0 | 8.0 | 8.0 | 40.0 |
| Total | 39.0 | 40.0 | 40.0 | 40.0 | 40.0 | 199.0 |

In this scenario, it is assumed that customers 1, 2, and 3 are on one transformer which has poor characteristics. This transformer may be on a feeder line that has many other customers. Additionally, customer 3 is very far away from the transformer. Conversely, customers 4 and 5 are assumed to be on a different transformer that has good characteristics, and which is on a different feeder line with few customers, and both customers are close to the transformer.

Given forecast demand above in Table 5, the system may compute forecast Cost of Service Adder (COS), which is the line loss that added to the LMP, as follows in Table 6.

TABLE 6

Forecast COS Adder

| | Forecasted Cost of Service Adders | | | | |
|---|---|---|---|---|---|
| Time | Cust. 1 | Cust. 2 | Cust. 3 | Cust. 4 | Cust. 5 |
| 12:00 | 27.0% | 26.8% | 26.5% | 5.7% | 5.6% |
| 12:05 | 29.3% | 29.0% | 36.8% | 4.2% | 4.1% |
| 12:10 | 17.9% | 18.0% | 17.9% | 4.2% | 0.0% |
| 12:15 | 0.0% | 0.0% | 0.0% | 0.0% | 0.0% |
| 12:20 | 27.1% | 26.9% | 26.9% | 4.3% | 0.0% |
| 12:25 | 26.9% | 27.0% | 26.9% | 4.4% | 0.0% |
| 12:30 | 0.0% | 0.0% | 0.0% | 0.0% | 0.0% |
| 12:35 | 23.9% | 23.9% | 38.2% | 0.0% | 0.0% |
| 12:40 | 27.0% | 26.5% | 40.8% | 0.0% | 4.2% |
| 12:45 | 23.9% | 23.9% | 38.2% | 0.0% | 4.2% |
| 12:50 | 24.1% | 24.0% | 23.9% | 0.0% | 4.2% |
| 12:55 | 26.5% | 26.8% | 40.8% | 4.5% | 4.5% |

The system may also forecast LMP, which is the cost to buy power at the closest node, at a 5 minute level. The forecast LMP may combine the forecast COS adder in Table 6 with the forecast LMP to get a Customer-Specific Cost of Service as shown in Table 7.

TABLE 7

Forecast Customer-Specific COS

| | Forecasted | Implied cost of Service | | | | |
|---|---|---|---|---|---|---|
| Time | LMP | Cust. 1 | Cust. 2 | Cust. 3 | Cust. 4 | Cust. 5 |
| 12:00 | 0.16 | 0.21 | 0.21 | 0.21 | 0.17 | 0.17 |
| 12:05 | 0.18 | 0.23 | 0.23 | 0.25 | 0.19 | 0.19 |
| 12:10 | 0.15 | 0.18 | 0.18 | 0.18 | 0.16 | 0.15 |
| 12:15 | 0.22 | 0.22 | 0.22 | 0.22 | 0.22 | 0.22 |
| 12:20 | 0.22 | 0.28 | 0.28 | 0.28 | 0.23 | 0.22 |

TABLE 7-continued

Forecast Customer-Specific COS

| Time | Forecasted LMP | Implied cost of Service | | | | |
|---|---|---|---|---|---|---|
| | | Cust. 1 | Cust. 2 | Cust. 3 | Cust. 4 | Cust. 5 |
| 12:25 | 0.21 | 0.27 | 0.27 | 0.27 | 0.22 | 0.21 |
| 12:30 | 0.35 | 0.35 | 0.35 | 0.35 | 0.35 | 0.35 |
| 12:35 | 0.40 | 0.49 | 0.49 | 0.55 | 0.40 | 0.40 |
| 12:40 | 0.33 | 0.42 | 0.42 | 0.47 | 0.33 | 0.34 |
| 12:45 | 0.25 | 0.31 | 0.31 | 0.35 | 0.25 | 0.26 |
| 12:50 | 0.54 | 0.67 | 0.67 | 0.67 | 0.54 | 0.56 |
| 12:55 | 0.63 | 0.80 | 0.80 | 0.89 | 0.66 | 0.66 |

With this information, the system may estimate a total cost to purchase power to meet demand for the utility going forward at five minute increments as shown in Table 8.

TABLE 8

Estimated Cost to Supply Total Demand

| Time | Cust. 1 | Cust. 2 | Cust. 3 | Cust. 4 | Cust. 5 | Total |
|---|---|---|---|---|---|---|
| 12:00 | $ 1.66 | $ 1.66 | $ 0.00 | $ 1.38 | $ 0.78 | $ 5.48 |
| 12:05 | $ 1.86 | $ 1.86 | $ 1.11 | $ 1.50 | $ 0.66 | $ 6.98 |
| 12:10 | $ 1.45 | $ 1.45 | $ 0.63 | $ 1.28 | $ 0.00 | $ 4.82 |
| 12:15 | $ 0.00 | $ 0.00 | $ 0.00 | $ 0.00 | $ 0.00 | $ 0.00 |
| 12:20 | $ 0.99 | $ 0.00 | $ 0.00 | $ 1.05 | $ 0.00 | $ 2.04 |
| 12:25 | $ 0.00 | $ 0.94 | $ 0.00 | $ 0.77 | $ 0.00 | $ 1.71 |
| 12:30 | $ 0.00 | $ 0.00 | $ 0.00 | $ 0.00 | $ 0.00 | $ 0.00 |
| 12:35 | $ 0.00 | $ 0.00 | $ 0.00 | $ 0.00 | $ 0.00 | $ 0.00 |
| 12:40 | $ 0.00 | $ 0.00 | $ 3.72 | $ 0.00 | $ 2.75 | $ 6.47 |
| 12:45 | $ 0.00 | $ 0.00 | $ 2.76 | $ 0.00 | $ 2.08 | $ 4.85 |
| 12:50 | $ 2.35 | $ 3.01 | $ 5.35 | $ 0.00 | $ 4.50 | $15.21 |
| 12:55 | $ 6.38 | $ 6.39 | $ 7.10 | $ 5.27 | $ 5.27 | $30.39 |
| Total | $14.69 | $15.31 | $20.68 | $11.25 | $16.03 | $77.95 |

In this scenario, the utility may have a flat rate of $0.20/kWh (i.e., there is no time-differentiated rates). Therefore, the projected revenue (rate times sales in kWh) may be equal to 0.20*199 (total kWh sales) or $39.80. Given that the forecast for the cost of supplying the power is $77.95, the implication is that the utility is expected to lose $39.80−$77.95=$38.15 in the coming hour.

The high LMP at 12:55 may be the result of a spike in temperature, and the utility may be unable to supply enough power to meet all the total system demand (the peak demand) at that point in time. So, what is often done is to call for a "demand response event." The current state-of-the-art in demand response is to offer all customers an incentive (assume it is $1.00 per an event), to let the utility control their appliances.

A typical demand response (DR) program with $1.00 incentive per event per participant may assume 75% cycling (i.e., AC and WH shut off for 45 minutes out of the hour). Assuming that the forecast demand from the system was accurate, then the demand under a typical DR program is as follows in Table 9.

TABLE 9

Demand curtailed by DR program

| Time | Demand Using Current DR Technology | | | | | |
|---|---|---|---|---|---|---|
| | Cust. 1 | Cust. 2 | Cust. 3 | Cust. 4 | Cust. 5 | Total |
| 12:00 | 0.0 | 0.0 | 0.0 | 0.0 | 0.0 | 0.0 |
| 12:05 | 0.0 | 0.0 | 0.0 | 0.0 | 0.0 | 0.0 |
| 12:10 | 0.0 | 0.0 | 0.0 | 0.0 | 0.0 | 0.0 |

TABLE 9-continued

Demand curtailed by DR program

| Time | Demand Using Current DR Technology | | | | | |
|---|---|---|---|---|---|---|
| | Cust. 1 | Cust. 2 | Cust. 3 | Cust. 4 | Cust. 5 | Total |
| 12:15 | 0.0 | 0.0 | 0.0 | 0.0 | 0.0 | 0.0 |
| 12:20 | 0.0 | 0.0 | 0.0 | 0.0 | 0.0 | 0.0 |
| 12:25 | 0.0 | 0.0 | 0.0 | 0.0 | 0.0 | 0.0 |
| 12:30 | 0.0 | 0.0 | 0.0 | 0.0 | 0.0 | 0.0 |
| 12:35 | 0.0 | 0.0 | 0.0 | 0.0 | 0.0 | 0.0 |
| 12:40 | 0.0 | 0.0 | 0.0 | 0.0 | 0.0 | 0.0 |
| 12:45 | 0.0 | 0.0 | 8.0 | 0.0 | 8.0 | 16.0 |
| 12:50 | 3.5 | 4.5 | 8.0 | 0.0 | 8.0 | 24.0 |
| 12:55 | 8.0 | 8.0 | 8.0 | 8.0 | 8.0 | 40.0 |
| Total | 11.5 | 12.5 | 24.0 | 8.0 | 24.0 | 80.0 |

To determine the cost to supply this new demand, the curtailed demand may be multiplied by the cost of service in Table 7. Note that in the all the cases discussed, when the demand is reduced, the cost of service is also reduced.

Table 10 lists the total costs under the exemplary demand reduction program.

TABLE 10

Total Cost under DR Program

| Time | Forecasted Total Cost of Purchased Power | | | | | |
|---|---|---|---|---|---|---|
| | Cust. 1 | Cust. 2 | Cust. 3 | Cust. 4 | Cust. 5 | Total |
| 12:00 | $0.00 | $0.00 | $ 0.00 | $0.00 | $ 0.00 | $ 0.00 |
| 12:05 | $0.00 | $0.00 | $ 0.00 | $0.00 | $ 0.00 | $ 0.00 |
| 12:10 | $0.00 | $0.00 | $ 0.00 | $0.00 | $ 0.00 | $ 0.00 |
| 12:15 | $0.00 | $0.00 | $ 0.00 | $0.00 | $ 0.00 | $ 0.00 |
| 12:20 | $0.00 | $0.00 | $ 0.00 | $0.00 | $ 0.00 | $ 0.00 |
| 12:25 | $0.00 | $0.00 | $ 0.00 | $0.00 | $ 0.00 | $ 0.00 |
| 12:30 | $0.00 | $0.00 | $ 0.00 | $0.00 | $ 0.00 | $ 0.00 |
| 12:35 | $0.00 | $0.00 | $ 0.00 | $0.00 | $ 0.00 | $ 0.00 |
| 12:40 | $0.00 | $0.00 | $ 0.00 | $0.00 | $ 0.00 | $ 0.00 |
| 12:45 | $0.00 | $0.00 | $ 2.76 | $0.00 | $ 2.08 | $ 4.85 |
| 12:50 | $2.35 | $3.01 | $ 5.35 | $0.00 | $ 4.50 | $15.21 |
| 12:55 | $6.38 | $6.39 | $ 7.10 | $5.27 | $ 5.27 | $30.39 |
| Total | $8.72 | $9.40 | $15.21 | $5.27 | $11.85 | $50.45 |

This blanket curtailment approach did reduce usage during the peak period, and resulted in a reduction in the total cost of delivered power from $77.95 down to $50.45. However, since there is no accounting for the peak LMP relative to when the DR program is implemented, the customers' are still using power during the peak period. The DR event essentially had no effect on reducing the strain on the system. In addition, the curtailment in customer's usage reduced the utility's revenue because of the loss in total kWh. With the DR program, the total sales dropped to 80 kWh, thus the utility receives revenue of only 80 kWh sales *$0.20/kWh or $16. Therefore, the net revenue under DR is $16, less the incentive cost of $5, less the cost of power of $50.45 for net revenue of negative $39.45, compared to the prior loss of $38.15. So in this example, a DR program actually results in the utility losing more revenue without the benefit of reducing peak demand during the critical peak period.

With the real or near-real time end-use capability of embodiments of the present invention, this situation may be avoided. One option may be to use an optimal DR mode, which may give the highest avoided cost to achieve a given targeted demand reduction. With built-in COS forecasting the system may ensure that the peak may be reduced.

Using the demand reduction from the above DR program, the system may determine the best allocation to achieve the dispatching given each customer's forecast demand and COS. The results are presented in Table 11.

TABLE 11

DR Dispatching using Embodiments of the Present Invention

IDROP Dispatched Demand

| Time | Cust. 1 | Cust. 2 | Cust. 3 | Cust. 4 | Cust. 5 | Total |
|---|---|---|---|---|---|---|
| 12:00 | 8.0 | 8.0 | 0.0 | 8.0 | 4.5 | 28.5 |
| 12:05 | 1.0 | 8.0 | 0.0 | 8.0 | 3.5 | 20.5 |
| 12:10 | 8.0 | 8.0 | 3.5 | 8.0 | 0.0 | 27.5 |
| 12:15 | 0.0 | 0.0 | 0.0 | 0.0 | 0.0 | 0.0 |
| 12:20 | 0.0 | 0.0 | 0.0 | 0.0 | 0.0 | 0.0 |
| 12:25 | 0.0 | 0.0 | 0.0 | 3.5 | 0.0 | 3.5 |
| 12:30 | 0.0 | 0.0 | 0.0 | 0.0 | 0.0 | 0.0 |
| 12:35 | 0.0 | 0.0 | 0.0 | 0.0 | 0.0 | 0.0 |
| 12:40 | 0.0 | 0.0 | 0.0 | 0.0 | 0.0 | 0.0 |
| 12:45 | 0.0 | 0.0 | 0.0 | 0.0 | 0.0 | 0.0 |
| 12:50 | 0.0 | 0.0 | 0.0 | 0.0 | 0.0 | 0.0 |
| 12:55 | 0.0 | 0.0 | 0.0 | 0.0 | 0.0 | 0.0 |
| Total | 17.0 | 24.0 | 3.5 | 27.5 | 8.0 | 80.0 |

Again, using the time and customer specific COS information in Table 7, the total cost for the utility to meet the demand is presented in Table 12:

TABLE 12

Cost to Supply the DR

Forecasted Total Cost of Purchased Power under Dispatch

| Time | Cust. 1 | Cust. 2 | Cust. 3 | Cust. 4 | Cust. 5 | Total |
|---|---|---|---|---|---|---|
| 12:00 | $1.66 | $1.66 | $0.00 | $1.38 | $0.78 | $ 5.48 |
| 12:05 | $0.23 | $1.86 | $0.00 | $1.50 | $0.66 | $ 4.25 |
| 12:10 | $1.45 | $1.45 | $0.63 | $1.28 | $0.00 | $ 4.82 |
| 12:15 | $0.00 | $0.00 | $0.00 | $0.00 | $0.00 | $ 0.00 |
| 12:20 | $0.00 | $0.00 | $0.00 | $0.00 | $0.00 | $ 0.00 |
| 12:25 | $0.00 | $0.00 | $0.00 | $0.77 | $0.00 | $ 0.77 |
| 12:30 | $0.00 | $0.00 | $0.00 | $0.00 | $0.00 | $ 0.00 |
| 12:35 | $0.00 | $0.00 | $0.00 | $0.00 | $0.00 | $ 0.00 |
| 12:40 | $0.00 | $0.00 | $0.00 | $0.00 | $0.00 | $ 0.00 |
| 12:45 | $0.00 | $0.00 | $0.00 | $0.00 | $0.00 | $ 0.00 |
| 12:50 | $0.00 | $0.00 | $0.00 | $0.00 | $0.00 | $ 0.00 |
| 12:55 | $0.00 | $0.00 | $0.00 | $0.00 | $0.00 | $ 0.00 |
| Total | $3.34 | $4.97 | $0.63 | $4.93 | $1.43 | $15.31 |

As Table 12 shows, even though the demand curtailment is the same as the typical DR program, the cost of supplying this is considerably less, $15.31 compared to $50.45. In addition, there is no appliance usage under the peak hours. As one would expect, the resulting net revenue is much higher in this case, a loss of only $4.31 relative to the loss of $50.45 in Table 10. Therefore, the DR mode of the system may be more effective than the rather imprecise DR programs currently in use.

The system's load leveling mode may limit the cost of the peak demand by minimizing demand at the five minute, or less, level. This approach is beneficial if it is not possible to develop meaningful forecasts of the cost of power down to the sub-hourly level. By levelizing demand throughout the hour, the issue of a peak period may be minimized. Further, by coordinating the natural duty cycle across customers, but ensuring that the total energy use of each customer is still achieved, this reduction in total peak demand is achieved without any reduction in customer comfort or total kWh sales.

Table 13 shows the result of using the system's load levelizing mode. This table shows that the demand for each 5 minute period is indeed equal, and the total load curve is flat. So this approach reduced the peak demand from the original 40 kWh during 12:55, to only 16 kWh, with no need to curtail customers, and no loss in comfort, and no change in kWh sales.

TABLE 13

Load Leveled Dispatch

IDROP Dispatched Demand

| Time | Cust. 1 | Cust. 2 | Cust. 3 | Cust. 4 | Cust. 5 | Total |
|---|---|---|---|---|---|---|
| 12:00 | 2.3 | 8.0 | 0.0 | 6.3 | 0.0 | 16.6 |
| 12:05 | 0.0 | 0.6 | 8.0 | 0.0 | 8.0 | 16.6 |
| 12:10 | 0.6 | 0.0 | 8.0 | 8.0 | 0.0 | 16.6 |
| 12:15 | 8.0 | 0.0 | 8.0 | 0.6 | 0.0 | 16.6 |
| 12:20 | 8.0 | 0.6 | 0.0 | 0.0 | 8.0 | 16.6 |
| 12:25 | 0.0 | 1.2 | 8.0 | 0.0 | 7.4 | 16.6 |
| 12:30 | 8.0 | 8.0 | 0.0 | 0.0 | 0.6 | 16.6 |
| 12:35 | 0.0 | 8.0 | 0.0 | 0.6 | 8.0 | 16.6 |
| 12:40 | 8.0 | 8.0 | 0.0 | 0.6 | 0.0 | 16.6 |
| 12:45 | 0.6 | 0.0 | 0.0 | 8.0 | 8.0 | 16.6 |
| 12:50 | 3.5 | 5.1 | 0.0 | 8.0 | 0.0 | 16.6 |
| 12:55 | 0.0 | 0.6 | 8.0 | 8.0 | 0.0 | 16.6 |
| Total | 39.0 | 40.0 | 40.0 | 40.0 | 40.0 | 199.0 |

The cost the supply this levelized demand is presented in Table 14.

TABLE 14

Cost to Supply Levelized Demand

Forecasted Total Cost of Purchased Power under Dispatch

| Time | Cust. 1 | Cust. 2 | Cust. 3 | Cust. 4 | Cust. 5 | Total |
|---|---|---|---|---|---|---|
| 12:00 | $ 0.48 | $ 1.66 | $ 0.00 | $ 1.08 | $ 0.00 | $ 3.22 |
| 12:05 | $ 0.00 | $ 0.14 | $ 1.97 | $ 0.00 | $ 1.50 | $ 3.60 |
| 12:10 | $ 0.11 | $ 0.00 | $ 1.45 | $ 1.28 | $ 0.00 | $ 2.84 |
| 12:15 | $ 1.74 | $ 0.00 | $ 1.74 | $ 0.13 | $ 0.00 | $ 3.62 |
| 12:20 | $ 2.27 | $ 0.17 | $ 0.00 | $ 0.00 | $ 1.79 | $ 4.22 |
| 12:25 | $ 0.00 | $ 0.31 | $ 2.14 | $ 0.00 | $ 1.56 | $ 4.01 |
| 12:30 | $ 2.80 | $ 2.80 | $ 0.00 | $ 0.00 | $ 0.20 | $ 5.80 |
| 12:35 | $ 0.00 | $ 3.93 | $ 0.00 | $ 0.23 | $ 3.17 | $ 7.33 |
| 12:40 | $ 3.36 | $ 3.34 | $ 0.00 | $ 0.19 | $ 0.00 | $ 6.89 |
| 12:45 | $ 0.18 | $ 0.00 | $ 0.00 | $ 2.00 | $ 2.08 | $ 4.26 |
| 12:50 | $ 2.35 | $ 3.40 | $ 0.00 | $ 4.32 | $ 0.00 | $10.07 |
| 12:55 | $ 0.00 | $ 0.47 | $ 7.10 | $ 5.27 | $ 0.00 | $12.83 |
| Total | $13.29 | $16.21 | $14.40 | $14.50 | $10.31 | $68.70 |

The resulting net revenue is a loss of $28.90, which represents a significantly better profit than either doing nothing at all, or using the traditional DR approach. It is still lower than using the system to manage a given demand reduction, but that result did not account for the cost to customers associated with the loss of power, which may well be much greater than the incentive.

The final mode takes advantage of fact that the system can forecast both demand and supply at the 5 minute level. Therefore, it is possible to micro-dispatch customer's end-uses at the 5 minute, or less, level based on the COS at that time, while still achieving the customer's total kWh usage over the entire period. Table 15 presents the results of the system's optimal micro-dispatching mode.

TABLE 15

Micro-Dispatch Results

IDROP Dispatched Demand

| Time | Cust. 1 | Cust. 2 | Cust. 3 | Cust. 4 | Cust. 5 | Total |
|---|---|---|---|---|---|---|
| 12:00 | 8.0 | 8.0 | 8.0 | 8.0 | 8.0 | 40.0 |
| 12:05 | 8.0 | 8.0 | 8.0 | 8.0 | 8.0 | 40.0 |
| 12:10 | 8.0 | 8.0 | 8.0 | 8.0 | 8.0 | 40.0 |
| 12:15 | 8.0 | 8.0 | 8.0 | 8.0 | 8.0 | 40.0 |
| 12:20 | 0.0 | 0.0 | 0.0 | 0.0 | 0.0 | 0.0 |
| 12:25 | 7.0 | 8.0 | 8.0 | 8.0 | 8.0 | 39.0 |
| 12:30 | 0.0 | 0.0 | 0.0 | 0.0 | 0.0 | 0.0 |
| 12:35 | 0.0 | 0.0 | 0.0 | 0.0 | 0.0 | 0.0 |
| 12:40 | 0.0 | 0.0 | 0.0 | 0.0 | 0.0 | 0.0 |
| 12:45 | 0.0 | 0.0 | 0.0 | 0.0 | 0.0 | 0.0 |
| 12:50 | 0.0 | 0.0 | 0.0 | 0.0 | 0.0 | 0.0 |
| 12:55 | 0.0 | 0.0 | 0.0 | 0.0 | 0.0 | 0.0 |
| Total | 39.0 | 40.0 | 40.0 | 40.0 | 40.0 | 199.0 |

This table shows that the total kWh both for all customers and overall is the same as in Table 5, but the occurrence of this demand is quite different. Note that there is no demand during the peak period.

Looking at the cost to supply this demand, as shown in Table 16, it is clear that there is a significant reduction in this cost, even though there has been no curtailment, and hence no cost in customers comfort.

TABLE 16

Cost of Supply Micro-Dispatched Demand

Forecasted Total Cost of Purchased Power under Dispatch

| Time | Cust. 1 | Cust. 2 | Cust. 3 | Cust. 4 | Cust. 5 | Total |
|---|---|---|---|---|---|---|
| 12:00 | $1.66 | $1.66 | $1.65 | $1.38 | $1.38 | $ 7.74 |
| 12:05 | $1.86 | $1.86 | $1.97 | $1.50 | $1.50 | $ 8.69 |
| 12:10 | $1.45 | $1.45 | $1.45 | $1.28 | $1.23 | $ 6.87 |
| 12:15 | $1.74 | $1.74 | $1.74 | $1.74 | $1.74 | $ 8.72 |
| 12:20 | $0.00 | $0.00 | $0.00 | $0.00 | $0.00 | $ 0.00 |
| 12:25 | $1.87 | $2.14 | $2.14 | $1.76 | $1.69 | $ 9.60 |
| 12:30 | $0.00 | $0.00 | $0.00 | $0.00 | $0.00 | $ 0.00 |
| 12:35 | $0.00 | $0.00 | $0.00 | $0.00 | $0.00 | $ 0.00 |
| 12:40 | $0.00 | $0.00 | $0.00 | $0.00 | $0.00 | $ 0.00 |
| 12:45 | $0.00 | $0.00 | $0.00 | $0.00 | $0.00 | $ 0.00 |
| 12:50 | $0.00 | $0.00 | $0.00 | $0.00 | $0.00 | $ 0.00 |
| 12:55 | $0.00 | $0.00 | $0.00 | $0.00 | $0.00 | $ 0.00 |
| Total | $8.59 | $8.85 | $8.96 | $7.67 | $7.54 | $41.61 |

Table 16 shows cost to supply the micro-dispatched demand. The net revenue, as one would expect, is the highest of all the cases presented, a net loss of only $1.81. Again, this net gain in revenue and the elimination of peak demand occurs without any cost, direct or indirect, to the customer.

Table 17 summarizes the results presented above.

TABLE 17

Summary of Results

| | | | IDROP MODES | | |
|---|---|---|---|---|---|
| | Base Case | Current DR Tech. | DR Dispatch | Levelizing | Micro-Disp. |
| Total kWh sales | 199 | 80 | 80 | 199 | 199 |
| Peak Demand (kW) | 40 | 40 | 0 | 17 | 0 |
| Cost of Power | $78 | $50 | $15 | $69 | $42 |
| Net Revenue | ($38) | ($39) | ($4) | ($29) | ($2) |

TABLE 17-continued

Summary of Results

| | | | IDROP MODES | | |
|---|---|---|---|---|---|
| | Base Case | Current DR Tech. | DR Dispatch | Levelizing | Micro-Disp. |
| Incentive Payments? | No | Yes | Yes | No | No |
| Customer Impacts? | None | Yes | Yes | None | None |

Summary of Optimization Systems

Embodiments of the present invention may have one or more of the following characteristics:

Calculating customer cost of service adders which are added to forecasts of nodal LMP prices, using commodity based, distribution based and other characteristics related to managing and delivering power. Forecasting 5-minute nodal LMPs and updating customer-specific COS forecasts. Forecasting 5-minute total house and major end-use (HVAC, WH) demand specific to each customer for the next hour. Forecasting hourly total house and major end-use (HVAC, WH) demand specific to each customer for every hour to the end of the month. New forecasts are developed every hour with new data. Forecasting 5-minute photovoltaic (or wind) generation for the next hour with new forecasts developed every hour with new data. Forecasting probability of an individual overriding an event, developed prior to each event (included in dispatching model). Verification that customer is eligible for an event, given pre-set participation constraints and schedules. Verification that customer agreed to participate in an event. Real-time reporting of total house and end-use consumption to customers and utility via web portals. Utility web portal may use GIS interface and the customer portal may use a customizable graphical display, which may allow comparisons. Real-time reporting of LMP and COS to utility via web portal as well as forecast LMP and temperature. Real-time reporting of dispatchable load (by end-use) to utility via web portal. Display of customer characteristics via GIS interface in utility web portal. Display of distribution system via GIS interface in utility web portal including: overhead primary lines, overhead transformers, underground primary lines, overhead transformers, underground transformers. GIS display of solar potential in utility web portal including open field solar and solar gain. Real-time display of distributed renewable resource production, weather condition, and distributed storage status. Ability of to run dispatching execution strategies via the utility web portal in real time or in the future, with report generation ability for past events. A maintenance portal that provides customer service representative with real-time customer status information of the entire REMS system or specific customers. This information may include: whether or not the customer is currently in an event; the customer portal setting; if each end-use is running; the device interruption history; contact information; last login; account number; ability to run customizable reports on portal usage, electricity usage, event participation, connectivity, and overrides; ability for the customer to set five different device usage modes (hourly schedules for the week that allow specific customer to configure their appliance settings); opt-in and override event screens on the customer web portal that are incorporated into the dispatching models; customer portal includes notification area for communications from utility, mode override button, weather reports, device status, and a graphical context-linked help file; load leveling dispatching of customers to minimize total system kW (sum of kW of houses with HAN/REMS and houses without HAN) while keeping kWh unchanged. The result is not only a minimized kW, but also a flattened kW, so that the volatility of kW is reduced, which results in a decrease in distribution system stress (transformers) as well as financial/planning uncertainty (risk). End use and microgrid resource dispatching to curtail use of HVAC and/or water heater of customers to achieve load reductions. Embodiments may conduct many types of demand response dispatching including: dispatch all customers (cycling amounts can be set to end-uses, or specific customer end-uses); dispatch customers to achieve a given load reduction target (cycling amounts can be set to end-uses, or specific customer end-uses); load reduction target may be met very closely because each customer's load is being forecast in real time; customers can be dispatched on the basis of their COS (which implicitly incorporates distribution system benefits), value of comfort, probability of override, willingness to pay (bid), uncertainty of load, etc.; results of dispatch presented in real-time in utility portal, which includes demand reduction (based on forecast), lost revenue, and avoided cost.

A bill target system may be used for curtailment of end-uses of a specific customer to achieve that customer's monthly electric bill target. End-uses are curtailed on the basis of that customer's COS, so the avoided cost gained by the user or the utility which is associated with the customer is maximized, energy usage is reduced, and the customer's risk from bill uncertainty is mitigated or eliminated.

Renewable generation levelizing may coordinate photovoltaic or wind with substation battery or storage at customer location. This may minimize the fluctuation from renewable distributed resources at the 5 minute, or less, level by coordinating distributed storage with the renewable generation. A net result may be a flat generation curve from the combined system, which reduces stress on the distribution system, and minimizes the financial and planning uncertainty, or which more closely achieves least cost planning objectives of the utility.

Microgrid coordination may choreograph renewable distributed resource, distributed storage, and customers with REMS to maximize the value to customers and the utility. Using the LMP at the renewable resource and the battery, combined with the COS at each customer, the forecast generated from the renewable resource, and the forecast demand of each customer, the system may determine the highest value of each power flow from the PV, battery and grid to develop near real-time (5-minute) dispatching of all distributed resources. This model can incorporate carbon emissions consideration, green power pricing, reliability concerns, and incentive payments.

In summary, there are three types of benefits enabled by methods, processes and algorithms of the system. These include distribution-specific or circuit-specific benefits to the utility, energy management benefits to the utility, and customer-specific benefits to end users. With respect to distribution-specific benefits, the following are enabled by the system. First, the system may control load volatility on the circuit, or at local service transformers, by optimally controlling the operation and use of end use customer appliances, thereby improving voltage conditions at targeted areas, and reducing, deferring or eliminating some distribution capital costs. The combined attention to both commodity based value and distribution specific value enhances the utility's ability to manage peak loads, deliver power more reliably, reduce energy costs, manage voltage, mitigate line losses and defer or eliminate future distribution capacity capital costs. Second, the system may respond to variability in solar resources output, due to weather or cloud cover, by adjusting customers' appliances and end use devices to accommodate the loss of solar power during such times, thereby mitigating intermittency risk inherent in solar power output. Third, the system may mitigate the need for storage resources on a circuit by coordinating customers' end use appliances and cycling, thereby reducing load volatility and overall system costs. Because end uses may be dispatching optimally, their use can be scheduled and choreographed such that random peak load realizations are minimized, or eliminated. Fourth, the system may improve voltage on a circuit, at targeted locations, by reducing usage of certain appliances or loads during peak times at specific locations, such that transformers serve a less volatile load, where voltage improvements are desired. This may be desirable to supplement targeted locations where utility's existing distribution management or integrated volt-var control systems are less effective than desired. Fifth, the system may enhance the identification of potential electricity theft by comparison of similarly situated customers' usage, conditioned on appliance, end use and behavioral characteristics. In contrast, specifically, there are several grid-related functions that are intentionally not enabled by the system. These include outage restoration or detection, fault detection, the direct actuation of voltage control, reactive power injection, regulation, meter reading, turn on/turn off capability, safety improvement, or momentary outage mitigation.

The second set of benefits pertains to customer or end user benefits. First, the system allows a customer to fix the monthly electricity bill to a pre-set amount, to lock in desired energy savings or reduction, or to reduce bill volatility. The system may adjust the usage or cycling of appliances, conditioned on pre-specified constraints selected in advance by the customer (e.g., only control appliance during hours 2 pm to 6 pm, only control the AC unit, reduce AC thermostat settings no more than 4 degrees). Second, the system may provide the customer the ability to over-ride previously selected settings or constraints during operational control or cycling times, such that comfort and convenience is maintained by the customer. The system may incorporate the magnitude and frequency of over-ride behaviors, subsequently, into that customer's forecasted load algorithms, such that the expected future load reductions forecasted for that customer are more accurately specified within the system's optimization module and dispatching executions for subsequent time periods. Third, the system may enhance the identification of usage amounts, costs and carbon content of customer's electricity consumption, reported to the customer through web enabled communication module. Fourth, the system may enable the provision of price signals and load reduction credits or rebates to be provided to customers in hourly, daily, monthly or annual specifications. Fifth, the system may provide customers the ability to pre-set comfort, convenience and cost savings preferences, or constraints, in advance and not require continual monitoring of the system, yet preserve the customer's ability to over-ride these settings.

The third set of benefits derived from the system's methods, processes and specifications pertain to utility supply side benefits. First, the system reduces the amount of needed supply side energy production, due to appliance cycling options selected by customers, dispatching of microgrid resources, optimally dispatched by the system, significantly where customers may accept pricing credits, incentives, fixed billing options, or pre-set appliance patterns, settings or temperatures. Second, the system may enable the reduction in capacity requirements due to load leveling, by coordinating the cycling of appliances natural duty cycles and the storage inherent within electric hot water heating systems or other dispatchable appliances or microgrid resources, or as end use schedules and constraints selected by customers in advance for inclusion. Third, the system enhances the load following ability for utility system loads, increasing utility's ability to use the optimization system to complement the needs of supply side plant ramp rates, respond to forced outages, respond to spinning or supplemental reserve requirements, mitigate load following risk caused by intermittent or quickly ramping wind resources, or other ancillary service needs. Fourth, the system may increase the ability to meet mandated energy conservation or demand response requirements specified within state or federal regulatory or legislative frameworks. Fifth, the system may increase the potential to defer, or eliminate future supply side resource construction of plants, or future distribution costs. Sixth, the system may increase the potential to reduce, shift or manage supply side plant emissions. Seventh, the system may be able to re-align the manner in which utilities make demand dispatching and microgrid dispatching decisions, namely where the system may enable the utility to use marginal costs that are more reflective of the utility's actual cost to serve individual customers. Here, average system pricing signals for a region are replaced with customer specific marginal costs, as the basis for making dispatching decisions, to better reflect overall avoided costs to the utility, such that least cost planning and integrated resource planning objectives can be better achieved. This enables a more cost effective and optimized dispatching strategy, given overall utility costs. As more and more demand dispatching resources are obtained the system may provide a more dynamically responsive process and method for allowing demand side resources to become price setters within the energy markets, by appropriately decreasing the cost to serve as load reduction potential increases, thereby protecting the utility from over-committing demand side resources. Finally, the system may enable utilities or users the coordination and optimal scheduling of electric vehicle charging and discharging, charging and discharging of battery storage capacity, and the optimal integration of distributed resources including distributed generation, solar, wind and related power resources. The system is not limited to pre-specified end uses. Any end use which can be controlled, adjusted or scheduled can be incorporated into the overall dispatching operations.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A system for energy optimization, the system comprising:
a server configured to:
receive information collector data from at least one information collector, the information collector data comprising individualized energy usage data regarding energy use of electrical devices of at least one of a plurality of customers or customer locations;
forecast individualized demand by electrical device and individualized demand by location for at least one of the plurality of customers or customer locations using the individualized energy usage data;
determine an optimized energy distribution by minimizing a total system peak demand during a time period over the plurality of customers or customer locations utilizing a constraint of end-use requirements and total demand for each of the plurality of customers or customer locations, the minimizing by calculating at least a fraction over the time period to supply energy by electrical device and the plurality of customers or customer locations that minimizes the total system peak demand during the time period utilizing a constraint of the forecasted individualized demand by electrical device and the forecasted individualized demand for each of the plurality of customers or customer locations; and
produce instructions for controlling energy use of electrical devices of the at least one of the plurality of customers or customer locations based on the determined optimized energy distribution,
wherein the system is configured to determine the optimized energy distribution using the forecasted individualized demand by electrical device, the forecasted individualized demand by location, and a real power of each end-use for the plurality of customers or customer locations, and
wherein the system is configured to determine the optimized energy distribution represented at least partially as:

$$\text{Min} P$$

s.t.

$$\sum_{t \in T} X_{ijth} RP_j = Demand_{ijh} \ i \in I, h \in H, j \in HVAC$$

$$\sum_{t \in T} \sum_{h \in H} X_{ijth} RP_j = \sum_{h \in H} Demand_{ijh} \ i \in I, j \in J \neq HVAC$$

$$P \geq \sum_{n \in N} NDemand_{nh} + \sum_{i \in I} \sum_{j \in J} X_{ijth} RP_j \ t \in T, h \in H.$$

2. The system of claim 1, wherein the at least one information collector is a third party vendor, and the individualized energy usage data is end-use level information collected through a home area network system.

3. The system of claim 1, wherein the at least one information collector is a third party vendor, and the individualized energy usage data is site-level information collected through a smart meter.

4. The system of claim 1, wherein the at least one information collector is a fourth party vendor, wherein at least one of the plurality of customers or customer locations are not part of a third party vendor customer base.

5. The system of claim 1, wherein the system is configured to operate in near real-time comprising a five minute interval or less.

6. The system of claim 1, wherein the individualized energy usage data is available at an end-use level for each of the plurality of customers or customer locations.

7. The system of claim 1, wherein the information collector data further comprises customer preferences comprising additional data selected from the group consisting of: customer willingness to have the end-use interrupted, customer willingness to have the end-use managed, customer willingness to have the end-use scheduled, desired bill levels, and combinations thereof.

8. The system of claim 1, wherein the system is configured to determine the optimized energy distribution by considering data selected from the group consisting of: customer preferences, customer or location characteristics, customer overrides, compliance histories, end-use information, end-use usage history, billing information including rates, historical individualized demand, historical and forecasted weather, historical and forecasted avoided costs by each of the plurality of customers or customer locations for commodity and non-commodity cost of service factors, historic and forecasted renewable generation, storage system capacity, storage charge and discharge rates, battery capacity, battery charging and discharge rates, vehicle arrival times, battery fill preferences, battery fill forecasts, desired bill levels, customer management settings per month, customer responses to prior program offerings, research surveys, satisfaction and behavioral/choice preferences, required energy reductions, required demand reductions, and combinations thereof.

9. The system of claim 1, wherein the system is further configured to receive energy provider data comprising overall energy usage data, required energy reductions, required demand reductions, cost of energy data, and data regarding distribution of energy.

10. The system of claim 1, wherein the system is further configured to receive an actual system generation cost from an energy provider or a locational marginal cost of energy from an independent system operator for a bus in near real-time.

11. The system of claim 10, wherein the system is further configured to forecast the system generation cost at a bus or locational marginal cost at a bus using at least one of the following separate, interactive, non-linear, or moving average terms: temperature, humidity, wind speed, time of day, day of week, month indicator variables, past values of the locational marginal cost at a bus.

12. The system of claim 11, with parameters estimated wherein $$\phi(L)[(1-L)(LMP_t - X_t \beta)] = \theta(L)\epsilon^t$$

where $$L^j LMP_t = LMP_{t-j}$$

$$\phi(L) = 1 - \phi_1 L - \phi_2 L^2 - \ldots - \phi_p L^p$$

$$\theta(L) = 1 - \theta_1 L - \theta_2 L^2 - \ldots - \theta_q L^q.$$

13. The system of claim 1, wherein the system is further configured to estimate the system generation cost for a bus using data including: generation units, system load, load on the bus, load on other buses, transmission capacity characteristics, microgrid distributed generation, and power flows.

14. The system of claim 13, wherein the system is further configured to forecast the system generation cost at a bus in near real-time using: forecasted weather conditions, forced outage and transmission congestion inputs, generation units, forecasted system load, microgrid distributed generation forecasts, forecasted demand reductions, and a forecasted load at the bus.

15. The system of claim 1, wherein the system is further configured to receive distributed generation data in at least near real time.

16. The system of claim 1, wherein the system is further configured to receive distributed storage data in at least near real time.

17. The system of claim 1, wherein the system is further configured to:
   forecast a cost of service or avoided cost for at least one of the plurality of customers or customer locations using at least one of the individualized energy usage data or a system generation cost at a bus nearest to the at least one of the plurality of customers or customer locations,
   wherein the forecasting the cost of service or the avoided cost uses one or more of the following: primary line losses; secondary line losses; one or more voltage adder; marginal distribution capital costs; a shaping premium; a swing premium; a capacity premium; ancillary services costs; non-commodity and non-distribution related adders; and combinations thereof.

18. The system of claim 1, wherein the system is configured to forecast the individualized demand by electrical device or individualized demand by location using inputs selected from the group consisting of: load prediction; weather forecasts; risk given load uncertainty; customer compliance forecasts; customer probability of override forecasts; time of day effects; day of week effects, and combinations thereof.

19. The system of claim 1, wherein the system is configured to determine the optimized energy distribution using at least one of: energy provider data, the information collector data, and data for optimization.

20. The system of claim 1, wherein the system is configured to determine the optimized energy distribution by at least one of: maximizing revenue of the energy provider, minimizing customer discomfort, maximizing avoided costs, minimizing incentive costs, minimizing cost to provide and deliver power, and combinations thereof, while achieving a required total demand reduction or total energy reduction.

21. The system of claim 20, wherein the system is configured to determine the optimized energy distribution using an incentive, a cost of service or avoidable cost, energy rates, the forecasted individualized demand by electrical device, total time of current interruption or scheduling event, each customers' preferences for interruptions by end-use, total time each customer can be interrupted or rescheduled, probability that each customer will override an interruption, a total allowed number of controls per customer per time period, a maximum cycling for an end-use, soft and hard costs associated with controlling each of the plurality of customers, costs that vary by end-use, cycling of the end-use within lower and upper bounds, maintaining a predetermined level of end-use settings, end-use cycling constraints based on manufactured limits, staggering end-use starts, and combinations thereof.

22. The system of claim 21, wherein the system is configured to determine the optimized energy distribution represented at least partially as:

$$\text{Max} \sum_{i \in I} \sum_{j \in J} \sum_{h \in H} (R_{ih} Demand_{ijh}(1 - X_{ijh}) -$$

$$(I_{ijh} Demand_{ijh} X_{ijh} + COS_{it} Demand_{ijh}(1 - X_{ijh})))$$

s.t.

$$\sum_{h \in H} X_{ijh} \leq Hours_{ij} \qquad i \in I, \ j \in J$$

$$0 \leq X_{ijh} \leq UB_{ijh} \qquad i \in I, j \in J, h \in H$$

$$\sum_{i \in I} \sum_{j \in J} Demand_{ijh} X_{ijh} = Reduction_h \quad h \in H.$$

23. The system of claim 1, wherein the system is configured to determine the optimized energy distribution by maximizing revenue, minimizing a total energy provider cost to provide and deliver energy, or maximizing avoided costs during a period over a plurality of customers or customer locations subject to end-use kW requirements and total kWh demand for the plurality of customers or customer locations during the period.

24. The system of claim 23 wherein the system is configured to determine the optimized energy distribution represented at least partially as:

$$\text{Max} \sum_{h \in H} \sum_{i \in I} \left( R_{ih} - \sum_{i \in T} \text{COS}_{ith} \sum_{j \in J} (X_{ijth} \cdot RP_j) \right)$$

s.t.

$$\sum_{t \in T} X_{ijth} \cdot RP_j = \text{Demand}_{ijh} \quad i \in I, j \in J, h \in H.$$

25. The system of claim 1, wherein the system is configured to determine the optimized energy distribution by minimizing renewable generation volatility subject to a generation level during a period and storage system capacity.

26. The system of claim 25, wherein the system is configured to determine the optimized energy distribution by using a power output of a distributed storage system, a power output of a distributed generation source sent to the distributed storage system, a power generation from the distributed generation source, a storage level of the distributed storage system, an initial storage level of the distributed, and storage system charge and discharge rates.

27. The system of claim 26, wherein the system is configured to determine the optimized energy distribution represented at least partially as:

Max PVBatt s.t.

$PV\text{Batt} \leq PV\text{Out}_t + \text{BattOut}_t, t \in T$ $PV\text{Out}_t = PV\text{Gen}_t - PV\text{In}_t, t \in T$ $\text{BattLvl}_{t+1} = \text{BattLvl}_t + PV\text{In}_t - \text{BattOut}_t, t \in T$ $\text{BattLvl}_{t=0} = K$ $\text{BattCap} \geq \text{BattLvl}_t, t \in T$ Where:
PVBatt is power output of a distributed generation and distributed storage system
$PV\text{Out}_t$ is power from the distributed generation that is sent out to an energy distribution system at time t
$PV\text{In}_t$ is power from the distributed generation that is sent out to the distributed storage at time t
$PV\text{Gen}_t$ is power generation from the distributed generation at time t
$\text{BattLvl}_t$ is a storage level of the distributed storage at time t
$\text{BattOut}_t$ is power from the distributed storage sent out to the energy distribution system at time t
$\text{BattLv}_{t=0}$ is an initial storage level of the distributed storage set to a value K BattCap is the capacity of the distributed storage.

28. The system of claim 26, wherein the system is configured to determine the optimized energy distribution represented at least partially as:

$$\text{Max} \sum_{i \in I} \sum_{t \in T} (R_{it} \text{Dmd}_{it}(X_{it}) + LMP_t \text{BtG}_t + LMP_t PV\text{tG}_t) - LMP_t \text{GtB}_t -$$

$$PVC_t PV\text{Gen}_t - (LMP_t \text{GtB}_t + \text{BtC}_{it} + PV\text{tC}_{it}) \cdot (1 + \text{COS}_{it})$$

s.t.

$\text{Dmd}_{it} X_{it} = PV\text{tC}_{it} + \text{BtC}_{it} + \text{GtC}_{it} \quad t \in T, i \in I$ -continued $$\sum_t \text{Dmd}_{it} X_{it} = \sum_t \text{Dmd}_{it} \quad i \in I$$

$$PV\text{Gen}_t = PV\text{tB}_t + PV\text{tG}_t + \sum_{i \in I} PV\text{tC}_{it} \quad t \in T$$

$$\text{BattLvl}_{t+1} = \text{BattLvl}_t + PV\text{tB}_t + \text{GtB}_t - \text{BtG}_t - \sum_{i \in I} \text{BtC}_{it} \quad t \in T$$

$\text{BattLvl}_{t=0} = K$ $\text{BattCap} \geq \text{BattLvl}_t, t \in T.$

Where:
$R_{it}$ is a cost charged to customer i in time t for energy
$\text{Dmd}_{it}$ is demand for energy for customer i at time t
$X_{it}$ is a fraction of period t to supply energy to customer i
$LMP_t$ is Locational Marginal Cost at a distributed storage and a distributed generation
$\text{BtG}_t$ is sales of power at time t from distributed storage to an energy distribution system
$PV\text{tG}_t$ is sales of power at time t from the distributed generation to the energy distribution system
$\text{COS}_{it}$ is a cost to serve adder associated with moving electricity from a substation to customer i during period t
$\text{GtC}_{it}$, $\text{BtC}_{it}$, and $PV\text{tC}_{it}$, are the power from the energy distribution system, the distributed storage, and the distributed generation, respectively, to meet customer i's demand during period t
$PVB_t$ is power from the distributed generation sent out to the distributed storage for storage at time t
$PV\text{Gen}_t$ is power generation from the distributed generation at time t
$\text{BattLvl}_t$ is a storage level of the distributed storage at time t
$\text{GtB}_t$ is power sent from the energy distribution system to the distributed storage for storage at time t.
$\text{BattLv}_{t=0}$ is an initial storage level of the distributed storage set to a value K
BattCap is the capacity of the distributed storage.

29. The system of claim 1, wherein the system is configured to determine the optimized energy distribution by maximizing revenue, minimizing total cost to provide and deliver power, or maximizing avoided costs during a period over a plurality of customers or customer locations, a plurality of distributed generation sources and a plurality of distributed storage systems.

30. The system of claim 29, wherein the system is configured to determine the optimized energy distribution by using an energy rate during the period, the forecasted individualized demand by electrical device, a forecasted individualized locational marginal cost of energy at each of the plurality of distributed generation sources and each of the plurality of distributed storage systems, incentives, forecasted individualized cost of service or avoidable cost, forecasted power generation from each of the plurality of distributed generation sources, and the initial storage level of each the plurality of the distributed storage systems.

31. The system of claim 1, wherein the system is configured to determine the optimized energy distribution by considering uncertainty in forecast variables.

32. The system of claim 31, wherein the uncertainty uses a conditional value at risk to incorporate, and provides for least cost planning dispatching solutions applied to end-uses, distributed storage, ancillary services, allocations of cost of service adders or premiums, and combinations thereof.

33. The system of claim 1, wherein the system is further configured to forecast daily energy prices represented as:

$$P_t^D = f_1(\vec{P}_t, \vec{W}_t, \vec{Y}_t, \vec{X}_t, \epsilon)$$

Where
$f_1$: is an underlying regression function
$P_t^D$: is a daily average electricity price of day t
$\vec{P}_t$: is a past daily average electricity price vector at day t
$\vec{W}_t$: is a past weather condition vector at day t
$\vec{Y}_t$: is a seasonality variables vector at day t
$\vec{X}_t$: is other independent variables vector at day t
$\epsilon_t$: is a white noise error terms at day t.

34. The system of claim 1, wherein the system is further configured to forecast a forward cost of energy represented as:

$$LWFCE = \sum_t^T \frac{1}{\left(\sum_i^{n_t} Q_i + \sum_j^{m_t} Q_j\right)} \left(P_t \cdot \sum_i^{n_t} Q_i + OP_t \cdot \sum_j^{m_t} Q_j\right).$$

Where
LWFCE is a load weighted forward cost of energy
$n_t$ is peak hours in month t
$m_t$ is off-peak hours in month t
T is total months in the term of a contract
$Q_i$ is energy demand in peak hour i
$Q_j$ is energy demand in off-peak hour j
$P_t$ is a monthly forward peak price
$OP_t$ is a monthly forward off-peak price.

35. The system of claim 1, wherein the system is further configured to communicate with at least one of the plurality of customers or customer locations through a customer portal.

36. The system of claim 1, wherein the system is further configured to communicate with an energy provider though a utility portal.

37. The system of claim 1, wherein the electrical device comprises an end use comprising at least one of an appliance or an electrical vehicle.

38. The method of claim 1, wherein the electrical device comprises an end use comprising at least one of an appliance or an electrical vehicle.

39. A system for energy optimization, the system comprising:
a server configured to:
receive information collector data from at least one information collector, the information collector data comprising individualized energy usage data regarding energy use of electrical devices of at least one of a plurality of customers or customer locations;
forecast individualized demand by electrical device and individualized demand by location for at least one of the plurality of customers or customer locations using the individualized energy usage data;
forecast non-dispatchable energy demand comprising energy demand that is not controllable by the server;
determine an optimized energy distribution by calculating a fraction of a time period to supply energy by electrical device and the plurality of customers or customer locations that maximizes a difference between revenue and total cost to provide and deliver power or avoided costs during the period utilizing constraints of the forecasted non-dispatchable energy demand for each of the plurality of customers or customer locations for the period, the forecasted individualized demand by electrical device for the period, and a predetermined bill level set in advance by the plurality of customers or customer locations for the plurality of customers or customer locations for the time period; and
produce instructions for controlling energy use of electrical devices of the at least one of the plurality of customers or customer locations based on the determined optimized energy distribution,
wherein the system is configured to determine the optimized energy distribution represented at least partially as:

$$\text{Max} \sum_{h \in H} \sum_{t \in T} (R_{ht} - COS_{ht}) \cdot \left(\sum_{j \in J} (Demand_{jth} \cdot X_{jth}) + NonDisp_{th}\right)$$

s.t.

$$\sum_{h \in H} \sum_{t \in T} \left(\left(\sum_{j \in J} X_{jth} \cdot Demand_{jth}\right) + NDisp_{th}\right) \cdot R_{th} = \text{Bill Target}$$

$$0 \leq X_{jth} \leq UB_{jth} \quad j \in J, t \in T, h \in H.$$

40. A system for energy optimization, the system comprising:
a server configured to:
receive information collector data from at least one information collector, the information collector data comprising individualized energy usage data regarding energy use of electrical devices of at least one of a plurality of customers or customer locations;
forecast a cost of service or avoided cost for at least one of the plurality of customers or customer locations using at least one of the individualized energy usage data or a system generation cost at a bus nearest to the at least one of the plurality of customers or customer locations;
forecast individualized demand by location for at least one of the plurality of customers or customer locations using the individualized energy usage data;
determine an optimized energy distribution by determining a supply of energy to each of the plurality of customers or customer locations for a period of time from the distributed generation and distributed storage system that maximizes revenue less the cost of services or avoided cost utilizing constraints of:
the energy rates,
the forecasted individualized demand by each of the plurality of customers or customer locations,
the power from the energy distribution system, the distributed storage, and the distributed generation,
the power from the distributed generation sent out to the distributed storage for storage,
the power generation from the distributed generation,
the storage level of the distributed storage,
the power sent from the energy distribution system to the distributed storage for storage,
the initial storage level of the distributed storage, and
the capacity of the distributed storage; and
produce instructions for controlling energy use of electrical devices of the at least one of the plurality of customers or customer locations based on the determined optimized energy distribution, wherein the system is configured to determine the optimized energy distribution represented at least partially as:

$$\text{Max} \sum_{i \in I} \sum_{t \in T} (R_{it} Dmd_{it}(X_{it}) + LMP_t BtG_t + LMP_t PVtG_t) -$$

$$I_{it} Dmd_{it}(1 - X_{it}) - LMP_t GtB_t - PVC_t PVGen_t -$$

$$(LMP_t GtB_t + BtC_{it} + PVtC_{it}) \cdot (1 + COS_{it})$$

s.t.

$$Dmd_{it} X_{it} = PVtC_{it} + BtC_{it} + GtC_{it} \quad t \in T, i \in I$$

$$PVGen_t = PVtB_t + PVtG_t + \sum_{i \in I} PVtC_{it} \quad t \in T$$

$$BattLvl_{t+1} = BattLvl_t + PVtB_t + GtB_t - BtG_t - \sum_{i \in I} BtC_{it} \quad t \in T$$

$$BattLvl_{t=0} = K$$

$$BattCap \geq BattLvl_t \quad t \in T.$$

Where:
$R_{it}$ is a cost charged to customer i in time t for energy
$Dmd_{it}$ is demand for energy for customer i at time t
$X_{it}$ is a fraction of period t to supply energy to customer i
$LMP_t$ is Locational Marginal Cost at a distributed storage and a distributed generation
$BtG_t$ is sales of power at time t from distributed storage to an energy distribution system
$PVtG_t$ is sales of power at time t from the distributed generation to the energy distribution system
$I_{it}$ is an incentive offered by the energy provider to customer i to curtail customer power during time t
$COS_{it}$ is a cost to serve adder associated with moving electricity from a substation to customer i during period t
$GtC_{it}$, $BtC_{it}$, and $PVtC_{it}$, are the power from the energy distribution system, the distributed storage, and the distributed generation, respectively, to meet customer i's demand during period t
$PVB_t$ is power from the distributed generation sent out to the distributed storage for storage at time t
$PVGen_t$ is power generation from the distributed generation at time t
$BattLvl_t$ is a storage level of the distributed storage at time t
$GtB_t$ is power sent from the energy distribution system to the distributed storage for storage at time t
$BattLv_{lt=0}$ is an initial storage level of the distributed storage set to a value K
$BattCap$ is the capacity of the distributed storage.

41. A system for energy optimization, the system comprising:
a server;
one or more databases in communication with the server;
the server is configured to:
receive information collector data from at least one information collector, the information collector data comprising near-real time individualized energy usage data for each of a plurality of customers or customer locations;
calculate a cost of service for each of the plurality of customers or customer locations based on at least one of:
individualized energy usage data and at least one of a system generation cost for an energy provider or a locational marginal price of electricity; or
individualized energy usage data and characteristics of an electric distribution system used to supply power to each of the plurality of customers or customer locations,
further configured to:
assign an individualized relative marginal cost value for each of the customers or customer locations, wherein the relative marginal cost value indicates differences in cost of service for different customers or customer locations; and
combine the relative marginal cost value with a weighted customer cost, wherein the weighted customer cost indicates an importance of a cost category for individual customers or customer locations;
forecast individualized energy usage for each of the plurality of customers or customer locations;
forecast customer specific cost of service for each of the plurality of customers or customer locations using the calculating results; and
optimize, over a plurality of customers or customer locations, energy use and cost of service using the forecasted individualized energy usage and the forecasted customer specific cost of service.

42. The system of claim 41, wherein the at least one information collector is a third party vendor, and the individualized energy usage data is end-use level information collected through a home area network system or site-level information collected through a smart meter.

43. The system of claim 41, wherein the cost of service is a cost associated with supplying energy to each of the plurality of customers or customer locations.

44. The system of claim 41, the server further configured to calculate an avoided cost for each of the plurality of customers or customer locations, wherein the avoided cost is cost saved by the energy provider using one particular energy distribution strategy over another energy distribution strategy.

45. The system of claim 41, wherein the system is configured to operate in near real-time comprising a five minute interval or less, and wherein the individualized energy usage data is available at an end-use level.

46. The system of claim 41, wherein the system is configured to optimize by at least one of: maximizing revenue of the energy provider, minimizing customer discomfort, maximizing avoided costs, minimizing incentive costs, minimizing cost to provide and deliver power, and combinations thereof, while achieving a required total demand reduction or total energy reduction.

47. The system of claim 41, wherein the system is configured to optimize by minimizing a total system peak demand during a period over the plurality of customers or customer locations subject to end-use kWh requirements and total kWh demand for each of the plurality of customers or customer locations.

48. The system of claim 41, wherein the system is configured to optimize by maximizing revenue, minimizing a total energy provider cost to provide and deliver energy, or maximizing avoided costs during a period over a plurality of customers or customer locations subject to end-use kWh requirements and total kWh demand for each of the plurality of customers or customer locations during the period.

49. The system of claim 41, wherein the system is configured to optimize by maximizing avoided cost, minimizing total cost to serve and deliver, or maximizing revenue subject to a predetermined individualized bill level set in advance by each customer for a period.

50. The system of claim 41, wherein the system is configured to optimize by minimizing renewable generation volatility subject to a generation level during a period and storage system capacity.

51. The system of claim 41, wherein the system is configured to optimize by maximizing revenue, minimizing total cost to provide and deliver power, or maximizing avoided costs during a period over a plurality of customers or customer locations, a plurality of distributed generation sources and a plurality of distributed storage systems.

52. The system of claim 41, wherein the system is configured to optimize by considering uncertainty in forecast variables using conditional value at risk or other risk metrics, and provides for least cost planning dispatching solutions applied to end-uses, distributed storage, ancillary services, allocations of cost of service adders or premiums, and combinations thereof.

53. A method for energy optimization, the method comprising:
    receiving, by a processor, information collector data from at least one information collector, the information collector data comprising near-real time individualized energy usage data for each of a plurality of customers or customer locations;
    calculating, by a processor, a cost of service for each of the plurality of customers or customer locations by at least one of:
        individualized energy usage data and at least one of a system generation cost for an energy provider or a locational marginal price of electricity; or
        individualized energy usage data and characteristics of an electric distribution system used to supply power to each of the plurality of customers or customer locations, the calculating further comprising:
        assigning an individualized relative marginal cost value for each of the customers or customer locations, wherein the relative marginal cost value indicates differences in cost of service for different customers or customer locations; and
        combining the relative marginal cost value with a weighted customer cost, wherein the weighted customer cost indicates an importance of a cost category for individual customers or customer locations;
    forecasting, by a processor, individualized energy usage for each of the plurality of customers or customer locations;
    forecasting, by a processor, customer specific cost of service for each of the plurality of customers or customer locations using the calculating results; and
    optimizing, by a processor, over a plurality of customers or customer locations, energy use and cost of service using the forecasted individualized energy usage and the forecasted customer specific cost of service.

54. The method of claim 53, wherein the method is executed in near real-time, wherein near real-time is a five minute interval or less.

55. The method of claim 53, wherein the optimizing comprises at least one of: maximizing revenue of the energy provider, minimizing customer discomfort, maximizing avoided costs, minimizing incentive costs, minimizing cost to provide and deliver power, and combinations thereof, while achieving a required total demand reduction or total energy reduction.

56. The method of claim 53, wherein the optimizing comprises minimizing a total system peak demand during a period over the plurality of customers or customer locations subject to end-use kWh requirements and total kWh demand for each of the plurality of customers or customer locations.

57. The method of claim 53, wherein the optimizing comprises maximizing revenue, minimizing a total energy provider cost to provide and deliver energy, or maximizing avoided costs during a period over a plurality of customers or customer locations subject to end-use kW requirements and total kWh demand for the plurality of customers or customer locations during the period.

58. The method of claim 53, wherein the optimizing comprises maximizing avoided cost, minimizing total cost to serve and deliver, or maximizing revenue subject to a predetermined individualized bill level set in advance by each customer for a period.

59. The method of claim 53, wherein the optimizing comprises minimizing renewable generation volatility subject to a generation level during a period and storage system capacity.

60. The method of claim 53, wherein the optimizing comprises maximizing revenue, minimizing total cost to provide and deliver power, or maximizing avoided costs during a period over a plurality of customers or customer locations, a plurality of distributed generation sources and a plurality of distributed storage systems.

* * * * *